(12) United States Patent
Sia

(10) Patent No.: US 10,808,679 B2
(45) Date of Patent: Oct. 20, 2020

(54) DRONE MOUNTED WIND TURBINE-GENERATOR SYSTEM

(71) Applicant: Yik Hei Sia, Johor Bahru (MY)

(72) Inventor: Yik Hei Sia, Johor Bahru (MY)

( * ) Notice: Subject to any disclaimer, the term of this patent is extended or adjusted under 35 U.S.C. 154(b) by 0 days.

(21) Appl. No.: 16/544,831

(22) Filed: Aug. 19, 2019

(65) Prior Publication Data
US 2020/0056584 A1 Feb. 20, 2020

(30) Foreign Application Priority Data

Aug. 20, 2018 (SG) .......................... 10201807027W
Aug. 14, 2019 (SG) ........................... 10201907453Y

(51) Int. Cl.
| | | |
|---|---|---|
| *F03D 9/00* | (2016.01) | |
| *H02P 9/04* | (2006.01) | |
| *F03D 7/02* | (2006.01) | |
| *F03D 1/00* | (2006.01) | |
| *B64C 39/02* | (2006.01) | |

(52) U.S. Cl.
CPC .......... *F03D 7/0204* (2013.01); *B64C 39/022* (2013.01); *F03D 1/00* (2013.01); *F05B 2240/921* (2013.01)

(58) Field of Classification Search
CPC ........ F03D 1/00; F03D 7/0204; B64C 39/022
See application file for complete search history.

(56) References Cited

U.S. PATENT DOCUMENTS

| | | | | |
|---|---|---|---|---|
| 2,388,478 | A * | 11/1945 | Garber ................. | A63H 27/002 244/155 A |
| 4,124,182 | A * | 11/1978 | Loeb ........................ | F03D 5/00 244/153 R |
| 4,641,797 | A * | 2/1987 | Stolk ...................... | A63H 27/08 244/153 R |
| 4,892,272 | A * | 1/1990 | Hadzicki ................. | B63H 8/16 244/153 R |
| 5,435,259 | A * | 7/1995 | Labrador ............... | B01D 61/10 114/39.31 |
| 6,498,402 | B2 * | 12/2002 | Saiz ......................... | F03D 5/02 290/54 |
| 7,188,808 | B1 * | 3/2007 | Olson ...................... | F03D 5/00 244/153 R |
| 8,350,403 | B2 * | 1/2013 | Carroll ............... | B65H 75/4402 290/55 |
| 8,446,034 | B1 * | 5/2013 | Stevens ..................... | F03D 5/00 290/44 |
| 8,539,746 | B2 * | 9/2013 | Ippolito .................. | C02F 1/286 57/200 |
| 8,602,363 | B2 * | 12/2013 | Larson ..................... | F03D 9/25 244/155 A |
| 8,963,362 | B2 * | 2/2015 | Sia .......................... | F03D 5/00 290/55 |
| 9,234,501 | B2 * | 1/2016 | Sia ......................... | F03B 17/06 |
| 9,239,041 | B2 * | 1/2016 | Goldstein ............ | B64C 39/022 |
| 9,447,775 | B2 * | 9/2016 | Sia ............................ | F03D 5/02 |
| 9,698,652 | B2 * | 7/2017 | Sia ........................... | F03D 5/00 |
| 9,745,951 | B1 * | 8/2017 | Doyle ................... | F03B 17/061 |
| 9,797,379 | B2 * | 10/2017 | Ori ......................... | F03D 1/025 |
| 10,113,534 | B2 * | 10/2018 | Sia ......................... | F03D 9/008 |

(Continued)

Primary Examiner — Tulsidas C Patel
Assistant Examiner — Thomas K Quigley
(74) *Attorney, Agent, or Firm* — Crockett & Crockett, PC; K. David Crockett, Esq.; Niky Economy Syrengelas, Esq.

(57) ABSTRACT

An airborne wind turbine system for generation of power via windbags and waterbags.

1 Claim, 25 Drawing Sheets

(56) References Cited

U.S. PATENT DOCUMENTS

| | | | |
|---|---|---|---|
| 10,233,902 B2* | 3/2019 | Sia | F03D 9/30 |
| 10,337,489 B2* | 7/2019 | Wentzel | F03B 13/264 |
| 10,442,524 B1* | 10/2019 | Treat | B64C 5/02 |
| 10,556,709 B1* | 2/2020 | Kimchi | B64C 39/024 |
| 10,590,911 B2* | 3/2020 | Aull | B64C 31/06 |
| 10,619,625 B2* | 4/2020 | Sia | F03D 5/02 |
| 2002/0185570 A1* | 12/2002 | Winner | A63H 27/002 244/155 A |
| 2006/0097114 A1* | 5/2006 | Goodman | B64C 31/06 244/155 A |
| 2007/0250226 A1* | 10/2007 | Wrage | B63H 9/069 701/21 |
| 2008/0048453 A1* | 2/2008 | Amick | B82Y 30/00 290/44 |
| 2010/0066095 A1* | 3/2010 | Meller | F03D 9/25 290/55 |
| 2010/0276941 A1* | 11/2010 | Zhang | F03B 17/06 290/55 |
| 2010/0314886 A1* | 12/2010 | Potter | F03D 1/04 290/55 |
| 2011/0101692 A1* | 5/2011 | Bilaniuk | B64B 1/20 290/44 |
| 2011/0210559 A1* | 9/2011 | Zanetti | F03D 5/06 290/55 |
| 2015/0180186 A1* | 6/2015 | Vander Lind | H01R 35/02 290/55 |
| 2015/0184639 A1* | 7/2015 | Goessling | F03D 1/02 290/44 |
| 2015/0188367 A1* | 7/2015 | Vander Lind | H02K 1/185 290/55 |
| 2015/0298806 A1* | 10/2015 | Vander Lind | B63H 9/069 518/704 |
| 2015/0308410 A1* | 10/2015 | Goldstein | F01D 13/02 290/55 |
| 2015/0354539 A1* | 12/2015 | Goessling | B64F 3/02 290/44 |
| 2015/0375852 A1* | 12/2015 | Hallamasek | F03D 7/047 244/175 |
| 2016/0207626 A1* | 7/2016 | Bailey | B64C 39/022 |

* cited by examiner

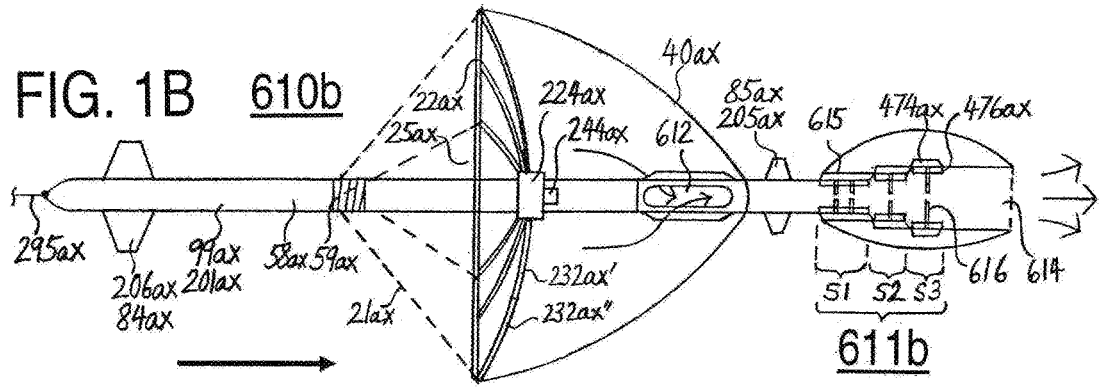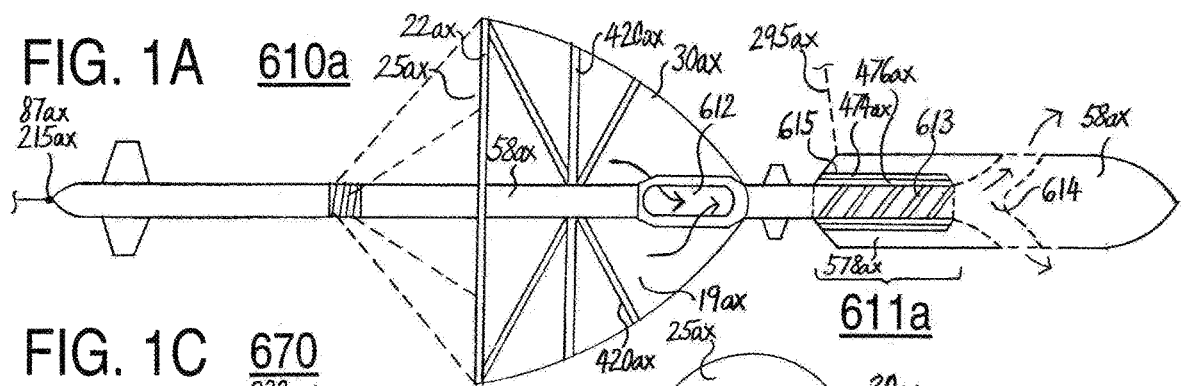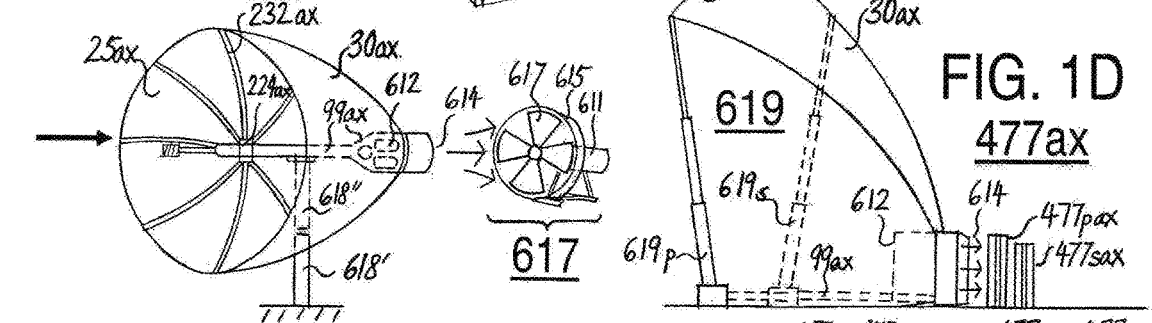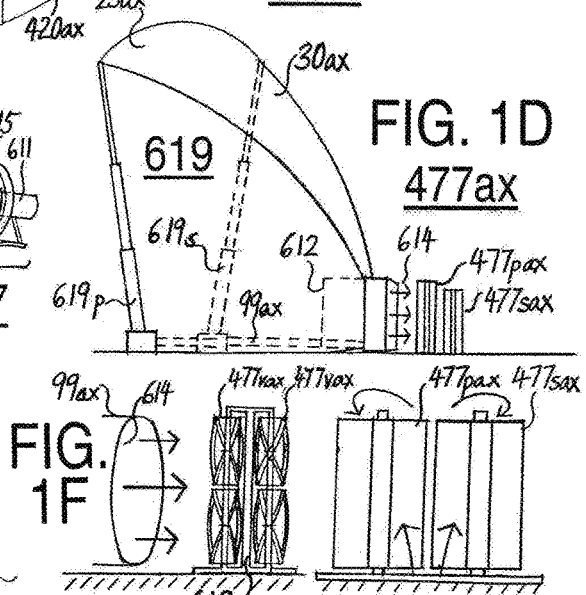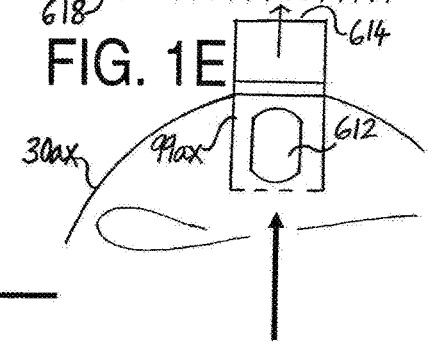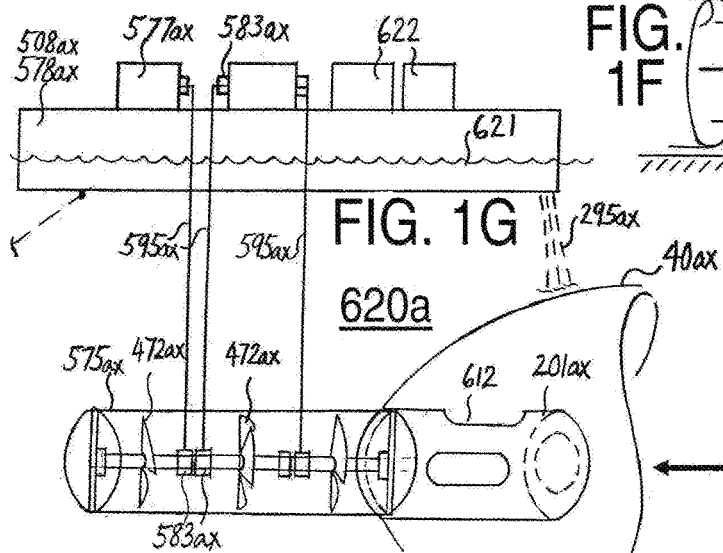

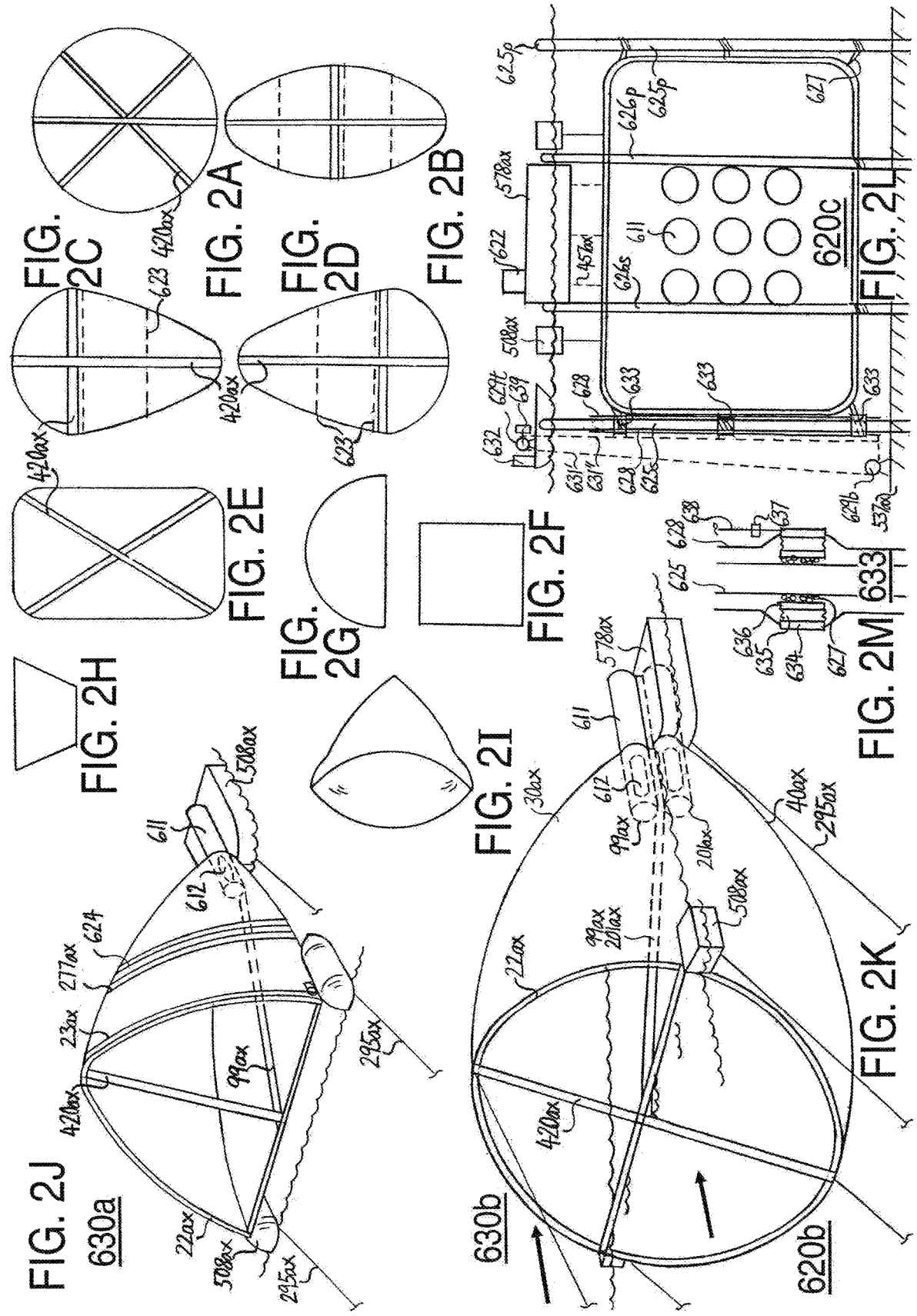

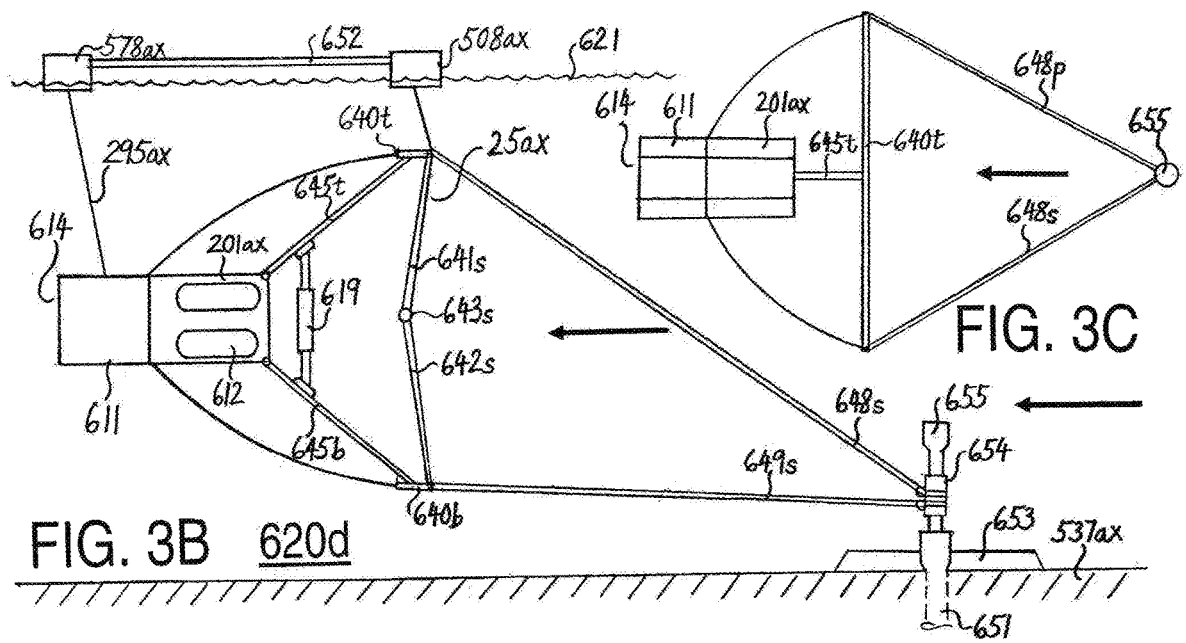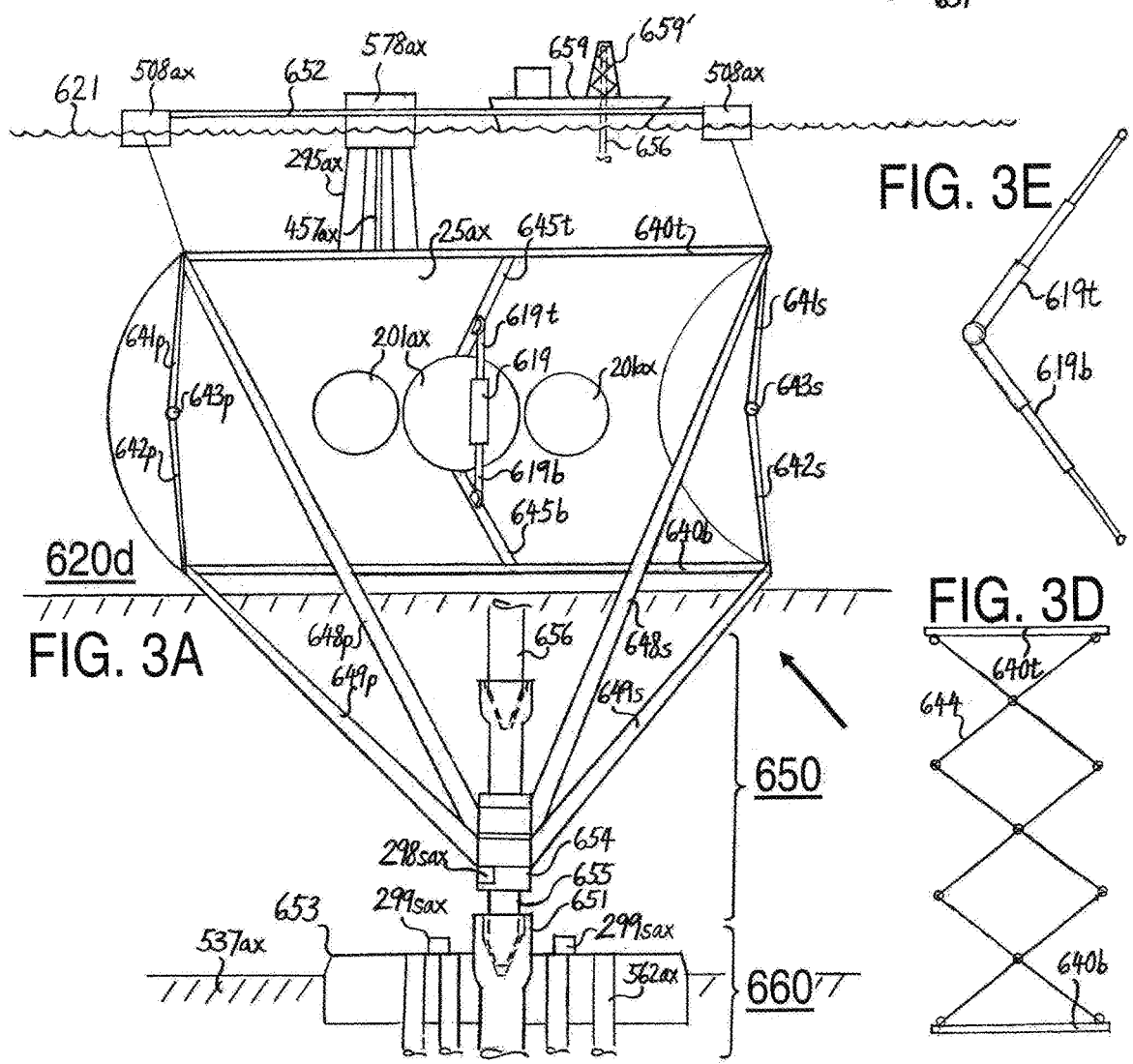

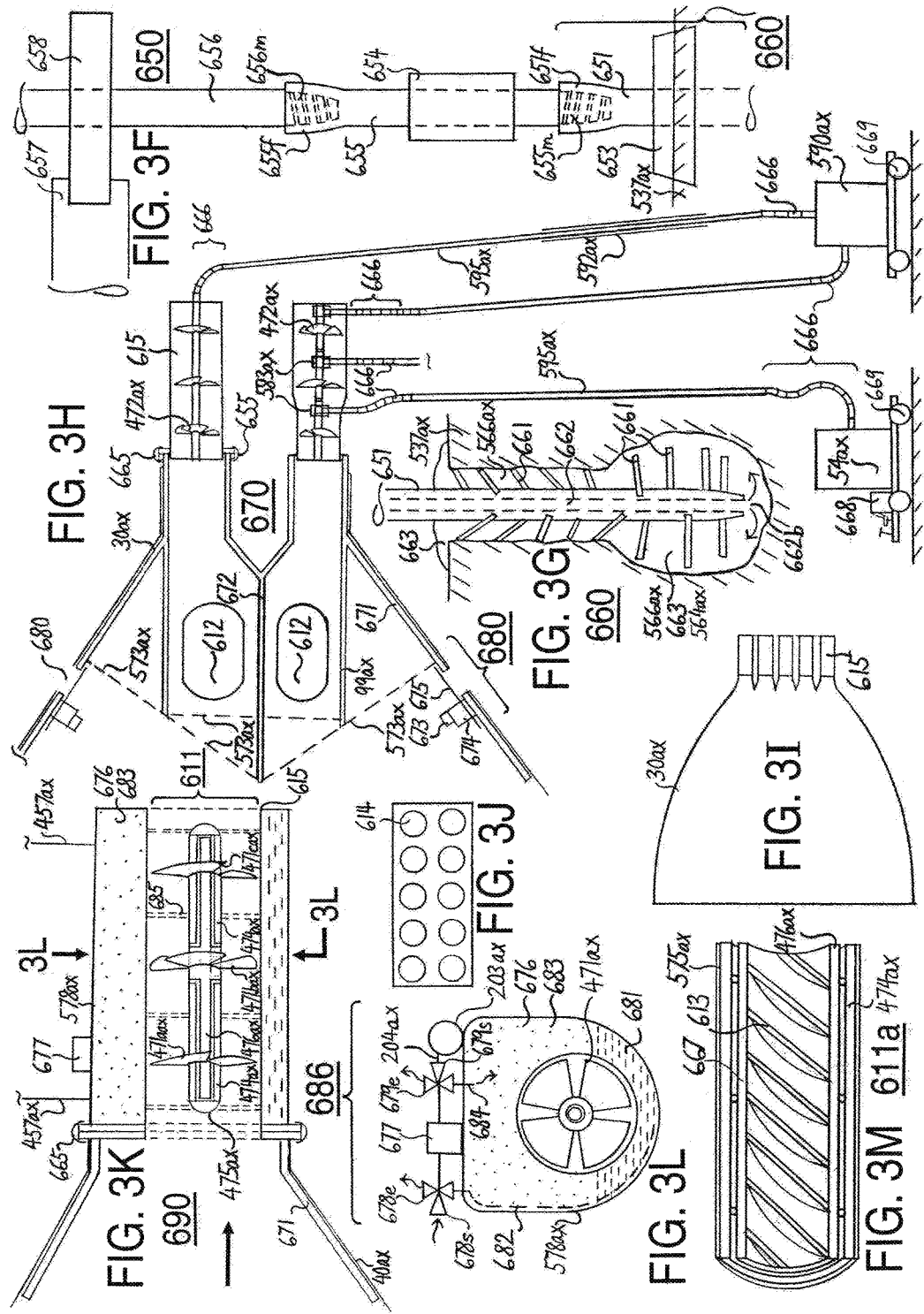

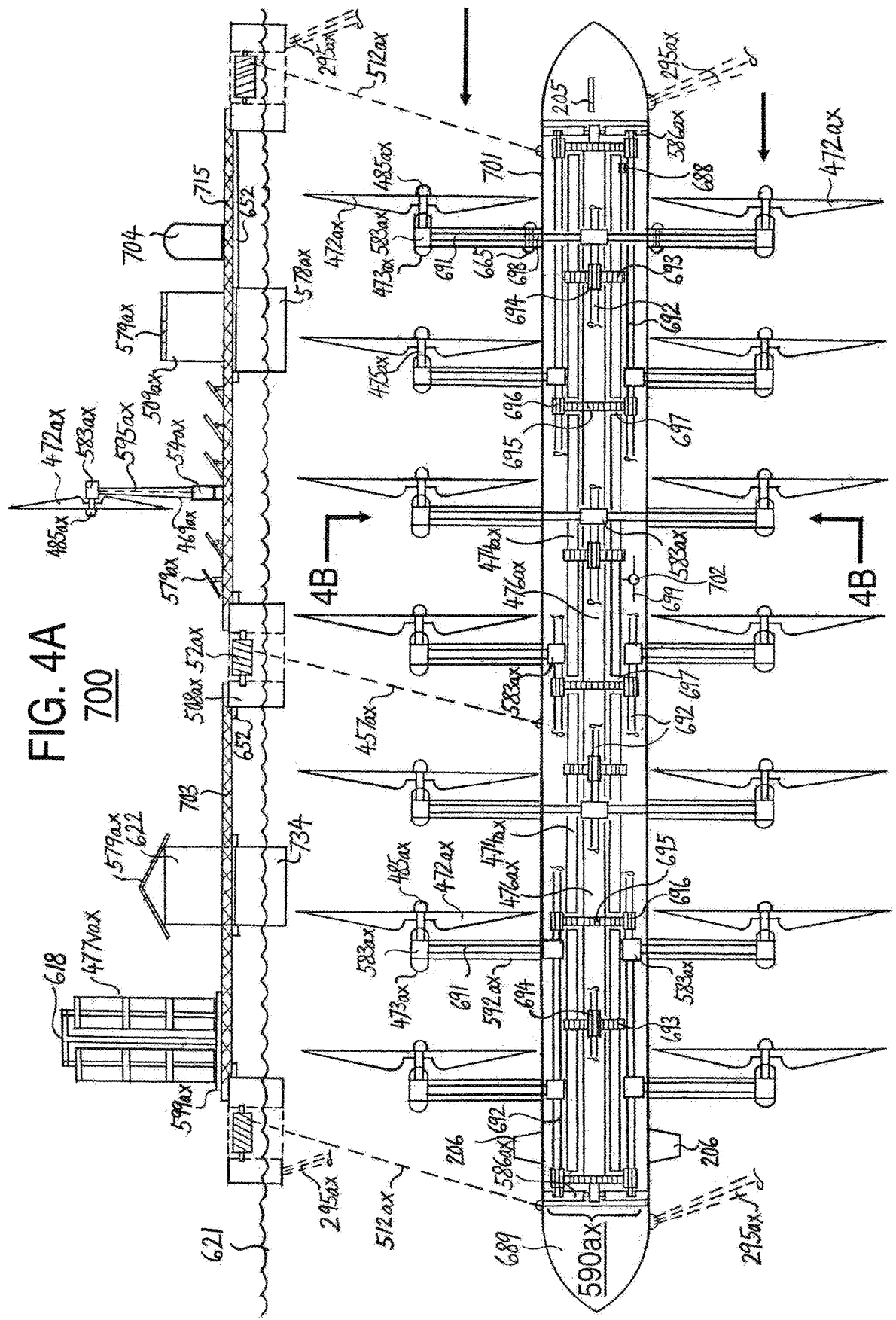

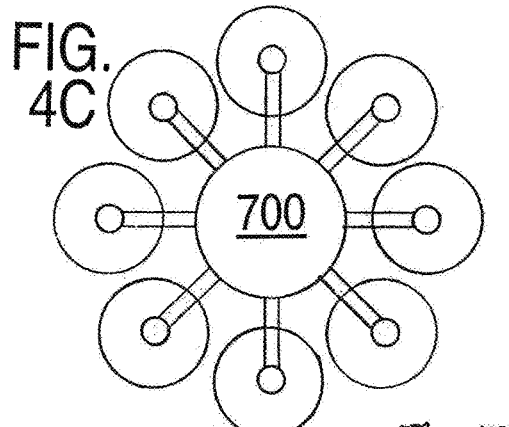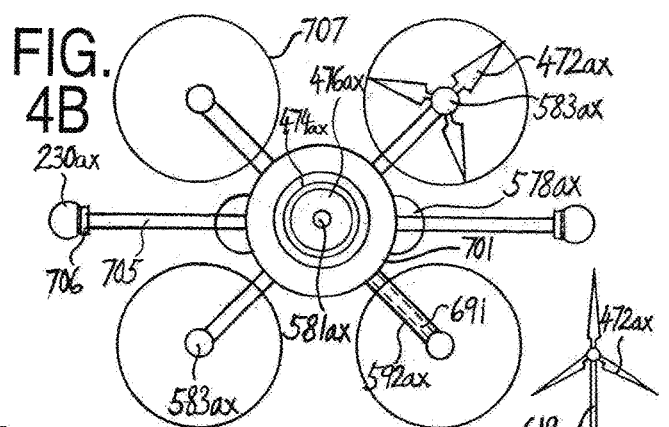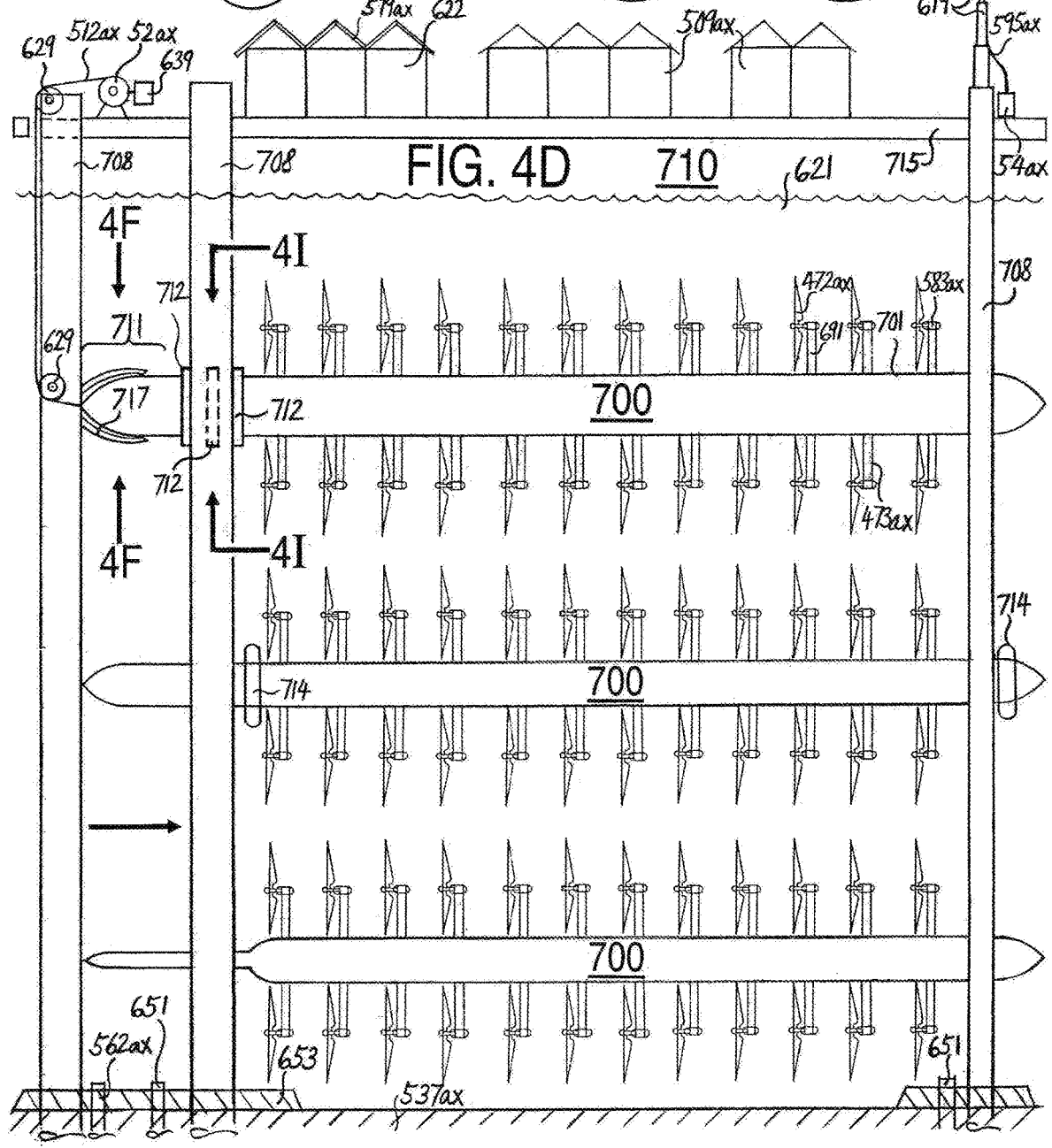

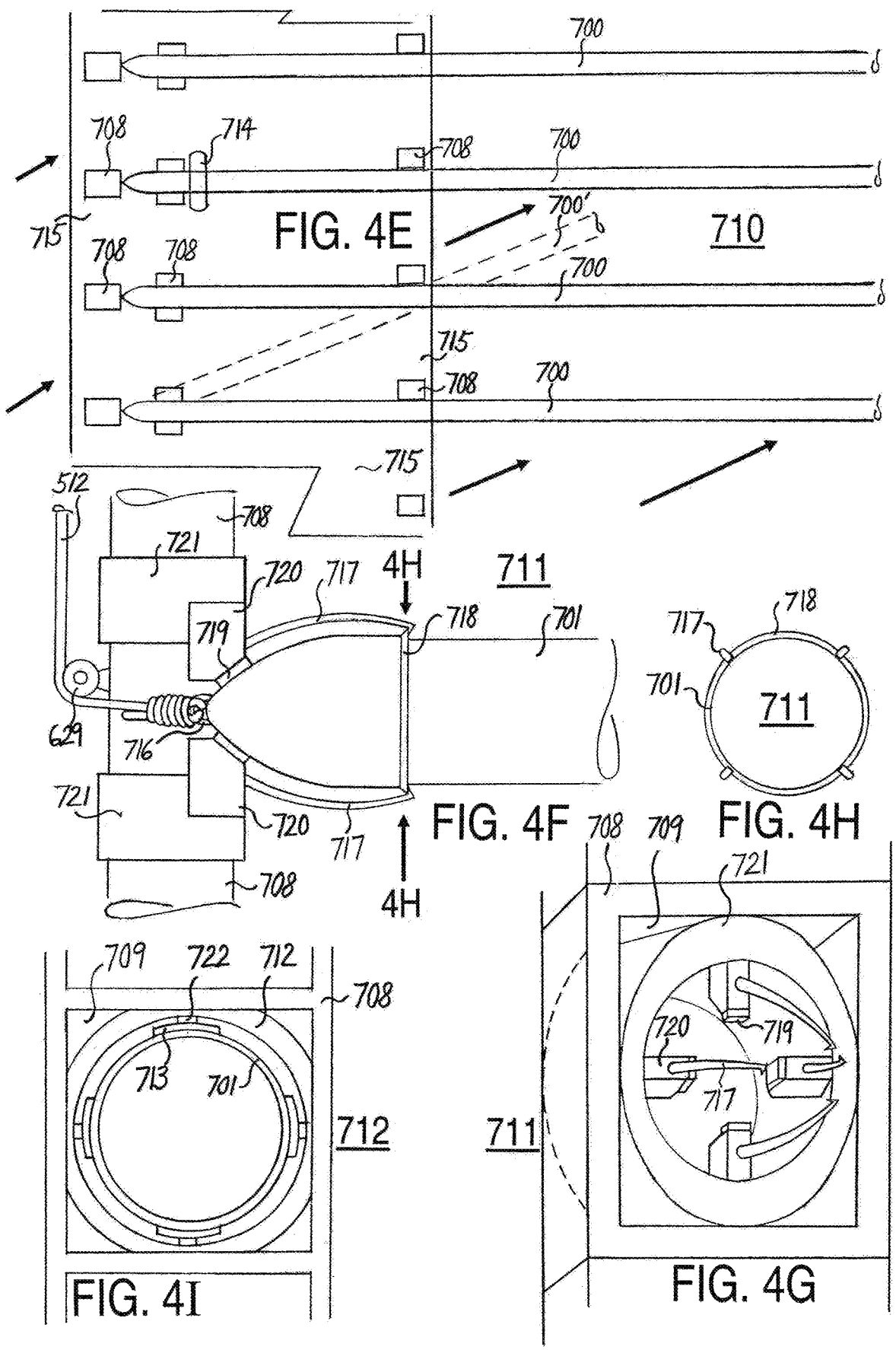

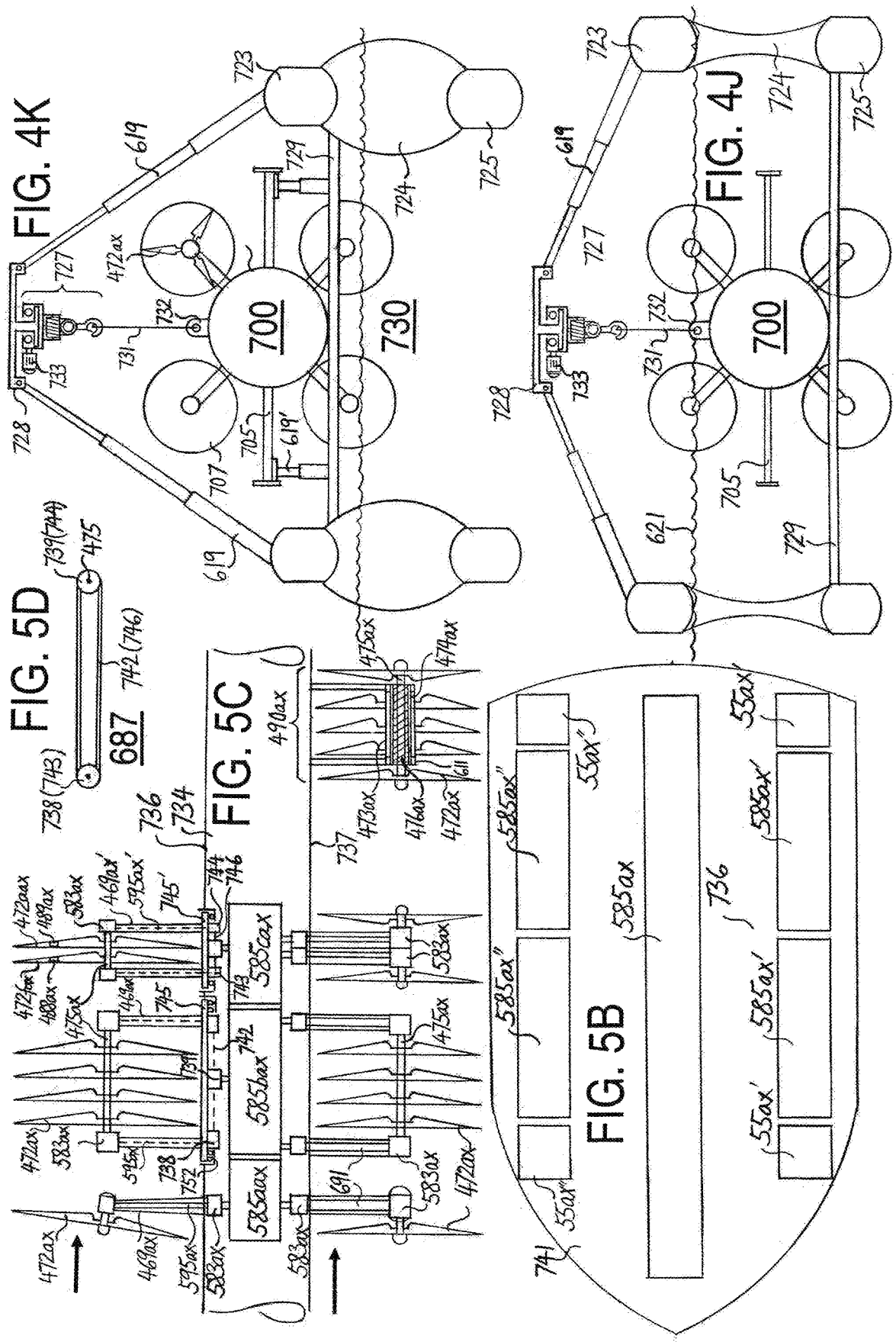

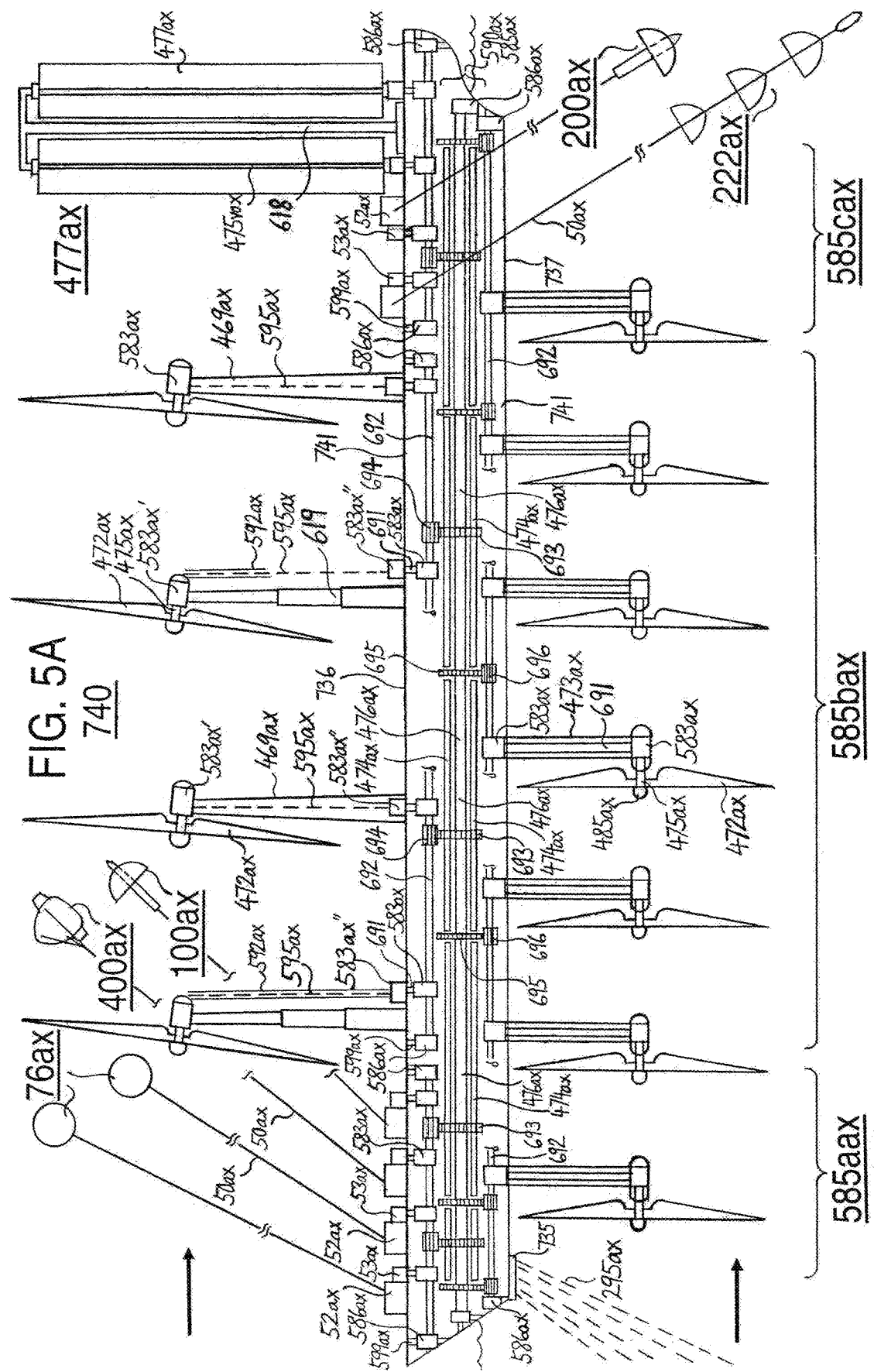

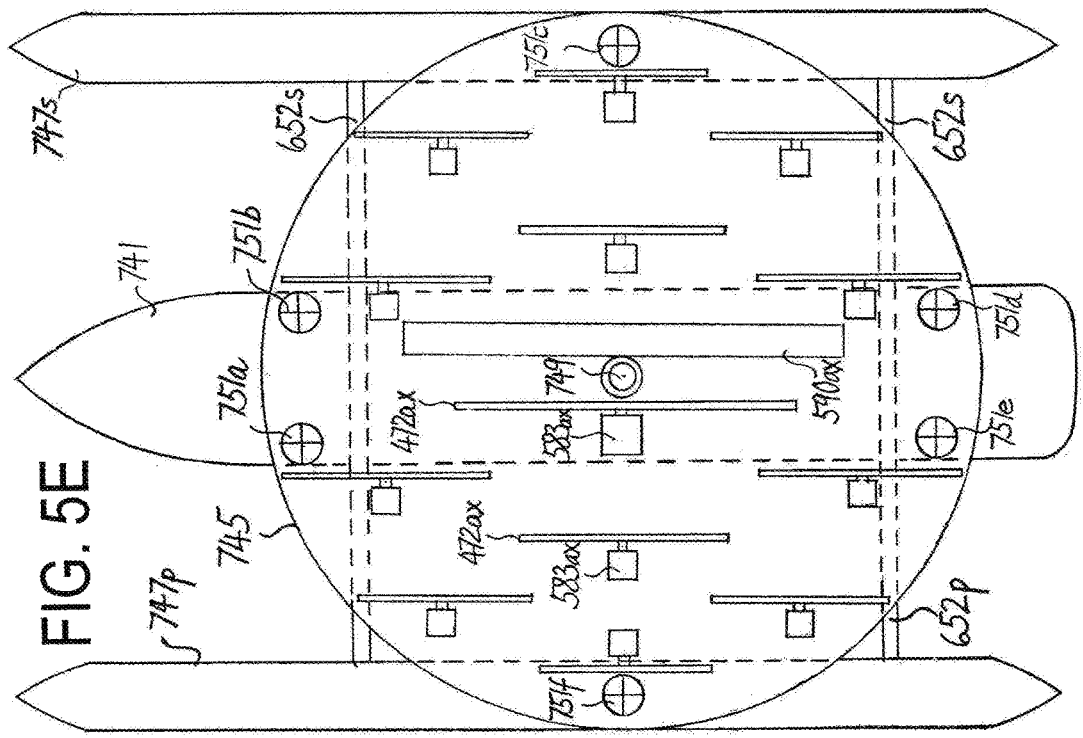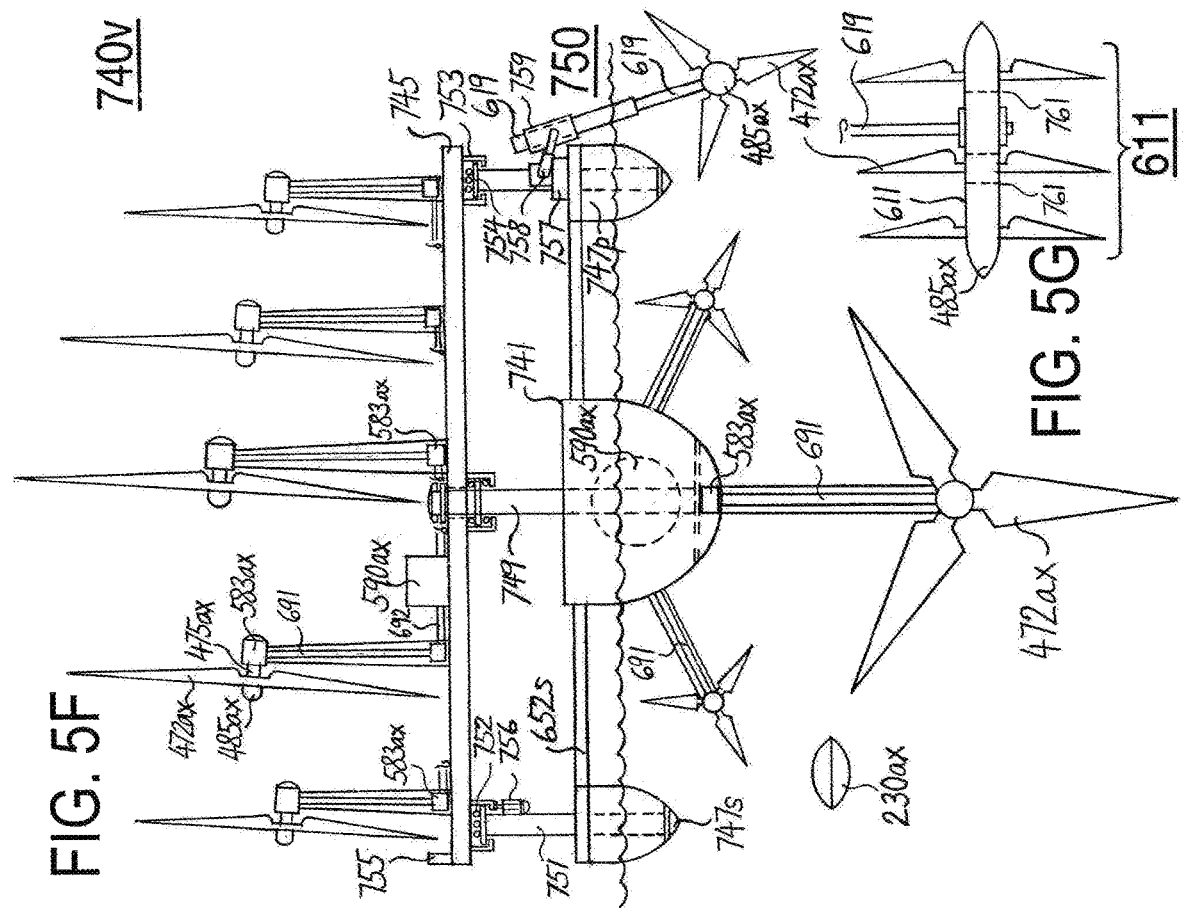

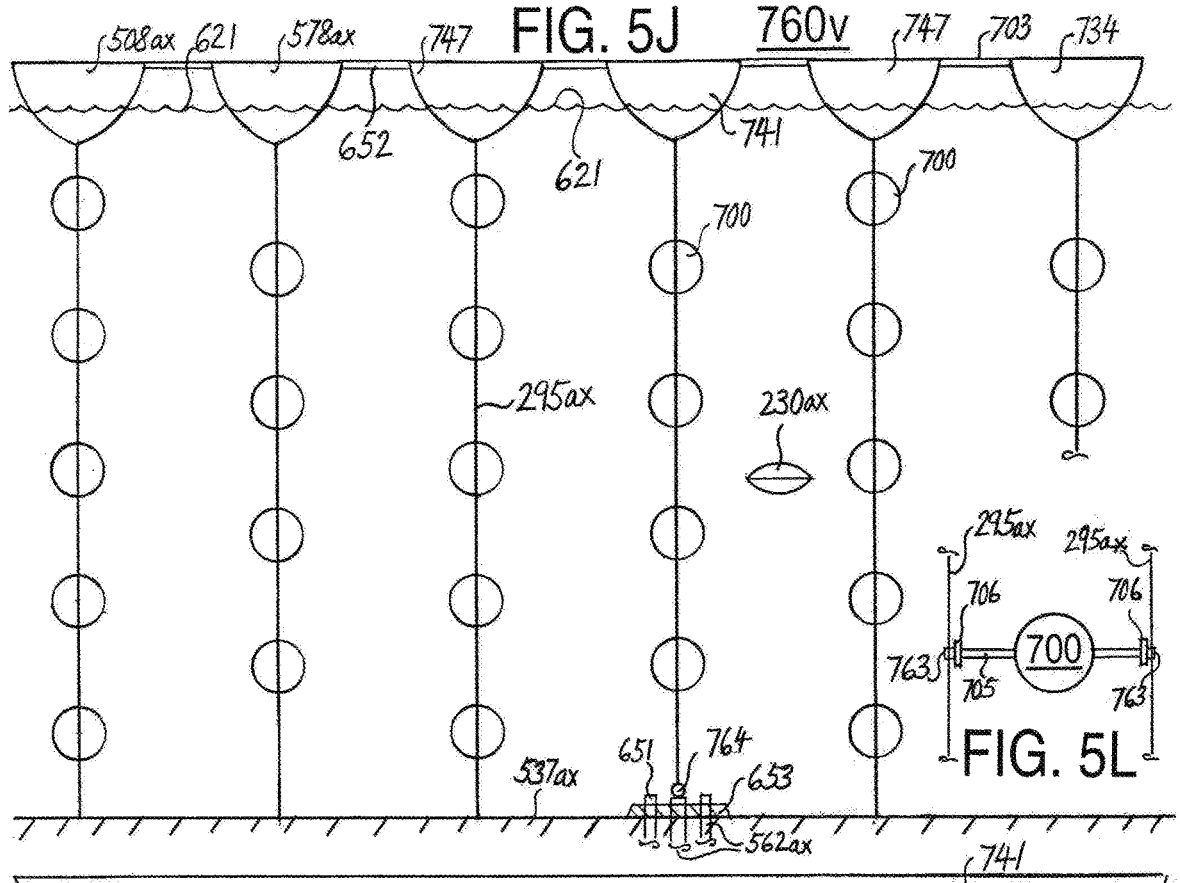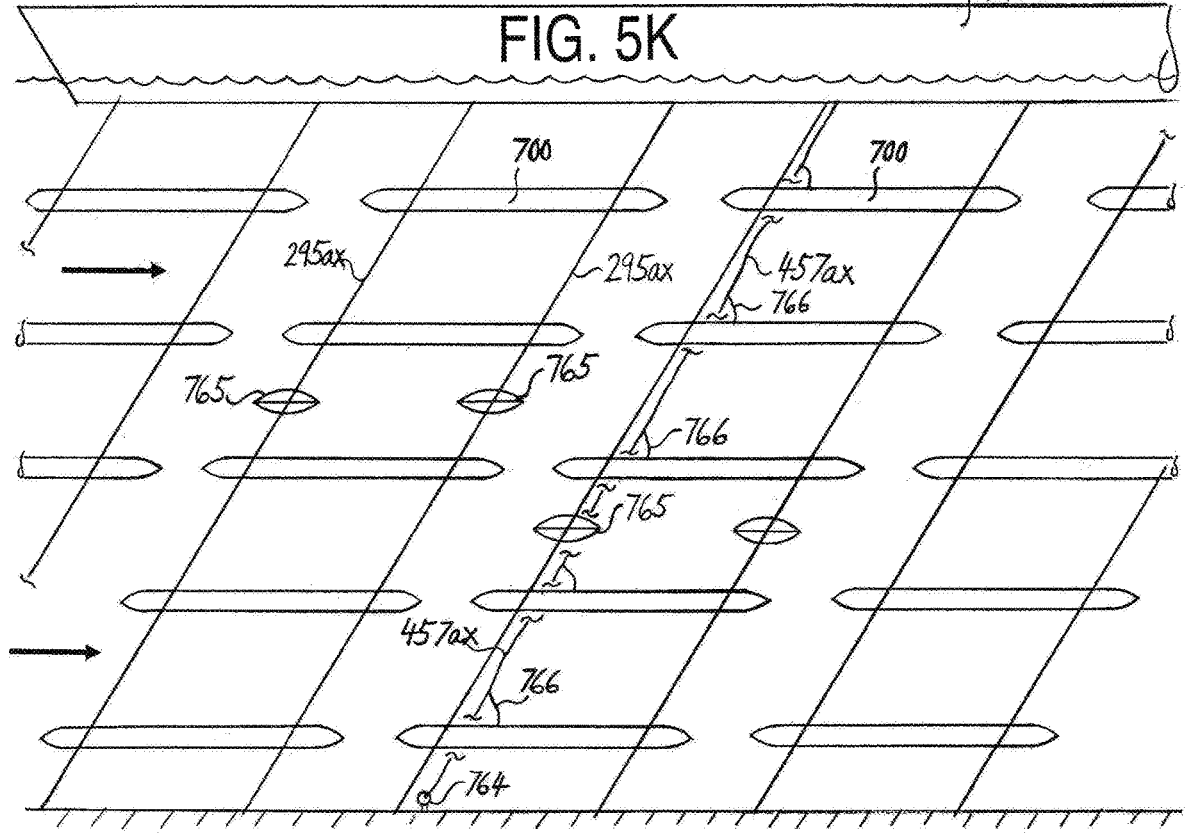

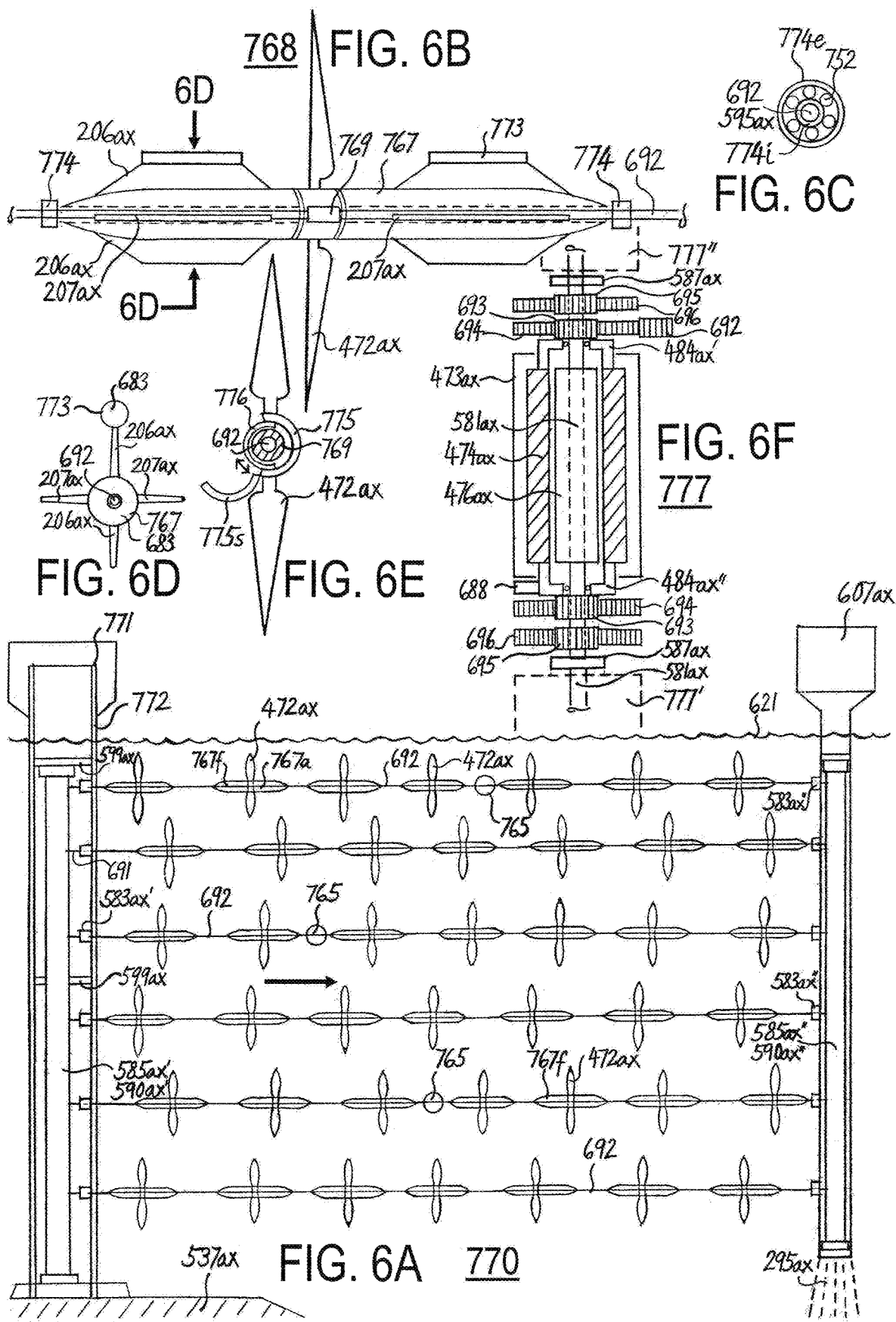

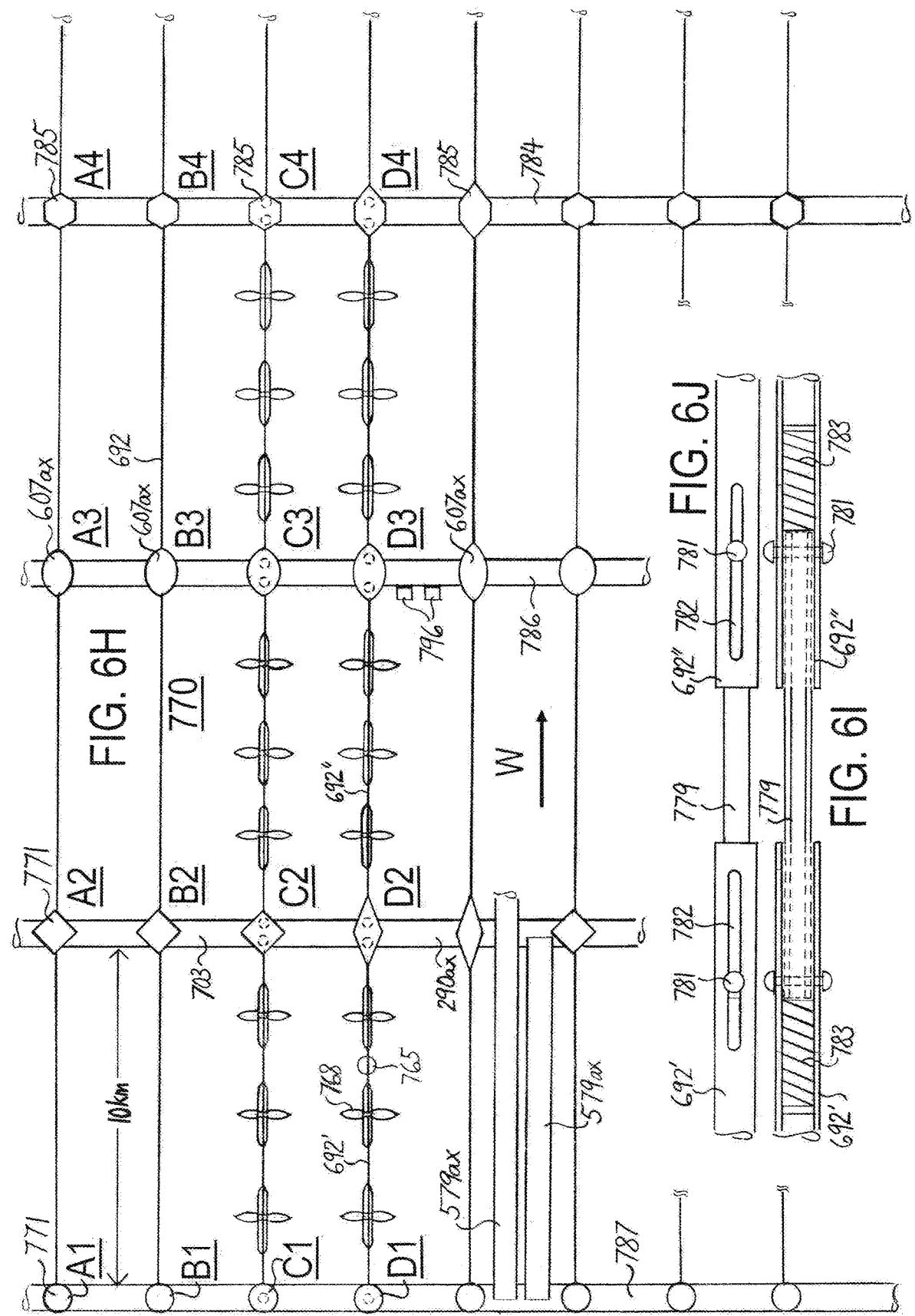

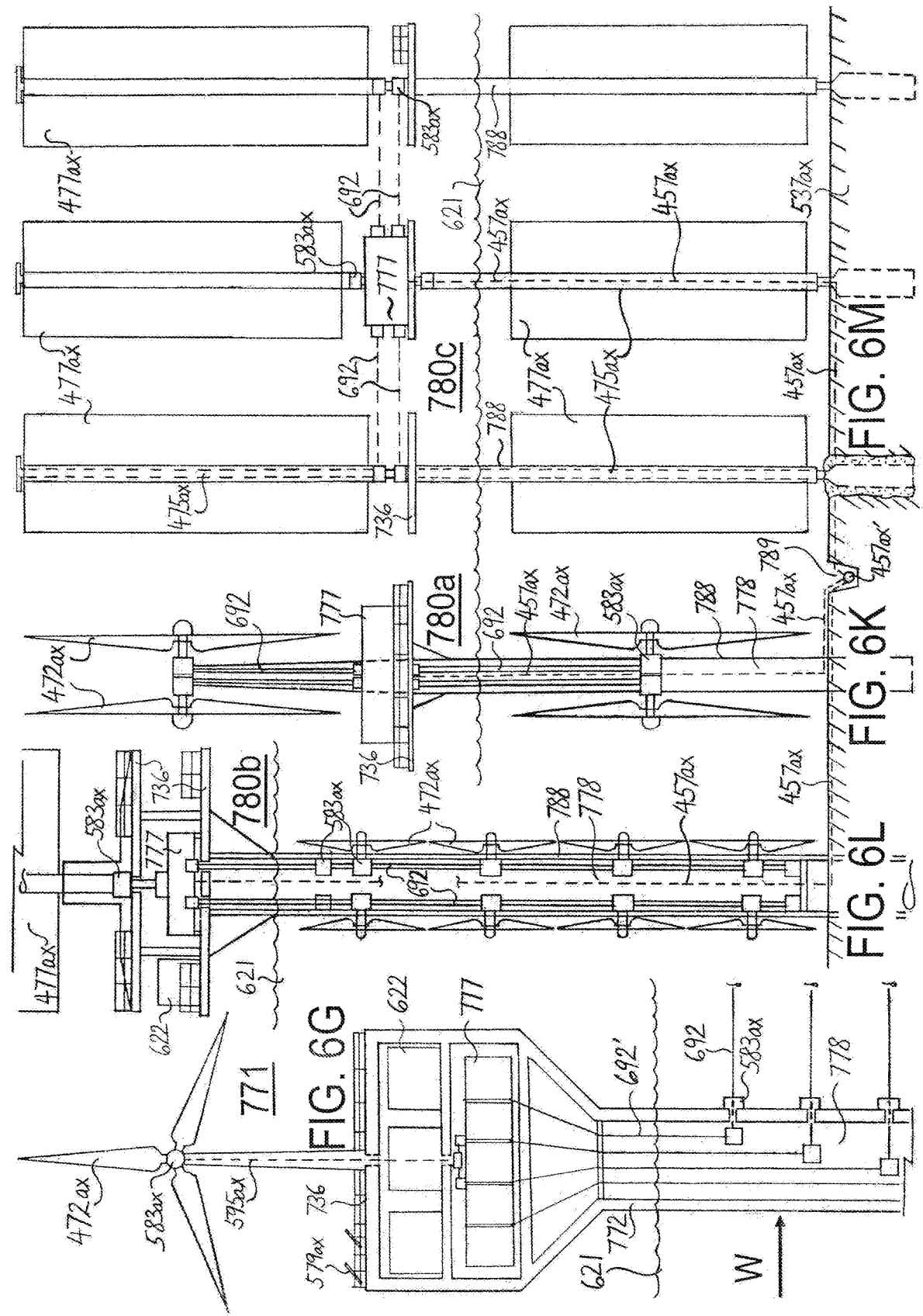

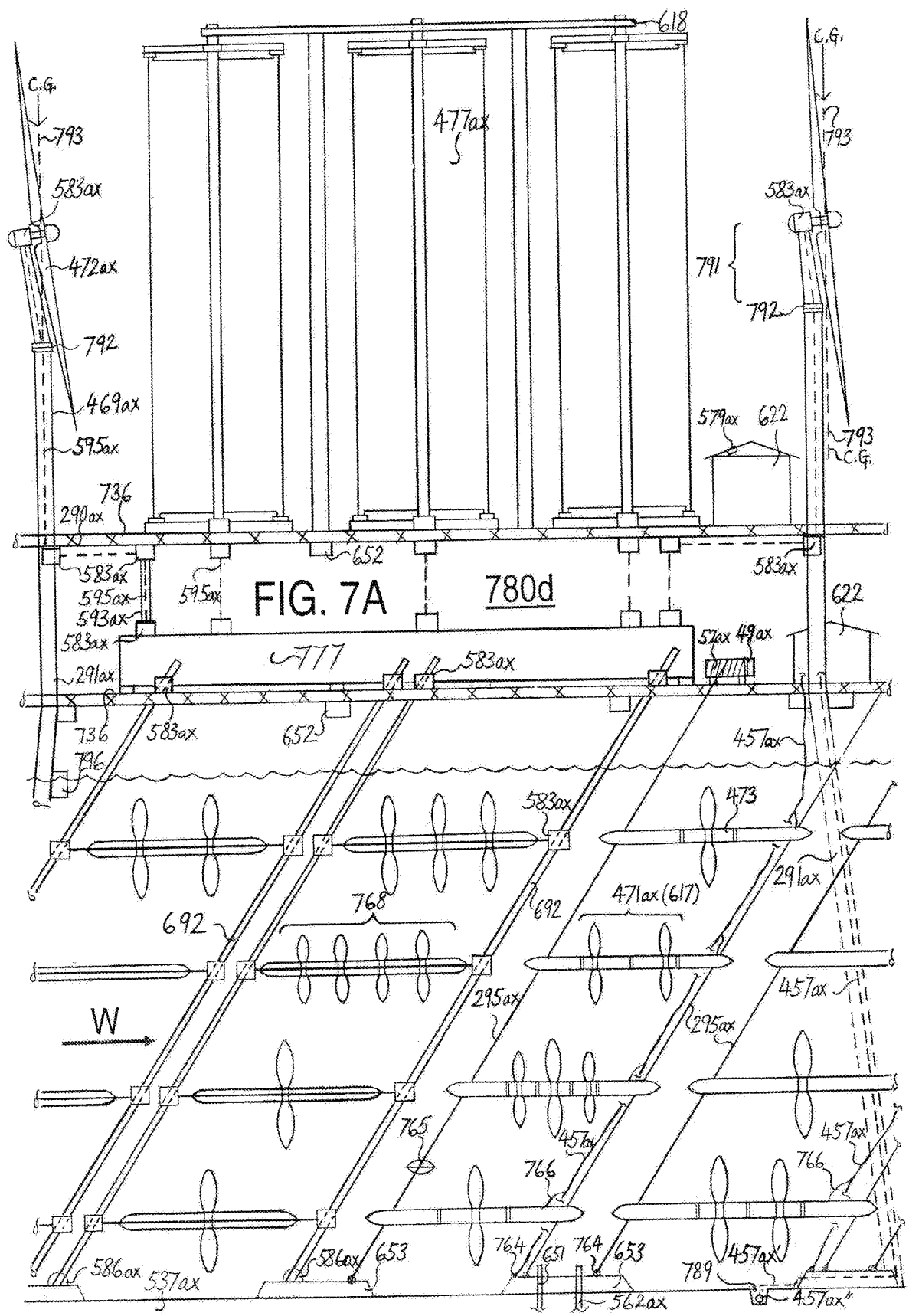

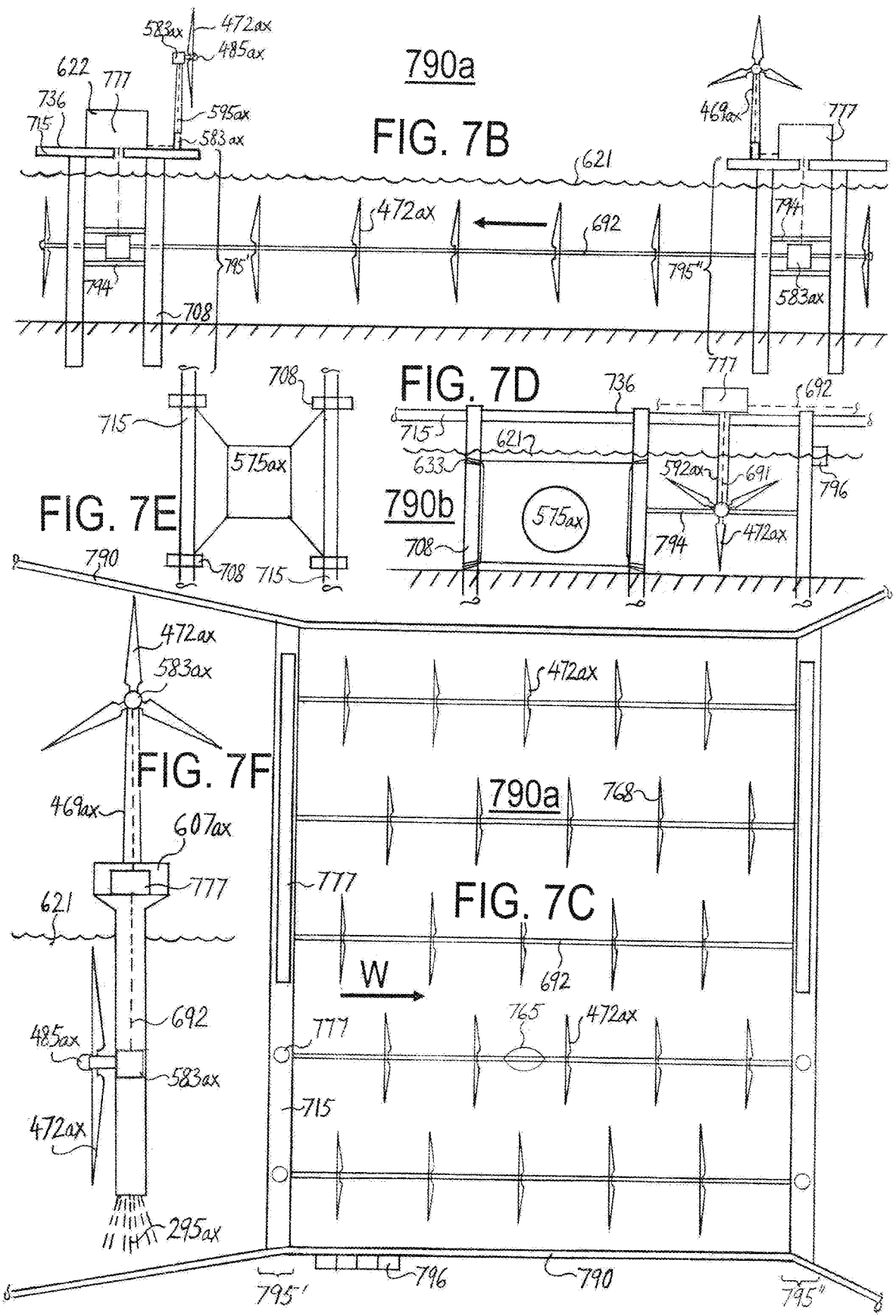

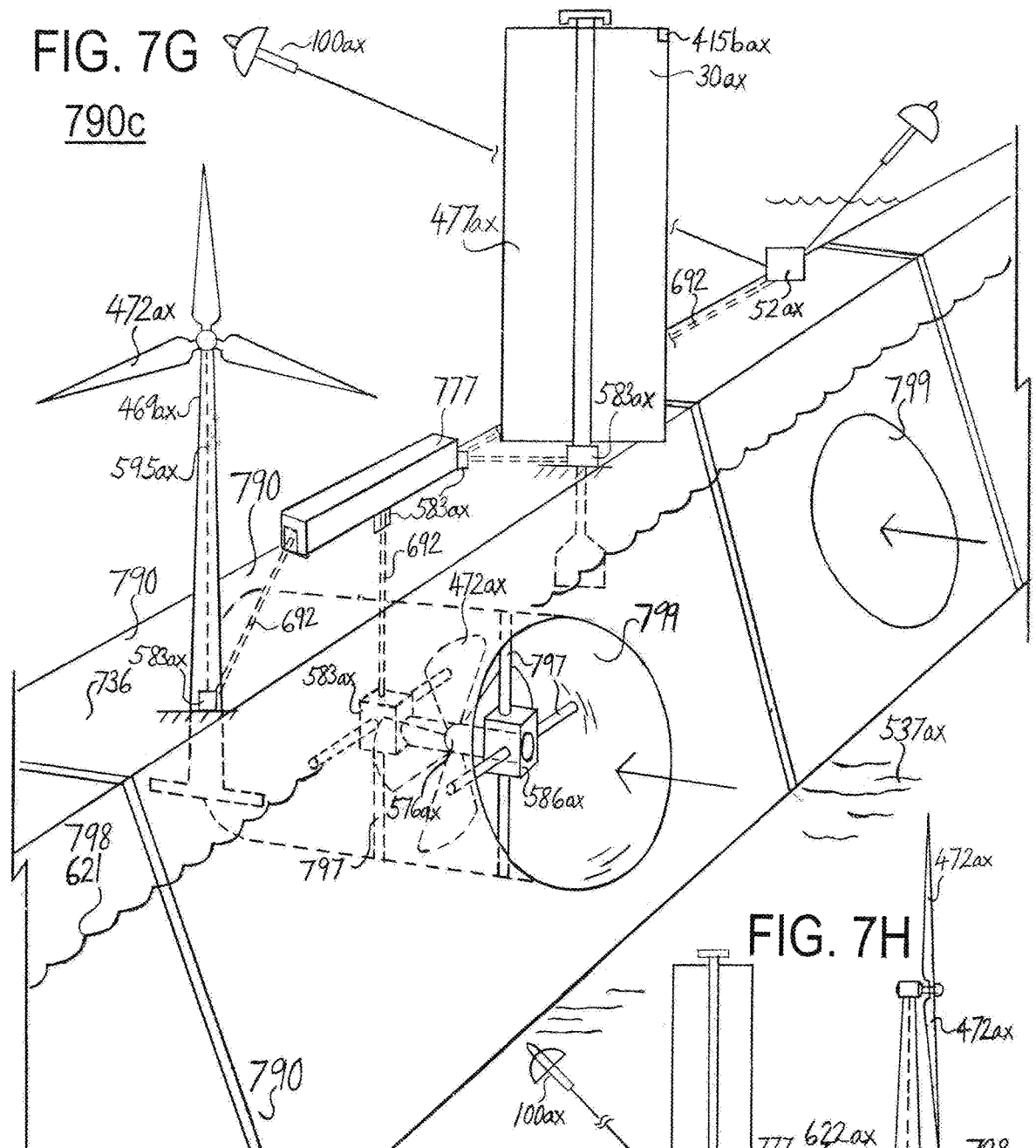
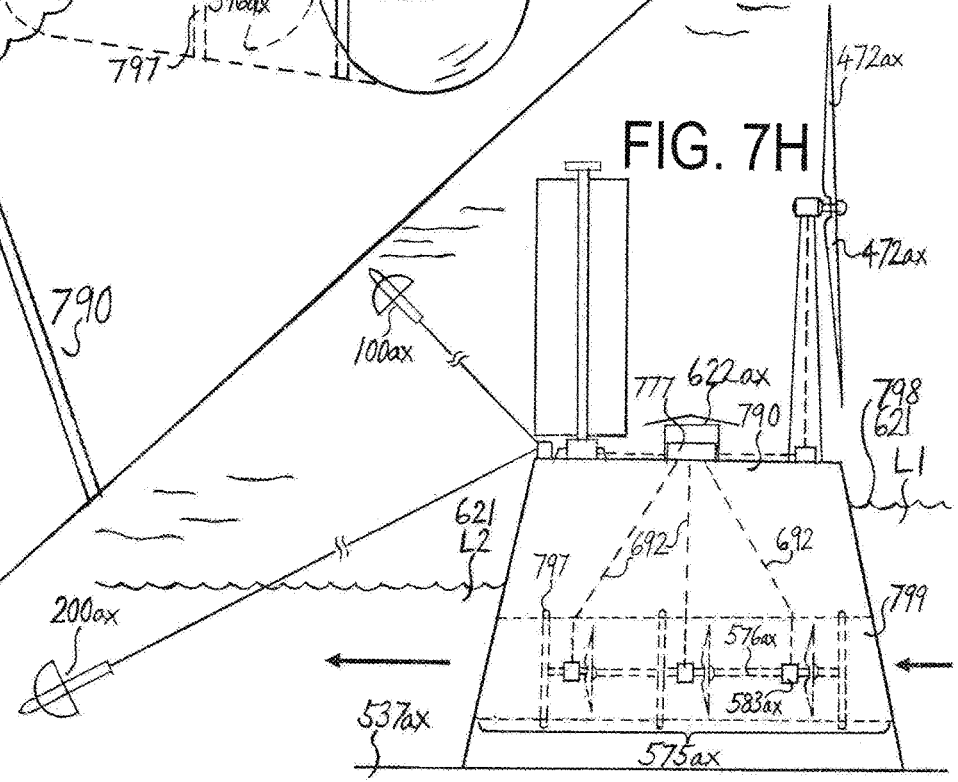

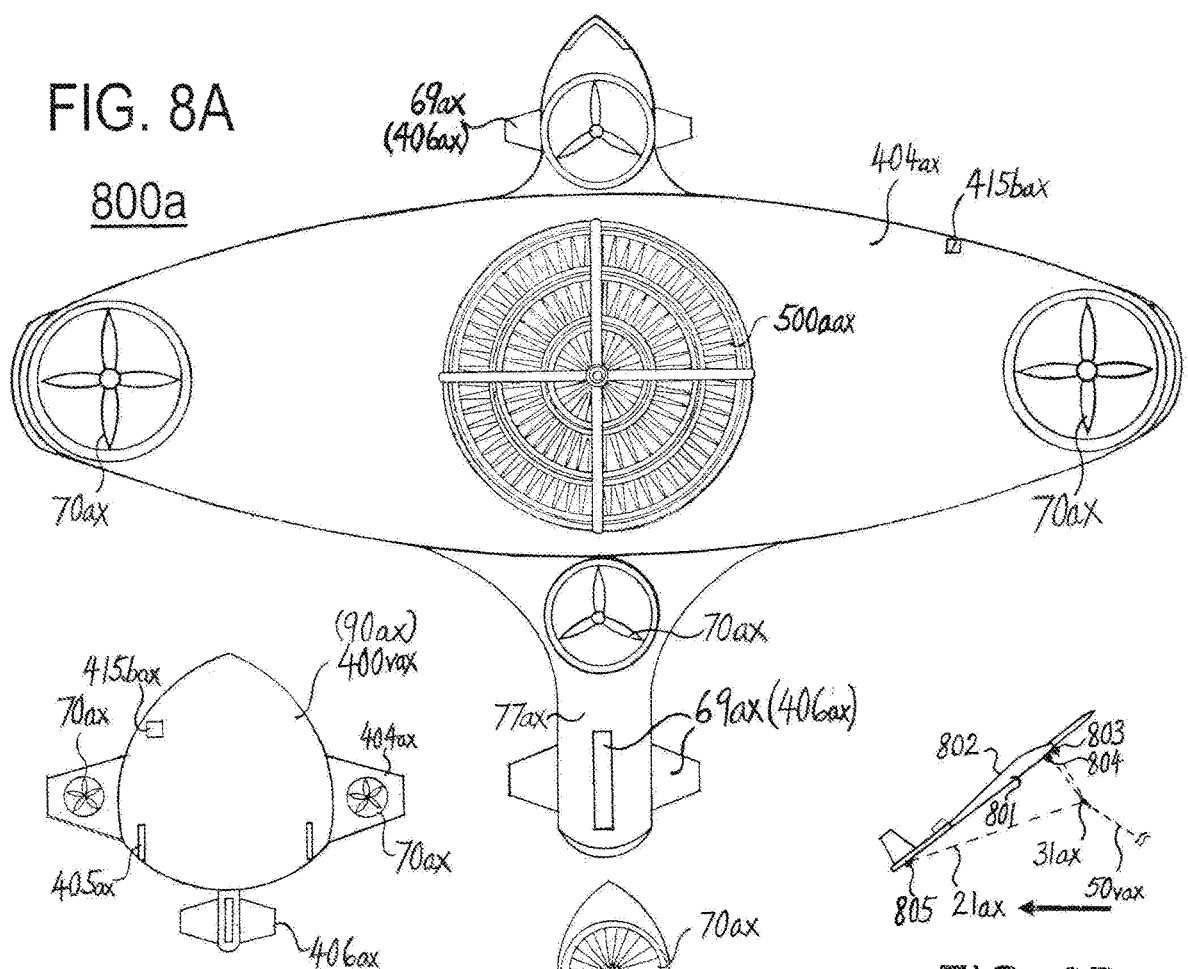
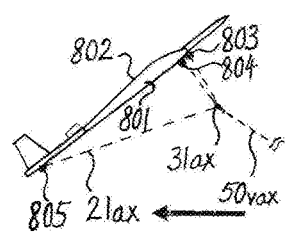
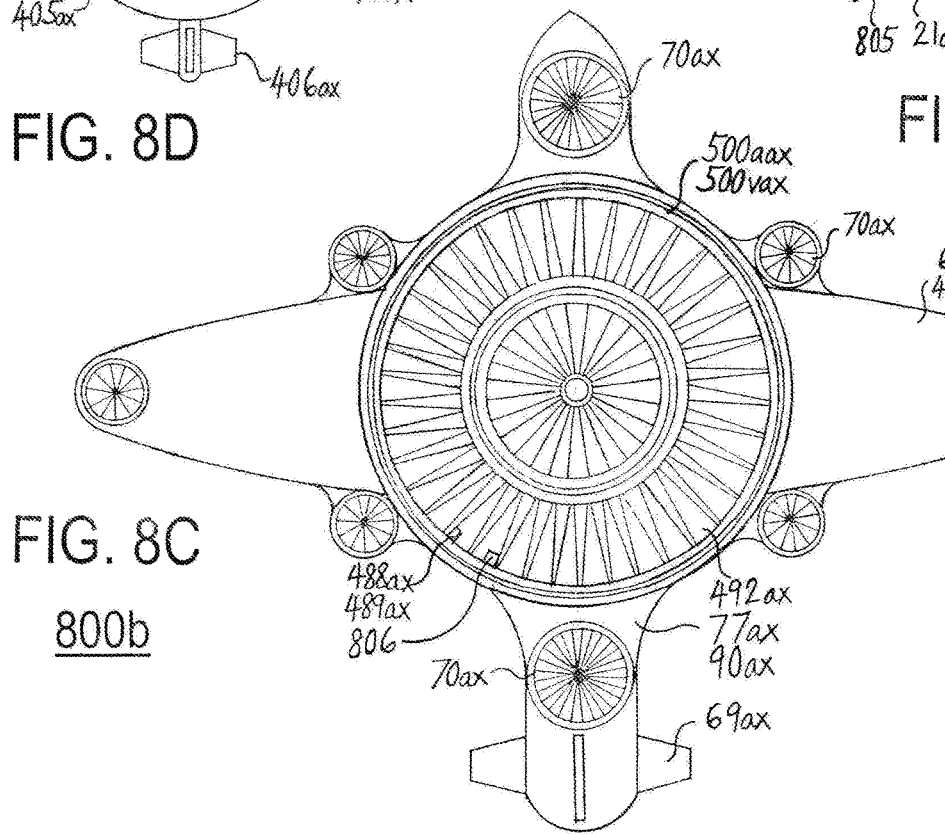

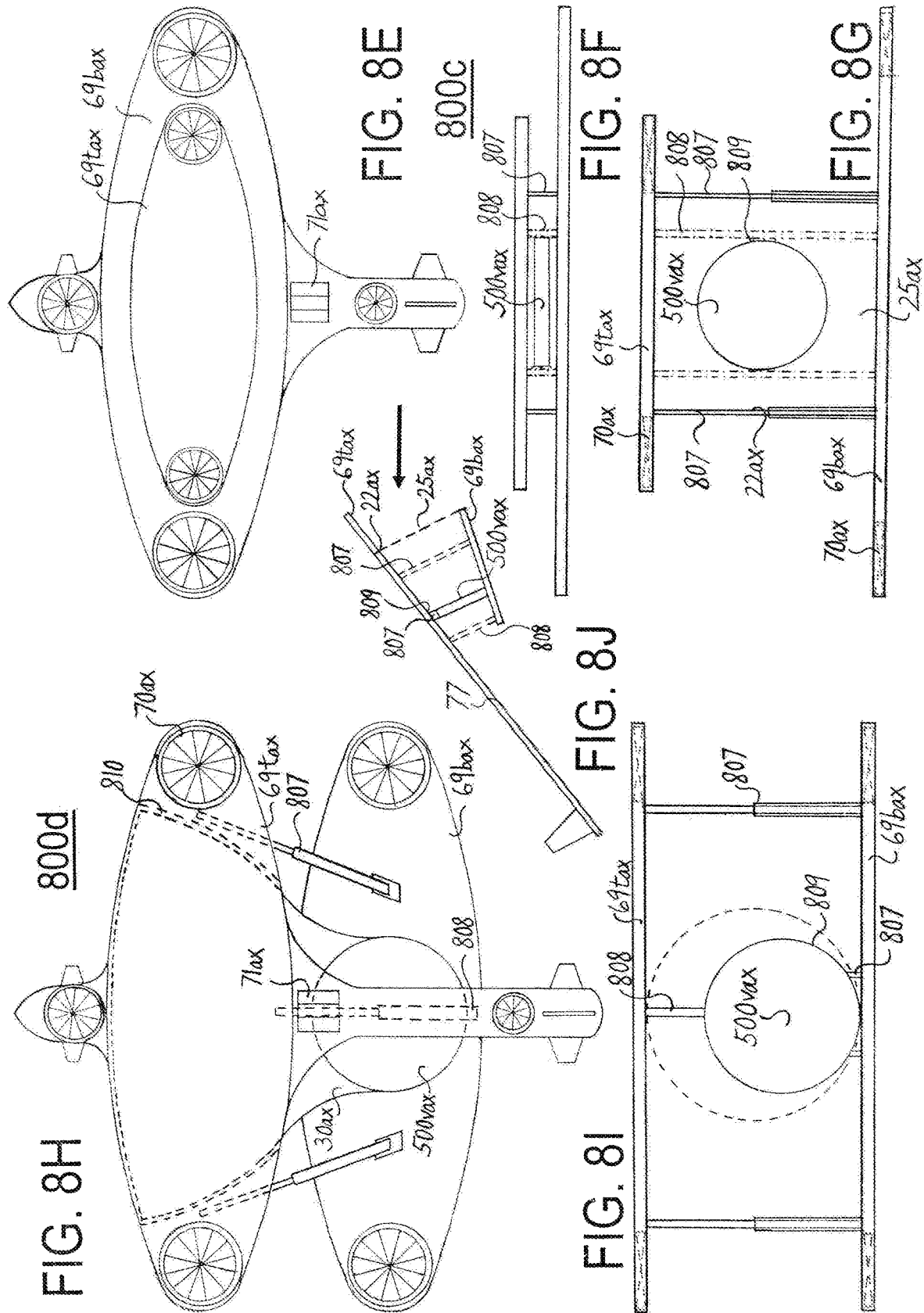

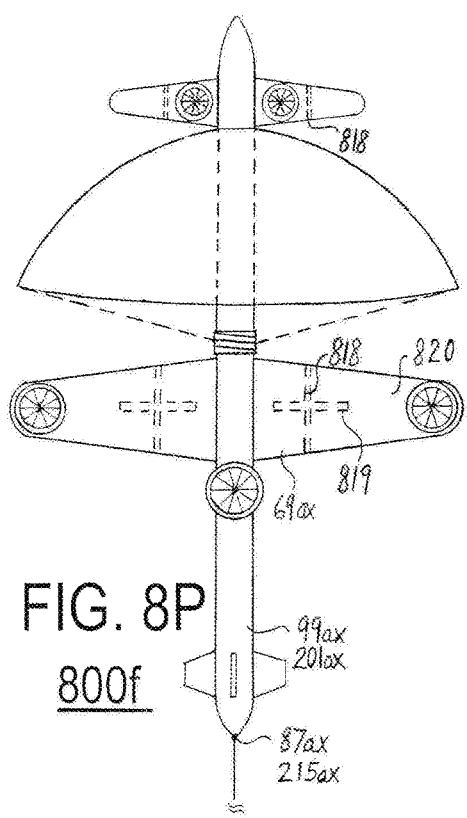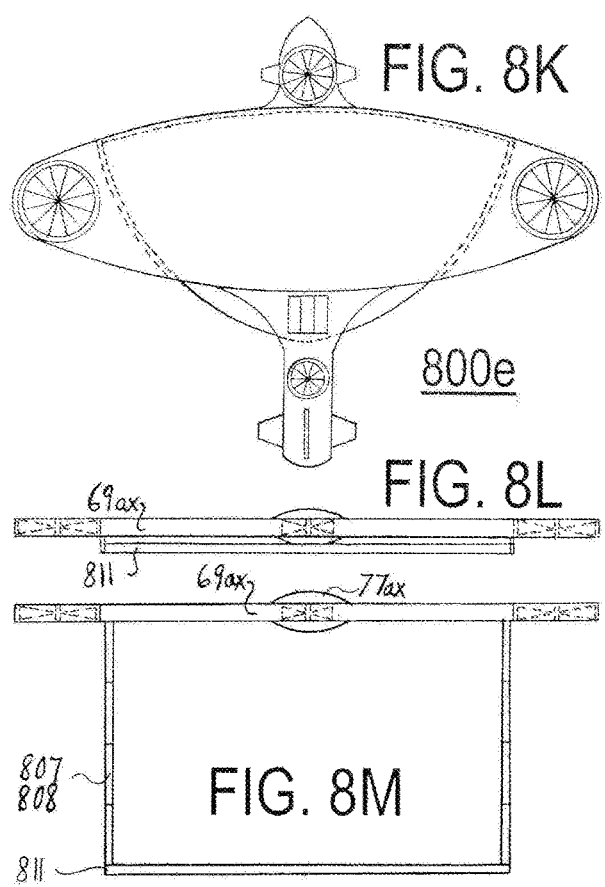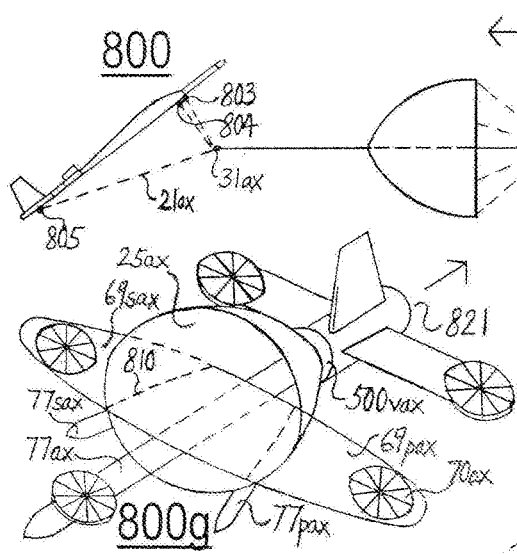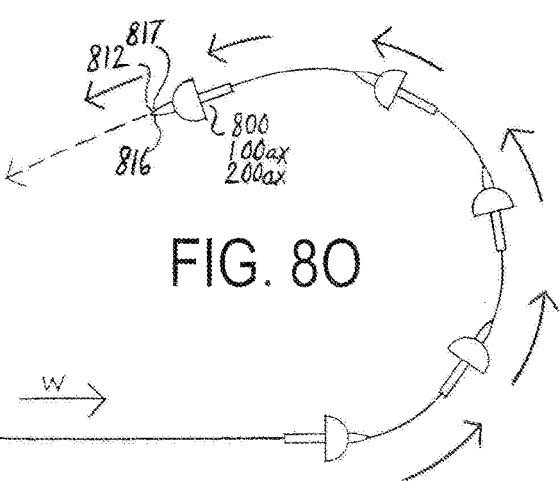

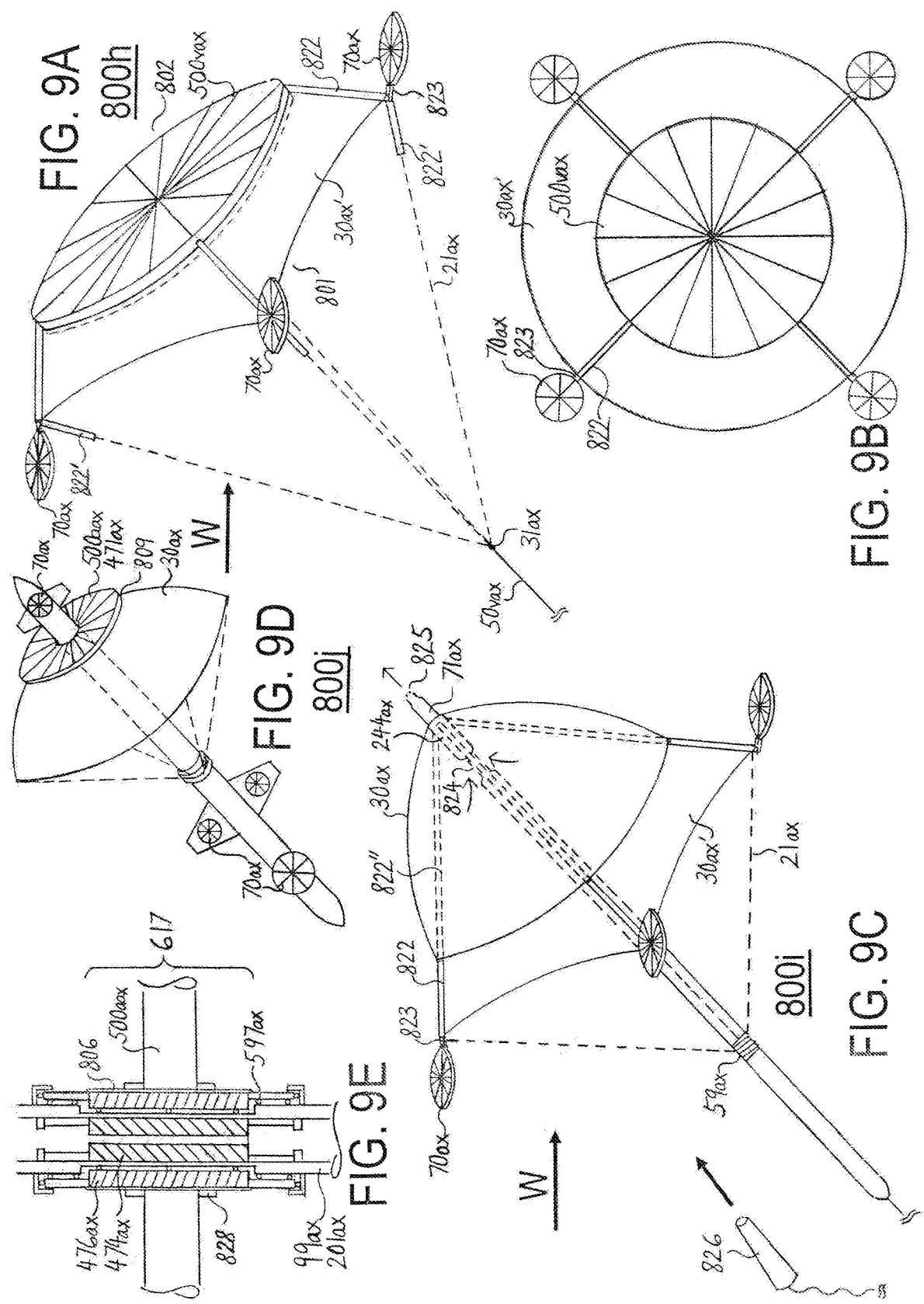

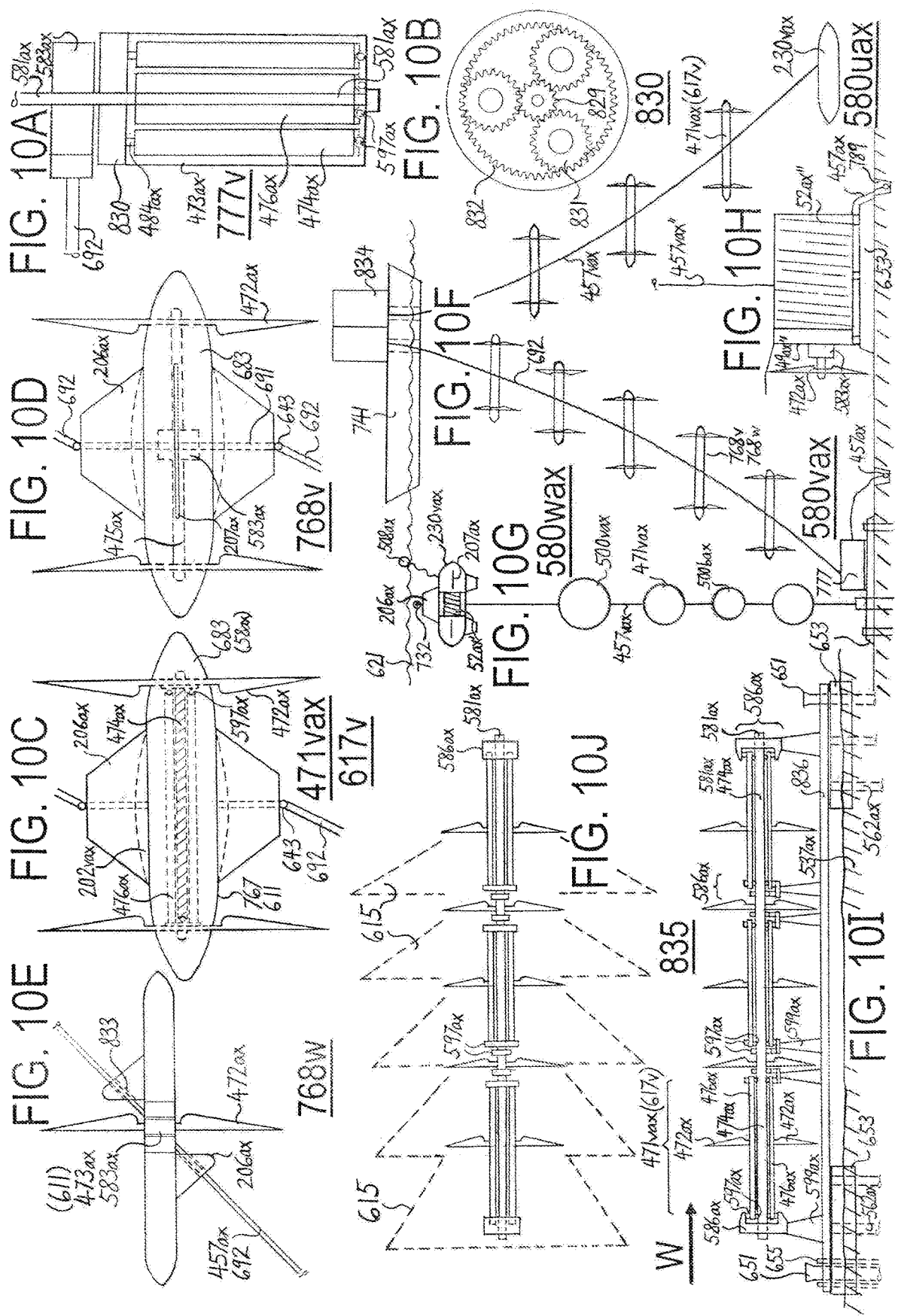

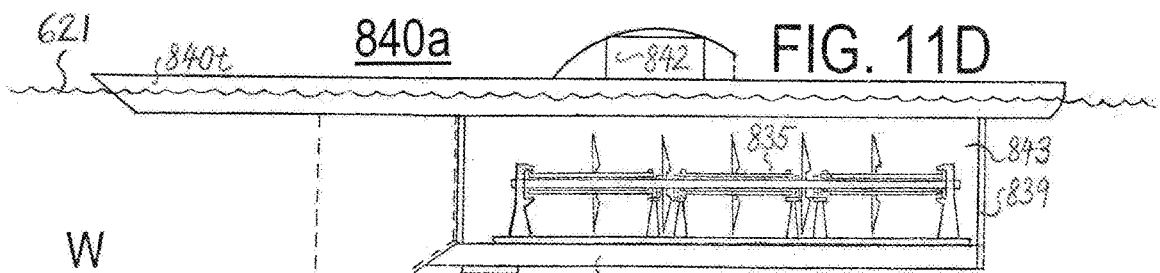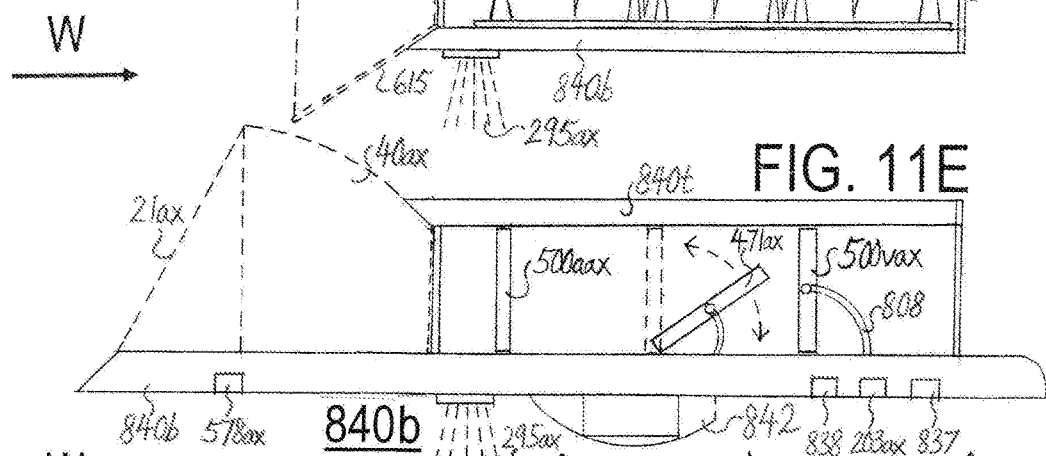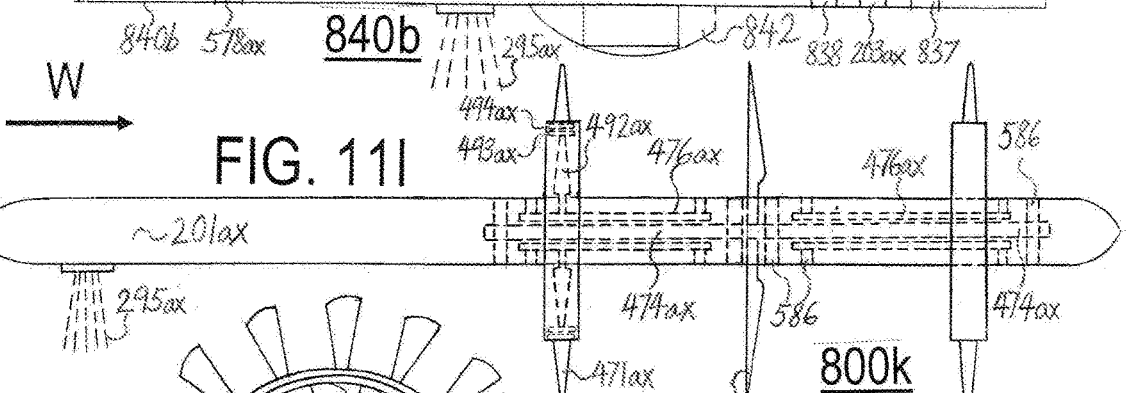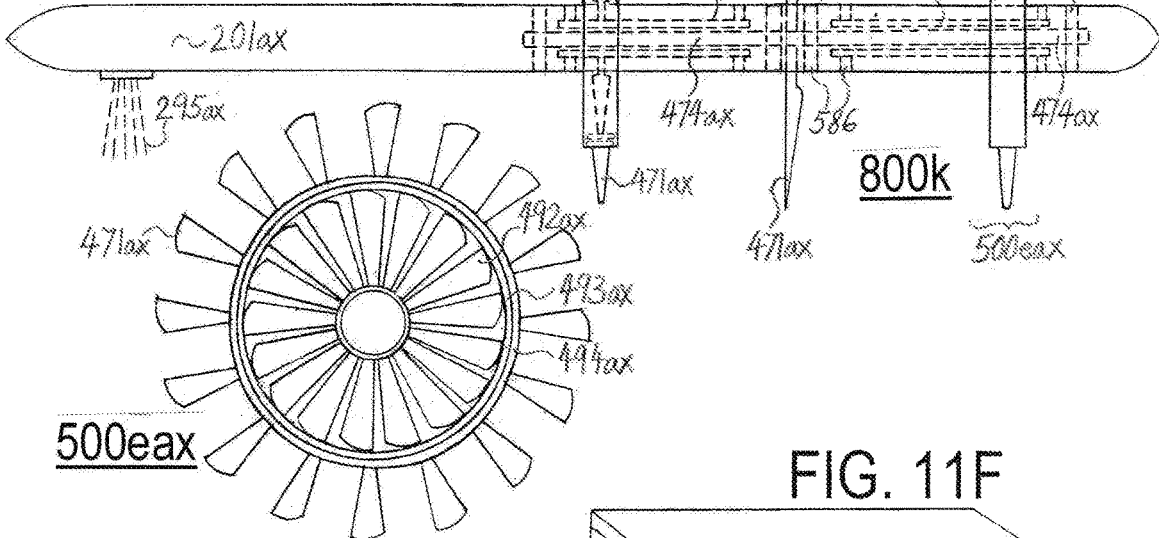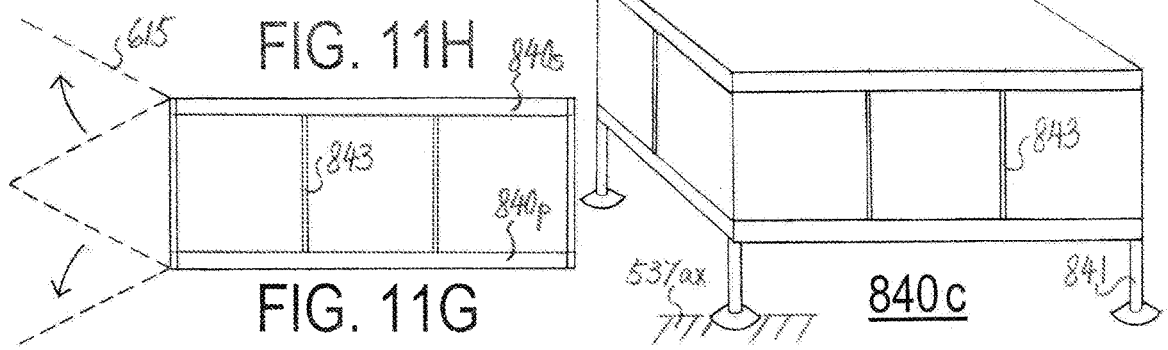

DRONE MOUNTED WIND TURBINE-GENERATOR SYSTEM application claims priority to Singapore Application 10201807027W filed Aug. 20, 2018 and Singapore Application 10201907453Y filed Aug. 14, 2019, the contents of which are incorporated herein by reference for all purposes.

FIELD OF THE INVENTIONS

Present invention provides some means in humanity's battles; war; our campaign for survival against Global Climate Change (GCC). Inventors may provide humanity with mitigating solutions such as: new tools; better equipment and systems. Enabling a transformation of our energy systems. From our present dirty fossil fuels based systems to non-polluting clean technologies. Mankind had 12 years to avoid the catastrophic effects of GCC (refer: UN-IPCC Report; Oct. 8, 2018). A million species faces extinction due to pressure created by humans (refer: UN Biodiversity Report, IPBES; May 6, 2019). However, whether we can overcome this "greatest challenge facing humanity." Whether our civilization can collectively survive beyond this critical test/or become extinct, too, maybe much more subjective. Much more dependent upon factors such as: political will-power; speed of deploying mitigating solutions; people's attitudes; conscious personal choices, decisions; climate leader-ship; climate activism, climate denialism; climate "murders", climate justice; etc. than mere physical devices.

Present invention discloses the utility purpose of deploying drones and adapting drone and robotic technologies for harnessing high altitude wind energy and deep sea ocean energy to generate renewable energy; displacing use of fossil fuels; mitigating the deadly effects of catastrophic global climate change. Ultimate Goal: safeguard and preserve our one and only life-support-system—Earth's Biosphere; in a habitable condition for all humans, animal and plant species to continue living! That the air we breathe, the water we drink remains clean and healthy; not poisoned by the toxic wastes we generate. Deploying robotic-drones to serve humanity. To generate clean energy; to preserve clean air and water; and a healthy planet Earth for future generations! That humans doesn't follow the dinosaurs—into extinction! Yeah, drones and robots! Drone-bots to the rescue of humanity! Drone-bots, new innovations, materials, systems and enabling means of the Fourth Industrial Revolution (4IR); controlled by means of computerized artificial intelligence (AI) may be used to save mankind from this self-inflicted ecological suicide! And in return generation of Ocean Renewable Energies to power the 4IR.

The harnessing of renewable "green" energy from the mass movement of naturally occurring fluid elements comprising wind and water (tide); the capture and transformation of this kinetic energy into useful mechanical energy by means of specialized apparatus and devices configured for producing electricity comprising: wind powered generators; tidal marine-hydro-kinetic powered generators. In particular wind energy comprising: high altitude wind energy; the Jet Stream. Marine-hydro-kinetic energy comprising: swift moving tidal currents and ocean gyres; the Gulf Stream. The engagement, capture, extraction, transformation and conversion of said fluid's kinetic energies into useful mechanical energy by means of specialized apparatus and devices. In one form, said fluids may be entrapped by means of shrouds, hoods, wingsuits $30ax$ and routed from an enlarged intake port through a smaller constricted outlet port connected to an energy conversion apparatus such as a turbine; a turbine-generator. Wherein, said fluid velocity may be amplified multi-fold; increasing system efficiency and productivity. Present and prior disclosures comprises: (a) Energy extraction systems: wherein kinetic energies present in fluids (wind; tidal-stream) may be systematically extracted and transformed into mechanical energies. (b) A reconfigured drive train may include a torque transmission system: wherein said mechanical energies may be conveyed from said energies extraction system in (a); to a generator. (c) Wherein said generator transformed the transmitted torque into useful electrical energies. Conversion of kinetic to mechanical to electrical energies.

Energy extraction systems of present invention may comprise single, integrated extraction-cum-direct-conversion units; for example: apparatus $617$; $471ax$; used the world over. This is the most efficient structural configuration. However due to location needs; components in nacelles requiring miniaturization (due to height and weight factors); and/or water-proofing (submerged at the bottom of the sea). Wherein, the drive-train of present invention may use similar systems such as apparatus $471ax$. Or, the drive train may optionally be reconfigured. Wherein, said split-unit system $600ax$ may be configured for: extraction-conversion of the kinetic energies comprising wind and tidal energies into mechanical torque; transmission of said torque to surface based systems; its final conversion into electrical energy by means of counter-rotational-generation. A structural configuration $600ax$ wherein renewable energies of wind and water currents may be extracted by means of a distributed and diverse energy extraction system (kinetic to mechanical energy); transmission of said mechanical energy by means of a torque transmission system $687$; into a centralized generation system consisting of: a split-unit segmented counter-rotational-generation system $777$; $585ax$; $590ax$ (mechanical to electrical energy). Such a split-unit system $600ax$ enables transmission of torque; from diverse sources comprising a multitude of energy extraction apparatus or devices ($100ax$; $200ax$; $400ax$; $500aax$; $600ax$; $700$; $740$; $800$;) into a specialty generator $777$; specifically configured to assimilate, accommodate, process and transform said diverse torque transmittal; by means of gearbox $583ax$; planetary gear $830$; shaft $692$; universal couplings $666$; into green electricity efficiently.

Such a system may be disadvantaged by inherent energy losses due to torque transmission (frictional losses). And may be slightly deficient (in efficiency) as compared to integrated extraction-cum-direct-conversion units $617$; $471ax$; $500aax$. However, such minimal losses may be easily made up for by increasing the capacity; or the number of energy extraction units. Structural advantages gained may include: centralized generation module $777$; larger energy extraction units e.g. bigger turbines mounted on the same structure (lighter); no need for expensive water-proofing; as the nacelles are now located on the surface (ground; deck-platform $736$); ease of access for periodic checks; maintenance and repair; enhanced occupational safety and health of crew, due to reduced exposure to hazardous work (minimized access to turbine nacelles located at the top of tall towers); lower operating costs. Ground or surface based generation systems may be configured to be: heavy-duty; huge and rugged; as compared to the much more delicate and light-weight generation components (turbine nacelles $473$) lofted into great heights by huge-tall cranes; located at the top of towers $469ax$. Or, smaller waterproofed nacelles located at the bottom of the sea and ocean.

In another structural improvement, moisture sensitive generating elements: 474ax; 476ax; may be encased; enwrapped; embedded in; with a layer(s) of water repellent; water-proof materials comprising: plastics; composites; ceramics; glass; fiber-glass; carbon-fiber; Kevlar; Dynnema; etc. Optionally, the structural body frame-work of a generator may be used as an additional layer of separation. Effectively and physically segregating the more sensitive rotor coils 474ax from the less sensitive rotor magnets 476ax; though the mechanisms remains in close proximity to each other. The magnetic field penetrates through the thin layer(s) of water repellant materials into the coils beneath. The most important goal: isolating; segregating; separating said generating elements 474ax and 476ax from contact with: ambient moisture; high humidity; water.

The use of specialized drones; drone-robots integrated with robotic-mobility capabilities configured for the job of executing specific tasks required of them; for the effective functioning of the energy extraction farms/complexes. Doing work; jobs; tasks on apparatus and equipment located at great depths in the deep sea and oceans; and at high altitudes in the aerial environment. Use of Unmanned Aerial Vehicles (UAVs); Unmanned Underwater Vehicles (UUVs) and Remotely Operated Vehicles (ROVs); integrated with specialized robotic limbs 522ax; tools; equipment; appliances; etc. Armed with autonomous capabilities supported by means of computerized cognitive Artificial Intelligence (AI) and decision making for the independent execution of assigned tasks by said integrated drone-robot units (drone-bots); configured to harness the kinetic energy of high altitude winds; and tidal energies of the deep sea and the ocean for doing useful work. A method, system, equipment, apparatus, techniques and a drone ecosystem configured with vertical scalability and a quantum leap in the generation of renewable green energy: electricity, in comparison with existing systems at a minimized environmental and aesthetic cost.

BACKGROUND OF THE INVENTIONS

Present methods of harnessing wind energy by means of: kites, wind mills, wind turbines, kytoons, airfoils, etc.; use of sails on boat, ship or sledge for traction is known; as is the capture of water energy by means of: water mills, water wheels, turbines; balloons mounted on the sea-bed, floatation based devices, etc.; in converting the kinetic energy of wind into mechanical energy to do useful work: mills to grind flour, pump water, etc. including aero-electric power and hydro-electric power generation. However, some devices like: wind mills, wind turbines may be deficient and self-limiting due to (i) the minimized surface area for capture of the kinetic energy of the fluid medium as evidenced by the limited size and number of turbine blades, rotors, propellers, spokes; sails, etc. that may be affixed to an apparatus; (ii) the extremely short, momentary, contact time between the drive surface and the moving fluid medium providing the kinetic energy lasting a few seconds; and (iii) harnessing the kinetic energy in an ad-hoc randomized manner. Harnessing the energies of mother-nature in quantities huge enough for global consumption by means of utility scale generation plants/or farms; may require different approaches and solutions from conventional methods, systems and apparatus presently available. In particular high altitude wind energy, the Roaring 40's, the Furious 50's, the Shrieking/or Screaming 60's, the Jet Stream (exceeds 92 km/h; up to 398 km/h). The low altitude sector (800 m to 1 km) of wind energy typically harnessed by wind turbines mounted on fixed towers comprises about 2% of the total global wind power. Whereas 98% of the global wind energy lies out of reach at a height of above 800 meters; and may be extracted by means of airborne wind energy systems operating above this altitude. Present invention discloses methods and systems for using a bagged energy collection system wherein tethered windbags and water-bags may be used in combination with ducted turbine-generators for producing green electricity.

SUMMARY

Present invention discloses systems, methods and techniques of adapting and transforming the bodies of 99ax and 201ax of HAV-100 and HUV-200 into self-generating apparatus with the integration of turbine units powered by wind and water. The windbags 30 and water-bags 40 function as originally configured; enabling the engagement and conversion of energies in wind and tidal currents into useful electrical energy. The use of fixed solid state shrouds, hoods, ducts; casings affixed externally to turbines or used as a housing structure is known. Penstock 575; or turbine housing 615 of present invention may also be used for: protection of turbines; and to keep wildlife out of the turbine blades. But most importantly, for improved efficiency by confining the high velocity fluid flow created by means of the equipment within the system; not spilt or lost to the surroundings.

Present invention discloses the use of windbags 30ax and water-bags 40ax; an apparatus/or device configured to work and act as: (1) a fluid collector for the capture and entrapment of moving fluid currents. (2) Configured to create the magnifier effects; for the multiplication and amplification of the inherent kinetic energy/or velocity in wind and water currents. Wherein said bagged apparatus work as a flow velocity magnifier; amplifier; enhancer; aggregator; congregator; a concentrator of kinetic energies. The amplification and transformation of this captured kinetic energy from a low speed to a much higher speed. Such that said bagged apparatus 30ax; 40ax may be used in tandem with the devices of present invention; or existing devices and appliances comprising turbines; or other energy conversion apparatus for the purpose of: (3) Enabling a multi-fold increase in efficiency and productivity in the generation of renewable energies.

BRIEF DESCRIPTION OF THE DRAWINGS

Preferred embodiments of the present invention will now be described with reference to the accompanying drawings wherein:—

FIG. 1A shows a perspective side view of an integrated wind energy capture and direct conversion apparatus 610a. FIG. 1B shows a parallel apparatus of FIG. 1A. An integrated tidal energy capture and direct conversion apparatus 610b.

FIG. 1C shows a wind energy amplification apparatus 670; used with a hooded direct conversion turbine generator. FIG. 1D shows a side view of a wind energy amplification apparatus; used with vertical axis turbine generators. FIG. 1E shows a perspective view of FIG. 1D. FIG. 1F shows an enlarged view of FIG. 1D. FIG. 1G shows a split unit tidal energy extraction; transmission; and generation system 620.

FIG. 2A shows a circular shaped inlet port 25ax. FIG. 2B shows an oval shaped inlet port. FIG. 2C shows an ablong shaped inlet port. FIG. 2D shows an inverted oblong shaped inlet port of FIG. 2C. FIG. 2E shows a rectangular shaped inlet port. FIG. 2F shows a square shaped inlet port. FIG. 2G shows a semi-circular shaped inlet port. FIG. 2H shows a trapezoid shaped multi-sided inlet port. FIG. 2I shows a bag with an enlarged inlet port.

FIG. 2J shows a floating windbag system 630a. FIG. 2K shows a dual purpose floating—submersible water-bag system 620b cum windbag system 630b with integrated turbine-generators 611. FIG. 2L shows a large underwater rectangular shaped water-bag 40ax with integrated turbine-generators 611; mounted on vertically inclined beams and pillars. FIG. 2M shows an air bellows-clamping apparatus 633.

FIG. 3A shows the perspective view of an underwater system 620d. FIG. 3B shows a side view. FIG. 3C shows a plan view. FIG. 3D shows a variant apparatus 644; while FIG. 3E shows a variant apparatus 619; both used in operating and controlling the inlet port 25ax size.

FIG. 3F shows a the use of detachable drilling pipes 650 with permanent drill pipes 660 in securing system 620d into position. FIG. 3G shows a permanent subsea foundation 660 for anchoring apparatus 620d.

FIG. 3H shows the side view of a windbag system 670 with a split unit configuration. FIG. 3I shows a plan view. FIG. 3J shows the rear view of 670 with the plurality of ducted fluid outlet ports 614.

FIG. 3K shows an integrated underwater turbine-generator system 690 combined with a ballast tank 578ax. FIG. 3L shows an automated ballast control system 686. FIG. 3M shows a sectional view of helical shaped screw turbine 613.

FIG. 4A shows a submerged split unit marine turbine-generator system 700 and supporting ecosystem. FIG. 4B shows a sectional view 4B-4B of system 700; FIG. 4C shows a variant configuration of FIG. 4B. FIG. 4D shows a side view of renewable energy farm 710; while FIG. 4E shows a plan view.

FIG. 4F shows a side sectional view; while FIG. 4G shows a perspective view of apparatus 711. FIG. 4H shows cross-section 4H-4H of 711. FIG. 4I shows a front view of apparatus 712. FIG. 4J and FIG. 4K shows customized apparatus 730; for servicing and repair of turbine-generator 700.

FIG. 5A shows a split unit ocean energy conversion system 740; comprising a multitude of differing drive units used for extraction of ocean renewable energies of wind and tidal power; transmission of mechanical energy harvested; to the centralized driven unit. FIG. 5B shows a variant configuration of system 740.

FIG. 5C shows the combined use made of a variety of tidal and wind energies extraction apparatus for powering counter-rotating generators 585ax; 590ax. FIG. 5D shows mechanical torque transmission by means of: belt and pulley wheels apparatus; and a roller chain and sprocket apparatus.

FIG. 5E shows the plan view; while FIG. 5F shows the frontal view of a variant configuration of tidal turbines and horizontal axis wind turbines mounted on turn-tables on floating platform 740v. FIG. 5G shows an integrated tidal turbine-generator 611.

FIG. 5J shows the frontal view; while FIG. 5K shows the side view of a tidal energy farm. A flotilla of underwater turbine-generators 700 suspended in the ocean at various depths may be supported by means of anchoring lines affixed to the seabed; and to a surface floating platform. FIG. 5L shows turbine-generator 700 attached to; and held in position by lines 295ax.

FIG. 6A shows an ocean energy farm 770 comprising a multitude of turbines attached to extended shafts running between two structural bodies 771; 607. The extended shafts driving two generators at either end. Or, both ends. FIG. 6B shows a turbine enclosed by floats. FIG. 6C shows details of ring 774. FIG. 6D shows details of cross-section 6D-6D. FIG. 6E shows details of flexibly connected turbine blades 472ax.

FIG. 6F shows a variant configuration of counter-rotating generator 777.

FIG. 6G shows a perspective view of an enclosed marine structure 771. FIG. 6H shows a plan view of system 770; comprising structures 771 affixed to seabed 537ax. Multiple interconnected marine structures 771 may be arranged to maximize harvesting of ocean renewable energies comprising: solar; wind; tidal; wave energies. FIG. 6I and FIG. 6J shows a flexibly extendable and retractable extended shaft 692.

FIG. 6K shows a variant structure 780a configured with a plurality of horizontal axis wind and tidal turbine 472ax mounted on a monopile 788; for use in shallow water. FIG. 6L shows a variant structure 780b for use in deeper-waters. FIG. 6M shows a plurality of vertical axis tidal turbines 477ax and wind turbines 477ax. Mechanical torque derived from said multitude of turbines 472ax; 477ax may be transmitted by shafts 692; combined together to drive a single centralized generator 777; on surface deck 736.

FIG. 7A shows a combined solar-wind-tidal-wave energies generation platform 290ax. The collected torque may be used to power a surface based generator 777. FIG. 7B and FIG. 7C shows the side; and plan view of a marine; hydro; riverine renewable energies farm 790a configured with fluid diversion walls 790. Tidal flow channeled by means of tidal dykes/or sea fences 790 may increase tidal velocity; for driving vertically; or horizontally aligned generators 777. FIG. 7D shows a perspective view; FIG. 7E shows a plan view of a structure comprising a plurality of vertical and horizontal beams erected for extraction of ocean energies. Structural beams maybe integrated with ducted penstock 575ax; tidal turbines 472ax. Torque generated may collectively be transmitted to power generator 777.

FIG. 7F shows a floating Spars structure 607ax integrated with wind and tidal turbines 472ax; their output (torque) combined for powering generator 777. FIG. 7G shows a perspective view; FIG. 7H shows a sectional view of a sea dyke 790; creating a tidal lagoon 798. Turbines in tunnels 799 converts tidal energies to mechanical; to electrical energies (777).

FIG. 8A shows a plan view; FIG. 8B shows a perspective side view of: an aerial drone 800a integrated with a wind powered turbine-generator 500aax. FIG. 8C shows a drone 800b of FIG. 8A and FIG. 8B integrated with a variant ultra-light-weight turbine-generator 500vax. FIG. 8D shows a variant self-propelled aerial drone 400vax integrated with a plurality of additional motorized turbo-fans 70ax.

FIG. 8E to FIG. 8G shows a morphing drone 800c of FIG. 8A with dual sets of wings 69ax; (404ax). One larger set of wings 69bax at the bottom; with one smaller set of wings 69tax stacked above in an over-under configuration. Wind bag 30ax may be mounted between twin wings for traction-generation of electricity alike HAV-100ax. Or integrated with a high velocity turbine 500aax; 500bax; 500cax; 500dax; 471ax.

FIG. 8H to FIG. 8J shows a variant morphing drone 800d of FIG. 8E to FIG. 8G with dual sets of similar sized wings 69ax. In flight the bottom set of wings 69bax may be flipped backward; towards the rear. At cruising height, wings 69bax may be flipped forward and downward (over-under) forming a bi-plane's normal configuration. FIG. 8J shows the side view of drone with twin set of wings configured to form a tapered, funnel, "V"-shaped aerial apparatus (fore to aft) with turbine generator 500vax inside.

FIG. 8K to FIG. 8M shows a drone 800e configured with a rectangular shaped inlet port 25ax for traction-generation of electricity. FIG. 8N shows a variant plain drone 800 leading a series of windbags or water-bags 76ax; 222ax for traction-generation of renewable electricity. FIG. 8'O' shows a master drone vehicle leading a series of drones during the depowering phase before the retraction phase (return back to base).

FIG. 8P shows a variant drone vehicle 800f; wherein vehicle 100ax; 200ax may be modified with improved propulsion and lift generation means for better efficiency. FIG. 8Q shows a variant drone 800g (a hybrid airplane-rocket shaped body) configured with a shrouded turbine-generator 500vax located aft.

FIG. 9A to FIG. 9B shows a variant drone apparatus 800h wherein, a self-propelled turbine-generator unit 500vax may be configured with a shrouded wingsuit 30ax at its periphery; multiple turbine propulsion units 70ax mounted on struts 822. FIG. 9C shows a variant drone apparatus 800i of FIG. 9A and FIG. 9B wherein, a self-propelled traction-generation unit HAV-100a may be similarly configured. Turbine-generator 500vax may be replaced with a windbag 30ax; water-bag 40ax for traction (drive unit 51ax) of a surface mounted driven unit (generation) 55ax.

FIG. 9D shows a variant drone apparatus 800j of FIG. 9A to FIG. 9C wherein, said turbine-generator 500vax; windbag 30ax; water-bag 40ax; may be mounted on a rocket-shaped body 99ax; (torpedo-shaped body 201ax;) configured with airplane wings 69ax; hydroplanes 205ax; and propulsion units 70ax.

FIG. 9E shows a specially configured turbine-generator 500aax; 500bax; of FIG. 9D wherein, said electrical and magnetic elements may be waterproofed and externally sealed in a robust layer of water resistant composite materials. Such protective coatings may be used with electrical generation components of underwater drones; or aerial drones which may be exposed to high moisture content.

FIG. 10A to FIG. 10B shows a counter rotating generator 777v configured with a planetary gears apparatus 830; for conversion of torque; from one input into two output. FIG. 10C to FIG. 10E shows a plurality of underwater tidal turbines configured for direct generation of electricity; generation of torque and its transmission. FIG. 10F to FIG. 10H shows differing arrangements for deploying said plurality of floating tidal turbines. FIG. 10I shows a bottoms based tidal turbines system 835 affixed to seabed. FIG. 10J shows an arrangement of shrouds 615v for concentrating tidal flow into system 835.

FIG. 11D to FIG. 11G shows the integration of turbine generators 500aax; 835; with pontoon bodies 840. Enabling said turbines to be deployed from the top to the bottom of the water column. FIG. 11H and FIG. 11I shows the use of turbine-generator 500eax with HUV-200vax.

DETAILED DESCRIPTION OF THE INVENTIONS

Figure 5H:
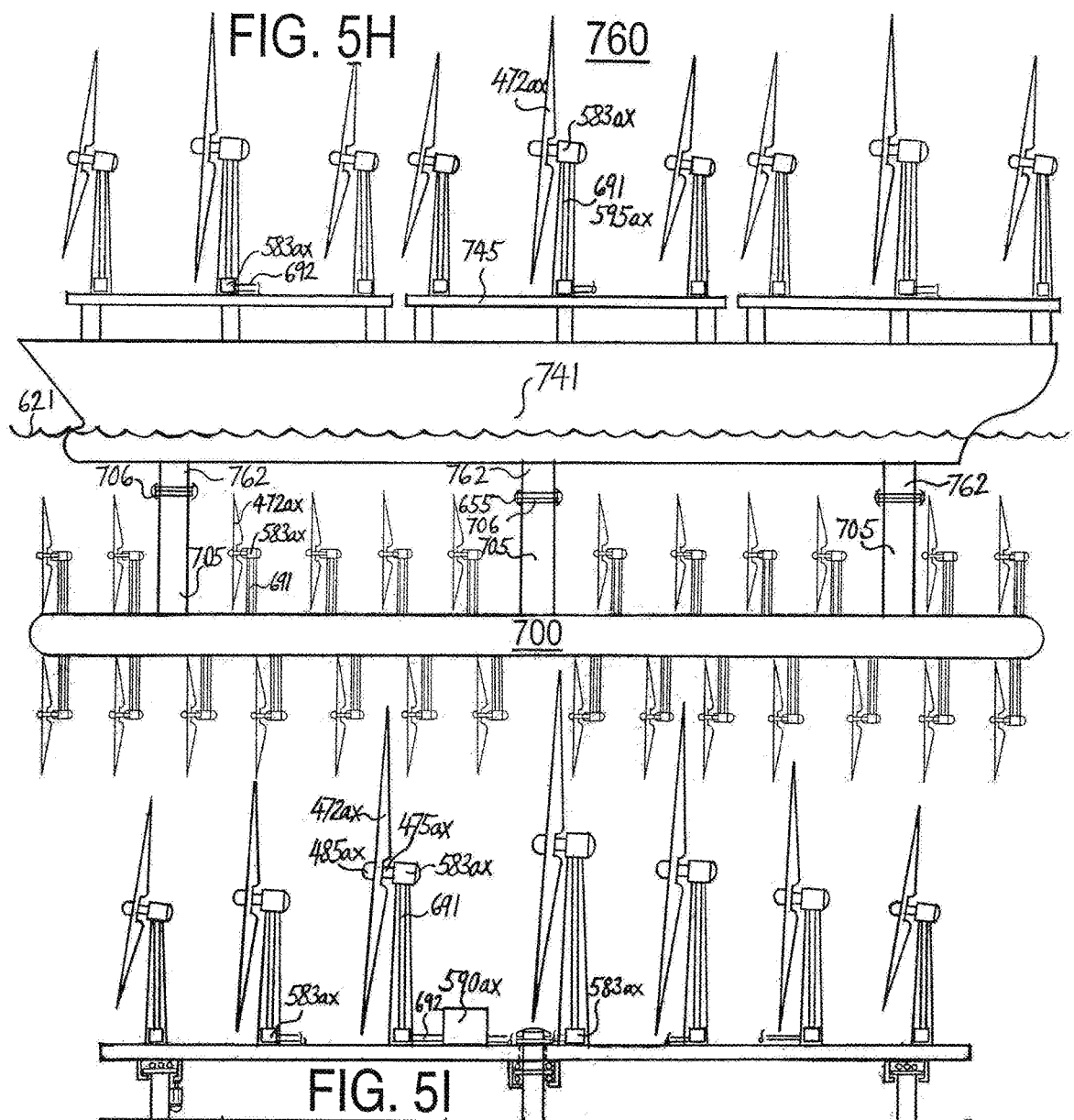
FIG. 5H shows the side view.

The structural configuration, concept, method and system of providing bagged drone bodies integrated with turbines for harnessing and extracting the energies contained in a moving air (wind) and water current for the generation of electricity; is herein disclosed. Transforming its kinetic energy into mechanical and then electrical energy by means of a turbine. In this specification, all reference numbers made to previous disclosures (in parent patent applications) are denoted with the alphabets "ax".

FIG. 1A illustrates system 610a; the adaptation and transformation of the body 99ax of a HAV-100/and or the structural body 201ax of a HUV-200 into a self-generating apparatus 610a with an integrated turbine-generator 611a (nacelle) located to the fore of body 99ax; 201ax. Wind bag 30ax or water-bag 40ax may be used to capture the moving fluid medium. Modifications may include the use of a plurality of air pillars 420ax to reinforce support of airbag 30aa or water-bag in addition to the existing inflated inlet port ring 22ax; air-ribs 277ax; a plurality of fluid diversion ports 612 incorporated into the body structure 99ax or 201ax to channel wind and/or water flow captured by inlet port 25ax to a turbine-generator apparatus 611a. The integrated turbine-generator apparatus 611a may comprise of a helical-screw type impeller-turbine 613. After passing through apparatus 611a the fluid leaves by means of exit port 614. Turbine generator 611a may be configured surrounded by a ducted housing 615; a variant of confined penstock 575ax. The whole apparatus may be protected and surrounded by: a balloon 58ax filled with lighter than air gas such as hydrogen or helium; or, a buoy 508ax; or, a ballast container 578ax. The container 578ax and turbine-generator 611a; or the whole apparatus 610a may also be attached by means of lines 295ax to a supporting body such as a kytoon; aerostat 45ax; blimp 45ax; power kite; glider; glider-drone 400M; HAV-400ax; UAV 80ax; powered glider-kite-drone; etc. The apparatus 610a may also be secured by means of lines or tether 46ax; 50ax; 295ax; to fixed anchoring pillars 625; beams 626; beams 708; jacket legs 291ax; fixed platforms 290ax; etc.

FIG. 1B illustrates system 610b a variant of system 610a (FIG. 1A); wherein said airbag 30aa or water-bag 40aa may be supported by a plurality of struts 232ax'; 232ax" attached to a hub 224ax activated by means of a pneumatic; or, hydraulic system 244ax concealed inside the body 99ax; 201ax. (Refer FIG. 9A and FIG. 9B of U.S. Pat. No. 8,963,362). The variant segmented plurality of struts 232ax'; 232ax" may be elongated and/or contracted by means of hydraulic or pneumatic pressure from concealed system 244ax inside body 99ax; 201ax. The plurality of turbine generators 611b incorporated at the fore portion of the apparatus may be configured such that the internal bore (passage) of the turbine blades 616 may be made progressively larger as the fluid moves from fore to aft; from sections S1 to S2 to S3. Such that turbine generators of section S1 may experience the highest velocity; while Section S2 may experience reduced velocity. Section S3 may experience the lowest velocity. Such a structural configuration may help to avoid build-up of back-pressure upstream of the turbine blades 616; at fluid diversion ports 612. Because back pressure at the exit port 614 meant that fluid captured by the collection windbag 30aa or water-bag 40aa is being spilt. Over-flowing from the brim; from the sides of the inlet port 25ax; from inside of the fluid filled cavity 19ax out into the open and thus, lost. Such a deficiency reduces the efficiency of the apparatus 610a; 610b. The crux lies in utilizing all of the fluid collected with zero spillage. That is, conversion of all of the fluid's kinetic energy into mechanical energy; which is then transformed into electrical energy.

FIG. 1C illustrates two separate units comprising: (1) system 670; a wind or water energy collection; capture and conversion system enabled by means of a windbag 30aa or water-bag 40aa wherein; said wind or water current entering the inlet port 25ax may be channeled by means of diversion ports 612; through exit nozzle 614 (without a turbine-generator 611 in between); and directed onto an, (2) integrated stand-alone ducted 615 turbine-generator 617 (with nacelle). For the purpose of illustration, the two apparatus (1) and (2) may be split; and located some distance away from each other. Apparatus 670 may comprise of a windbag supported by a pillar 618'; 618"; a body 99ax/or 201ax; struts 232ax'; 232ax"; inlet port 25ax; exit port or nozzle 614. By itself, said turbine-generator 617 is able to capture the inherent velocity of the ambient wind (for example: wind velocity at 2 m/s; turbine swept area 2 m2) to generate electricity. Using the formula: Power=½ pAv3Cp. Apparatus 617 generates a power of: 6.183 Watts. However, if the individual units (1) and (2) are combined together their productivity may experience an exponential increase. Wherein power generated may undergo a multiplier effect when turbine-generator 617 is used in combination with the kinetic energy concentrating and velocity enhancing bagged apparatus 670. For example: due to the large difference in size between the inlet port 25ax (20 m) versus the outlet port/or exit port nozzle 614 (2 m); at a wind velocity of 2 m/s. The ratio between inlet area versus outlet area is: (20 m×20 m) versus (2 m×2 m)=10:1. According to Bernoulli's equation: the velocity at the exit nozzle 614 is 100 times more (faster) than the velocity at the inlet port 25ax. Applying the formula; Power=½ pAv3Cp; the power imparted by this stream of high velocity fluid onto the turbine-generator 617 being: 6.183 MW. A comparison may be made between: turbine generator 617 configured without apparatus 670 (6.183 Watts). Versus turbine-generator 617 configured with velocity enhancing apparatus 670 (6.183 MW). Indicates an exponential (theoretical) increase of 1,000,000 times—a quantum leap in power generation; created by means of a simple bagged apparatus 670! But due to the separation and open distance between apparatus 670 and turbine-generator 617; etc. much lesser conversion efficiency may be expected due to spillage of high velocity fluid. The above figure of 1 million times is only a theoretical illustration. This is impossible to achieve practically. There are physical limits as to how much fluids may be compressed.

To take full advantage of the above; optimized harvesting of the concentrated kinetic energies generated by apparatus 670 may be achieved by means of integrating apparatus 670 with apparatus 617. Wherein unit (1) and (2) may be combined together. To maximize productivity and conversion efficiency the external duct 615; or housing 615 of apparatus 617 may be directly connected with the exit nozzle 614 of apparatus 670. Thus the outlet port/or exit nozzle 614 of apparatus 670 may be integrated with the ducted 615 turbine-generator 617 in a closed; enclosed or confined system. Wherein by means of a ducted; shrouded; or confined system configuration; the full force, the full impact of the high velocity fluid created by the bagged apparatus 670 may be brought to bear directly on the blades of ducted turbine-generator 617. Such that the high velocity fluid created is fully utilized. Not spilt, dispersed or lost to the surroundings unnecessarily. Wherein a bagged apparatus 30ax; or 40ax; may be configured for use with multiple units of turbine-generators 617; 611a; 611b; 471ax; 472ax; 477ax; etc.

The advantages of using such a kinetic-energy magnifying bagged apparatus 670 in tandem with turbine-generator 617 (or any other turbine-generator) is obvious. Because even by scaling up the ducted 615 blades of turbine-generator 617 (by 10 times) from 1 m to 10 m length (20 m diameter swept area); 2 m/s wind velocity. The quantity of power generated by a standalone apparatus 617 is only 618.3 watts. A hundred times more than the original 1 m turbine length (2 m diameter swept area) of 6.183 watts. But still 10,000 time less than the power generated; as compared to when apparatus 617 is used in tandem/or integrated with apparatus 670 (6.183 MW).

Therefore, turbines may be made smaller. But made much more robust; sturdier; tougher and stronger to withstand super high velocities created by means of apparatus 670. The windbags 30ax; water-bags 40ax may be made larger and taller to maximize collection; gathering and energy extraction of wind and tidal currents. The bagged 30ax; 40ax power generation system 670 may be configured to work with supporting apparatus and equipment of variant systems 610; 620; 630; 477ax; etc. to enhance the efficiency and productivity of any other (fluids) wind and water energy conversion apparatus; devices; systems; equipment; etc. such as: horizontal axis turbines; vertical axis turbines; etc. As illustrated in FIG. 1D to FIG. 1F below.

FIG. 1D to FIG. 1F illustrates variant configuration of FIG. 1C; wherein, system 619 comprising two crane booms 619p; 619s; positioned port and starboard holding a windbag 30ax; may be configured to work in tandem with vertical axis turbines 477ax. System 619 comprises: a windbag 30aa mounted on and supported by twin crane booms 619p; 619s; on the port and starboard sides; with an exit port 614. Wind current entering inlet port 25ax may be channeled by means of diversion ports 612 mounted on body 99ax; through exit nozzle 614 (without a turbine-generator 611 in between); and directed onto a pair of vertical axis turbine-generators 477pax (port); 477sax (starboard); which may be located a short distance away from the exit nozzle 614. Exit port 614 may be configured in a rectangular shape for working with twin vertical turbines 477pax and 477sax. Said turbines 477pax; 477sax; rotating in opposite directions to each other as illustrated in FIG. 1E. While FIG. 1F illustrates a variant oblong shaped exit port 614 configured to work with multiple units of self-generating vertical axis turbines 477vax (with nacelles); supported by a pillar 618. For maximum efficiency; apparatus 619 may be combined with apparatus 477vax. Wherein, exit port 614 and apparatus 477vax may be configured; connected with an oblong shaped duct 615; to effectively channel the concentrated flow of high speed fluid for producing electricity.

FIG. 1G illustrates a variant split unit energy conversion system 620a; wherein a water-bag 40ax may be used with variant system 620a derived from: system 575ax; and system 600ax. (Refer FIG. 6R; FIG. 7A to FIG. 7H; of pending application U.S. Ser. No. 15/630,670.) Wherein said arrangement comprises of an underwater: (1) turbine 472ax (kinetic energy to mechanical energy conversion); (2) extended flexible torque transmission shafts 595ax; angular transmission gearbox 583ax; a couple of joints of universal coupling 666 (mechanical energy transmission apparatus); may be interfaced with, (3) a variant surface based electrical generator 577vax (mechanical energy to electrical energy conversion); mounted on floating buoy 508ax; ballast vessel 578ax; which may in turn be moored to the seabed 537ax by means of cables 295ax. Apparatus used for torque transmission (mechanical energy) may also comprise of: chains and sprockets (used in bicycle and motorcycle); and pulley wheels and belts (used in vehicle alternators; air-conditioning; industrial machines). Switch gears 622; transformers 622; rectifiers 622; sub-stations 622 may be securely and appropriately mounted in sheltered locations abroad floating surface buoys 508ax; ballast vessels 598ax; or surface support vessels 632.

FIG. 2A to FIG. 2H illustrates the various configuration and different shapes of the inlet port 25ax that may be used to enable optimized capture of wind and water currents by means of windbag 30ax and water-bags 40ax. FIG. 2A illustrates a circular shaped inlet port 25ax. FIG. 2B illustrates an oval shaped inlet port. FIG. 2C illustrates an oblong shaped inlet port. FIG. 2D illustrates an inverted oblong shaped inlet port of FIG. 2C turned upside down. FIG. 2E illustrates a rectangular shaped inlet port. FIG. 2F illustrates a square shaped inlet port. FIG. 2G illustrates a semi-circular shaped inlet port. FIG. 2H illustrates a trapezoid shaped multi-sided inlet port. FIG. 2I illustrates a bag with an enlarged inlet port. A plurality of inflated inlet port rings 22ax; air ribs 277ax; horizontal air pillars 420ax; vertical air pillars 420ax; securing lines 66ax; 623; reinforcement straps 624; solid body frame work 99ax; 201ax; concrete pillars 625; concrete beams 626; anchoring lines 627; etc. may also be used to reinforce and maintain the desired shape of the inlet port 25ax and bags 30ax; 40ax for their intended utility purposes. Inlet port ring 22ax may also be spilt into individual sections; comprising a plurality of pieces (e.g. 4 pieces for square or rectangular shaped inlet port 25ax) which may be inflated and used to maintain the shape of inlet port 25ax; keeping it open. Line 23ax configured behind inlet port ring 22ax may be used to control the size (opening) of the inlet port. Line 23ax may also be used to keep the inlet port 25ax shut after maintenance, prior to deployment or mobilization. Or to shut the inlet port 25ax; keeping it in a closed position during demobilization.

FIG. 2J illustrates system 630a; a floating, semi-circular shaped wind-bag 30ax and turbine-generator module 611 mounted on a plurality of buoys 508ax; ballast vessels 578ax; supported by structural body member 99ax and air pillars 420ax; inlet port ring 22ax; air-ribs 277ax embedded with bridle line 21ax; straps 624. Apparatus 630a may be secured by means of anchoring lines 295ax to undersea piles 562ax affixed to the seabed 537ax. Anchoring lines 295ax may also be secured to other anchoring apparatus adapted and modified into geologic features as disclosed in FIG. 6R of the pending parent application U.S. Ser. No. 15/630,670. FIG. 6R discloses: "such geologic features may comprise seamounts 555ax and islands 560ax. Submerged seamounts 555ax may comprise: guyots 556ax; pinnacles 557ax; knolls 558ax; etc. Such that surface unevenness in the topography comprising: holes; indentations; protrusions; fissures; cracks; nooks and crannies, etc. of the seamounts 555ax; submarine ridges 559ax; trenches 561ax; canyons; seafloor 537ax, etc. may be adapted, modified and converted for use as anchoring points for securing lines 295ax. By means of man-made apparatus comprising: piles 562ax and pillars 545ax; reinforced concrete beams 563ax; cement plugs 564ax; holes 566ax drilled and artificial grooves 567ax cut into suitable places of the rocky features of the seamounts 555ax and islands 560ax. Such that anchor lines 295ax may be secured to pillars 545ax and piles 562ax; lines looped around small hills, pinnacles 557ax; ridges 559ax; lines looped through holes 566ax held securely in recessed grooves 567ax; etc."

FIG. 2K illustrates a combined wind and water energies conversion apparatus comprising: an aerial system 620b; and an underwater system 630b. A dual purpose semi-submersible windbag 30ax and water-bag 40ax with a circular inlet port 25ax. If and when coincidentally, the wind blows and the seawater flows in the same direction, such an apparatus may be used to harness the energies of both the wind and tidal currents at the same time. Wind and marine hydro-kinetic currents entering the inlet port 22ax of the bag exits through twin wind and water turbine-generators 611 mounted (over and under) at the aft of the body 99ax (201ax); The apparatus may be supported by air pillars 420ax; buoys 508ax; ballast tanks 578ax; and anchoring lines 295ax secured to piles 562ax; pillars 545ax; in the seabed 537ax. When the wind changes direction the apparatus may be converted into a water-bag and became fully submerged; by relocating the buoys 508ax; ballast vessel 578ax to the top of the water-bag 40ax; and adjusting their ballast. The reverse may be done to fully convert the apparatus into a windbag.

FIG. 2L and FIG. 2M illustrates system 620c; a water-bag 40ax configured with a rectangular shaped inlet port secured by a multitude of lines 627 to a plurality of vertically inclined concrete pillars 625 and concrete beams 626; affixed and/or inserted to the seabed 537ax; mooring buoys 508ax and ballast tanks 578ax. The lines 627 used to secure bag 40ax to pillars 625; and bellow-clamp 633; may be held by an outer plastic cover 628 which is flexible and pliable. The top and bottom portions of outer cover 628 may be linked to two pulley wheels 629t; 629b by means of dual strands 631'; 631"; of a closed loop line 631. Pulley 629t and the top portion of line 631 may be borne by a buoy 508ax; or supporting vessel 632. While pulley 629b bearing bottom portion of line 631 may be affixed to the seabed 537ax. Such an arrangement enables ease of deployment and powering up of the water-bag 40ax; and its depowering and recovery for maintenance and repair purposes.

Such an apparatus may be configured with the inlet port measuring 1 km square to 10 km square in size. And may be equipped with multiple units of turbine-generator 611. Electrical energy generated by integrated turbine generation units 611 may be transmitted by underwater transmission lines 457ax secured to ballast tank 578ax. Units 611 may also be mounted on mechanical arms configured with hydraulic jacks 619. Optionally, the split unit energy conversion system 620a of FIG. 1G may be used. Wherein the drive units comprising turbines 472ax for kinetic to mechanical energy conversion remains submerged under the sea. While the driven units comprising heavy and extremely delicate electrical generation elements and/or related electrical components 622 remains on the sea surface; mounted and sheltered inside ballast vessel 578ax or support vessel 632 in a dry and secure environment; protected from the wind and corrosive sea water. Said drive unit and driven unit components connected in between by a mechanical energy transmission system comprising extended shaft 595ax; angular transmission gearbox 583ax; a couple of joints of universal coupling 666; etc.

FIG. 2M illustrates sub-system 633; comprising an air bellow-clamping apparatus used to flexibly secure the plurality of lines 627 onto concrete pillars and beams 625p; 625s; 626. Apparatus 633 may be mounted on and borne by net 628/or cover 628; which may be slipped over vertical pillars 625p; 625s. Apparatus 633 includes: a strong rigid outer ring 634; a plurality of flexibly configured air bellows 635; attached with a plurality (of pieces) of clamps 636. Lines 627 connected to the periphery of water-bag 40ax may be attached and positioned on the inner-most ring of clamps 636; lying in between the clamps 636 and pillars 625p; 625s. A plurality of apparatus 633 may be moved into their desired positions on pillars 625p and beams 625s by means of netting cover 628 and dual pulley lines 631'; 631". The apparatus 633 may be inflated by means of air pump 637; compressed air being supplied by means of air line 638. Low pressure air from line 638 going to air pump 637 may be used to supply and to operate pump 637 to increase its discharge air pressure going to the bellows 635 of apparatus 633. High pressure air inflating the flexible bellows 635 causes it to expand; pushing it hard against the rigid outer ring 634; and the pillar 625p; or beam 625s located at the center. Causing the clamps 636 holding lines 627 to clamp tightly on to the pillar 625p; beam 625s; sandwiching the lines 627 tightly in between, holding them in position. When compressed air or water is released from the bellow 635, the securing lines 627 are let loose. Water-bag 40aa may be retrieved together with apparatus 633 by means of netting cover 628 attached to dual lines 631'; 631"; powered by motorized 639 winch 629t.

For ease of system operability the protruding top portions of vertical pillars 625p; 625s; and beams 626p; 626s; may be configured in an inclined position; slanted backwards; towards the aft position; towards the downstream side of the tidal stream flow. Such that retrieval of said bagged generation system 630c during demobilization may be assisted by the natural flow of fluid current. The tidal flow pushing the components downstream; pushing the bottom portion of the inlet port 25ax upwards; narrowing the size of its opening; and depowering the system naturally when inlet port 25ax became shut. This structural inclination working in tandem with the motorized 639 reeling of lines 631'; 631"; by means of pulley wheels 629t and 629b in bringing the water-bag upwards; towards the surface of the sea 621. During mobilization, the inlet port 25ax may be kept shut, fully closed, and the whole bag lowered to the bottom of the sea in a closed position. The bellow-clamps 633 located at the bottom, the lowest level may be deployed first; followed by the bellow clamps 633 located higher up, in the middle. And finally the bellow-clamps 633 located at the top. With the bag gradually opening up from the bottom; to the middle; then to the top.

FIG. 3A to FIG. 3F illustrates a variant configuration 620d of the system 620c illustrated in FIG. 2L and FIG. 2M. FIG. 3A illustrates the perspective front view of a water-bag 40ax mounted on a solid rectangular framework. FIG. 3B illustrates the sectional side view of FIG. 3A. FIG. 3C illustrates the sectional plan view of FIG. 3A and FIG. 3B. The rectangular inlet port 25ax comprises of: a top horizontal beam 640t; a bottom horizontal beam 640b; two sets of vertically aligned movable arms 641 and 642 attached by hinged joints 643 located at the port and starboard sides. The two sets of vertically aligned arms; one set each mounted at the port side 641p; 642p; 643p; and the starboard side 641s; 642s; 643s; allows movement of the top and bottom horizontal beams 640t; 640b; akin to a fish's mouth opening and closing. The entire apparatus 620d may be attached to an anchoring apparatus 650 by means of 4 supporting struts 648p; 649p; 648s; 649s; two each (located port; starboard sides) connected to the top beam 640t and bottom beam 640b. FIG. 3D illustrates a variant configuration wherein said vertically aligned arms 641; 642; 643; optionally may comprise of a scissors like design; wherein a multitude of short struts 644 connected together by means of hinged joints forming a scissors-like mechanism may be opened and closed; elongated and collapsed; thus opening and closing the inlet port 25ax. The top and bottom horizontal beams 640t; 640b may be attached to the body 99ax; 201ax of the apparatus by means of struts or mechanical arms 645t; 645b.

Twin mechanical jacks 619t; 619b; may be used to manipulate the struts or arms 645t; 645b; which in turn moved the top and bottom horizontal beams 640t; 640b; causing the inlet port 25ax to open or close as required. Enabling variable control of the size of inlet port 25ax. FIG. 3E illustrates a variant configuration wherein struts or arms 645t; 645b; may be configured to comprise of two mechanical jacks 619t; 619b; working like twin crane-booms controlling the top and bottom beams 640t; 640b; and thus the size of inlet port 25ax. The entire apparatus 620d may be attached to an anchoring apparatus 650 by means of 4 supporting struts 648p; 649p; 648s; 649s; two each (located port; starboard sides) connected to the top beam 640t and bottom beam 640b. Swivel anchoring apparatus 650 may in turn be affixed to the seabed or seafloor 537ax by means of a plurality of piles 562ax; and/or pillars 545ax. Two struts each on the port side 648p; 649p; and the starboard side 648s; 649s. FIG. 3F illustrates the flexibly configured drilling strings apparatus 650 which may be used to enable mobilization and demobilization of the entire apparatus 620d.

FIG. 3B illustrates the sectional side view of FIG. 3A. Tidal current flows through the inlet port 25ax formed by horizontally disposed top and bottom boards 640t; 640b; and twin vertically disposed side arms or struts 641; 642; connected by hinged joint 643 located at the port side (not shown) 641p; 642p; 643p; and starboard side (shown) 641s; 642s; 643s. Tidal current passes by inclined twin arms 645t; 645b; operated by means of hydraulic or pneumatic jacks 619t; 619b; entering via a plurality of diversion ports 612; before going through body 201ax; then into turbine-generators 611; then finally exiting through outlet port 614. FIG. 3C illustrates the sectional plan view of FIG. 3A and FIG. 3B; showing a plurality of diversion ports 612 on the enlarged structural body 201ax; connected to a plurality of turbine-generators 611. Detachably configured turbine-generators 611 may be attached to or disconnected from the structural body 201ax for maintenance and servicing purposes.

The ocean energy harvesting apparatus 620d may be used to collect, entrap and capture tidal currents using an enlarged inlet port 25ax; channeling and concentrating the fluid; amplifying its velocity; forcing it through a plurality of integrated turbine-generators 611 (with nacelle); then released through the outlet port 614. Water current flows through large apertures 612 on the mounting body 201ax before entering three turbine-generators 611. Body 201ax may be configured to function as an automated ballasting and de-ballasting vessel for balancing and buoyancy control of the whole ocean tidal energy conversion apparatus 620d; configured with integrated turbine-generators 611. Such that the self-supported apparatus is weightless; or exhibits minimal weight in the water. Body 201ax may also be utilized for carrying other equipment and apparatus; such as the plurality of pneumatic or hydraulic system 244ax operated mechanical jacks 619t; 619b; for opening and closing the inlet port 25ax. Said jacking mechanisms 244ax mounted on the body 201ax operated said struts or arms 645t; 645b connected to the top and bottom horizontal beams 640t; 640b; opening or closing the inlet port 25ax. The weight of the turbine-generators 611 may also be supported by means of lines 295ax attached to mooring buoys 508ax and submersible ballast vessels 578ax. Power generated may be transmitted by means of underwater cables 475ax. Turbine-generators 611 may also be configured with fully automated, integrated ballast and buoyancy control tanks (refer FIG. 3I and FIG. 3J). The surface buoys 508ax and submersible ballast vessels 578ax located fore and aft above apparatus 630d may be connected together by means of a floating network of solid structural beams 652; grid 703; including struts; truss; lines; etc. for constituting a floating platform for production and processing of ocean renewable energies comprising: solar; offshore wind; and marine hydro-kinetic energies including tidal stream energies.

Referring to FIG. 3A and FIG. 3F; the anchoring system for apparatus 620d may comprise of: a removable component 650; and a fixed component 660. Enabling apparatus 620d to be flexibly yet securely anchored to a foundation comprising of: a plurality of drill pipe 651 (drill string 651) and piles 562ax affixed into the seabed 537ax by means of reinforced concrete slabs 653. Or by means of concreted natural caverns or artificial caverns 565ax drilled into the bed rocks 537ax. The fixed component 660 of the anchoring apparatus may comprise of a drill pipe 651 spudded into the bed rock of the seabed 537ax (cemented in position alike drilling and completion of wells in the oil and gas industry) affixed together with a plurality of sub-sea piles 562ax by means of reinforced concrete 653. The detachable component 650 of the anchoring apparatus may comprise of: a flexibly configured collar-sleeve 654; a modified short drill pipe 655; and normal lengths of drill pipes 656. Upon which apparatus 620d may be attached via collar-sleeve 654. And supporting facilities comprising of a drilling machine with mechanical arms 657 bearing a rotating turn-table 658; abroad drill ship 659 with drilling rig 659'. Collar-sleeve 654 bearing the 4 anchoring struts 648p; 649p; 648s; 649s; may be affixed onto and integrated with the modified short drill pipe 655 in the middle. Collar-sleeve 654 and drill pipe 655 may be configured to rotate independently of each other. For utility purposes the threads of the male coupling 656m and female coupling 655f of drill pipes 656 and 655 may be modified; and configured to work in a direction opposite to that of the male coupling 655m and female coupling 651f of drill pipes 655 and 651.

During mobilization of apparatus 620d, the whole apparatus may be deployed in a collapsed form with the inlet port 25ax kept fully shut. The entire apparatus 620d may be borne by means of collar-sleeve 654; and the drill pipe 655. The male coupling 656m of a detachable drill pipe 656 may be mated with (screwed tight by means of threads and grooves) the female coupling 655f of drill pipe 655. Drill pipe 656 may be borne by a rotational drilling apparatus 658; held in place by mechanized arm 657; with all equipment carried by a modified drilling ship 659/or drilling rig 659'. Mated drill pipes 655; 656 bearing apparatus 630d may be lowered from the surface of the sea towards anchoring drill pipe 651; assisted by means of homing signals transmitted by sonar transceiver 299sax; detected by sonar receiver 298sax. Sonar receiver 298ax may be attached to collar-sleeve 654 or drill pipe 655. Sonar transceiver 299ax may be attached to the concrete slab 653 or drill pipe 651. In proximity male coupling 655m of drill pipe 655 may be slotted into the top funnel shaped female coupling 651f of drill pipe 651 (fixed anchoring apparatus). Additional lengths of drill pipes 656'; 656"; etc. may be affixed to existing drill pipe 656 if required. The drill pipes 656; 655 may then be rotated by means of rotating apparatus 658 (e.g. clock-wise) abroad drill-ship 659. Male and female threads on the drill couplings 654m and 651f mated in place and tightened as a result. However, further turning of the drill pipes (pre-configured; desired outcome) causes the male and female couplings 656m and 654f between drill pipes 656 and 655 to loosen; detaching from each other. Resulting in drill pipe 656 separating from drill pipe 655. Drill pipe 656 may be removed; retrieved from apparatus 620d back to the surface and drill ship 659/drilling-rig 659'. Drill pipe 655 bearing apparatus 620d remains securely attached to anchoring drill pipe 651 at the bottom of the sea. Other components comprising ballast tanks 578ax; mooring buoys 508ax; turbine generators 611; electrical transmission cables 457ax, etc. may be brought into position; connected; checked out; tested and deployed. The inlet port 25ax may be operated to open up last; by means of central struts 645t; 645b; and mechanized jacks 646t; 646b. Water current flows into the apparatus 620d and out through exit ports 614; generating renewable electricity; which may be channeled by means of submarine cables 457ax to the sea surface 621 based rectifier 622; transformers 622; switching gears 622 mounted on mooring buoys 508ax and ballast tanks 578ax; and for transmission to shore facilities.

During demobilization, a reversal of the mobilization process may be executed. Wherein the inlet port 25ax may be operated to close shut first; by means of central struts 645t; 645b; and mechanized jacks 646t; 646b. Then the drill pipe 656 mounted on turntable apparatus 658 carried by mechanical arms 657 may be lowered from the drill ship 659 towards drill pipe 655 bearing collar-sleeve 654 and apparatus 620d. In close proximity, the male coupling 656m of drill pipe 656 is mated with the female coupling 655f of drill pipe 655. The drill pipe 656 turned by turntable 658 (e.g. anti-clockwise) causes the coupling joints of pipes 656 and 655 to tighten. Further turning of drill pipes 656 and 655; causes the male coupling 655m of drill pipe 655 to loosen, unscrew and then detach from the coupling joint between coupling 655m and 651f. This causes apparatus 620d to be separated from the anchoring apparatus 651 which is affixed to the seabed 537ax. Buoyancy of submarine bodies 201ax may be maximized and air may be blown into water-bag 40ax by means of air lines 204ax to increase buoyancy. The entire apparatus 620d including turbine-generators 611 may then be raised up to the surface. Flexibly configured turbine-generators 611 may be detached from the submersible body 201ax. Equipment checks; maintenance and repair works may then be carried out.

FIG. 3F illustrates the use of detachable component 650 together with the fixed component 660; enabling easy mobilization and demobilization (installation and removal) of the entire apparatus 620d. Once constructed the fixed component 660 of the anchoring apparatus remains a permanent feature. Only the detachable component 650 of anchoring apparatus comprising: collar-sleeve 654; normal length of drill pipe 656; modified short drill pipe 655 upon which apparatus 620d is attached; may be installed onto; and/or removed from the fixed component 660 as desired. By means of supporting facilities such as ship 659 borne drilling rig 659' configured with drilling machines with mechanical arms 657; and rotating turn-table 658. Prior to installation of apparatus 620d; modified short drill pipe 655 bearing collar-sleeve 654 and apparatus 620d may be affixed to a normal length of drill pipe 656. And then lowered into the sea. If required, additional lengths of drill pipes 656'; 656"; 656'"; etc. may be affixed to the existing drill pipe 656; one after the other; to extend total pipe length until it reaches the fixed anchoring drill pipe 651. Drill pipes 655 and 656 may be rotated by means of turntable 658 borne by mechanical arms and hydraulic jacks 657. The direction of rotation may be used to tighten or loosen specific joints as desired; and as per design configuration. In particular the make-up of coupling joints 651f and 655m; and then the detachment of coupling joints 655f and 656m; during installation of apparatus 620d. And during demobilization or removal of apparatus 620d;

the make-up of coupling joints 655*f* and 656*m*; and the detachment of coupling joints 655*m* and 651*f*.

FIG. 3G illustrates details of a subsea foundation 660 used to securely affix the anchoring drill pipe 651 in position. By means of a technique used in the oil and gas industry; modified for provision of a subsea anchoring apparatus 660 for the production of ocean renewable energies; not for production of oil and gas. A foundation hole 566*ax* may be drilled into the bedrocks of seabed 537*ax* in a preferred location by means of standard drill bits. The bottom portion of the hole 566*ax* may be purposely made larger than the top portion. A modified drill pipe 651 configured with a multitude of spring-loaded hinged appendages 661 may be inserted into the drilled hole 566*ax*. The self-folding and self-extending spring loaded appendages 661 may be configured to bend aft (towards the rear; backwards) when drill pipe 651 is inserted into hole 566*ax*. At the bottom portion of the hole 566*ax* which is larger than the top portion; the spring-loaded appendages 661 extended outwards horizontally. Those appendages 661 located at the narrower top portion of hole 566*ax* extended outward against the wall of hole 566*ax*; pointing backwards towards the top of hole 566*ax*. Such that once it is inserted drill pipe 651 remains stuck inside the hole 566*ax*. It cannot be retrieved. The drill pipe 651 and hole 566*ax* may then be cemented in place by means of concrete slurry 663 pumped through an internal bore hole 662 in the middle of drill pipe 651. Concrete slurry 663 exited bore hole 662 by means of bottom perforation 662*b*; filling up the entire cavity 566*ax*; displacing sea water. Excess concrete spilling out of hole 566*ax* formed a concrete mound 663 at the neck of pipe 651 on seabed 537*ax*. The structure is left to harden and cure. Thus forming an artificial man-made subsea concrete 663 plug 564*ax* inside hole 566*ax* with embedded pipe 651 securely anchored into the bed rocks 537*ax* of the seabed. Such modified techniques may also be adapted and used to create embedded artificial plugs 564*ax* inside any naturally occurring cavities in the seabed 537*ax* or seamounts 555*ax*. Similarly a plurality of piles 562*ax* and pillars 545*ax* fitted with appendages 661 may also be inserted into drilled holes 566*ax* and cemented into position. Piles 562*ax* may also be driven into the seabed 537*ax* by conventional means.

FIG. 3H to FIG. 3J illustrates a variant split unit energy conversion system 670; a variant version of system 575*ax* and system 600*ax* (Refer FIG. 7D; FIG. 7G; of pending parent application Ser. No. 15/630,670. FIG. 3H shows the side view of the aft portion of a split unit energy conversion system 670; a large airbag 30*ax* configured with twin rows of variant ducted turbines 472*ax* (with turbines only; no generating elements) in an over-under (upper-lower) arrangement. FIG. 3I illustrates the plan view of FIG. 3H showing windbag 30*ax* with a multitude of ducted 615 turbines 472*ax* mounted aft. While FIG. 3J illustrates the rear view of said arrangement of ducted 615 turbines 472*ax*. The plurality of ducted 615 turbines 472*ax* may be attached to the structural body 99*ax* by means of twin C-clamps 665. The split unit generation system 670 (similar to FIG. 1G) may constitute four main sections: (a) wind-velocity concentration section; (b) energy extraction section; (c) torque transmission section; and (d) electrical energy generation section. Wherein, said respective sections may comprise of: (a) windbag 30*ax* with large inlet port 25*ax* and constricted funnel 671 located aft; (b) ducted 615 turbines 472*ax* section (drive unit); (c) transmission gearbox 583*ax* and extended torque transmission shafts 595*ax* section; and (d) surface based generation 590*ax* section (driven unit). Kinetic energy of the wind current is converted into mechanical energy by the turbines 472*ax*. The mechanical energy generated by the turbines 472*ax* may be transmitted by means of transmission gear boxes 583*ax*; and long extended shafts 595*ax*; 692 to generators 590*ax* on the surface/or ground. Extended shafts 595*ax* may also be connected with a couple of joints of universal couplings 666 at each end enabling flexible and pliable transmission of angular torque. Rotating shaft 595*ax* may be protected by an external cover 592*ax*. For support extended shafts 595*ax* covered by casing 592*ax* may be configured next to; or near to the mechanical hydraulic jacks 619 on which ducted 615 turbines 472*ax* may be mounted. The self-propelled generator 590*ax* may be motorized 668 with wheels 669 for mobility.

The aft section of windbag 30*aa* may be configured with a plurality of wildlife escape hatches 680. Sub-system 680 may comprise of: reinforcement funnel 671; a safety net 573*ax* or cage 573*ax* to screen, divert and channel wildlife; through a plurality of wildlife escape hatches 680. Reinforcement funnel 671 helps prevent caving in or collapse of bag fabrics due to the pressure difference created by the venturi effect. At the aft section in particular; high velocity flow of fluid (low pressure) inside the windbag; contrasts with low velocity flow (high pressure) ambient atmosphere outside the bag. This may cause bag fabrics to cave inwards. Safety net 573*ax*; or cage 573*ax* may be mounted on and supported by a plurality of struts 672 and truss 672 attached to funnel 671; and central body 99*ax*; 201*ax* structure. Wildlife escape hatches 680 may be mounted on the sides of funnel 671 which provides a solid frame for the apparatus to operate. The angular V-shaped configuration of the safety cage 573*ax* ensures any wildlife e.g. a bird; a fish; entering the bag is swept to the sides of the bagged system by the wind or tidal current. Where a motion sensing-detection system 673 upon sensing the presence of said bird; fish; triggered activation of mechanism 674 controlling the operation of sliding trap door 675. Thus exposing the escape hatch 680 allowing said bird; or fish to exit. Such a system cum apparatus 680 avoids injuring or killing wildlife; and at the same time, avoids unnecessary down time due to damaged turbine blades 472*ax* caused by "biologics-strike" comprising: bird strikes and/or fish strikes. Damages may also be caused by debris; plastics; etc.

Such a split unit energy conversion system 670; or split unit generation system 670 (drive unit; torque transmission unit; driven unit) may entail some loss of energy during the total energy conversion process. This system is in contrast with an integrated turbine-generator unit with nacelles 611; 611*a*; 611*b*. Wherein, extraction of the kinetic energies of offshore wind and tidal currents and their direct conversion; from kinetic energy into mechanical energy; and then into electrical energy; may be carried out in one step by a single apparatus; instantaneously; as illustrated by apparatus 611; 617 (refer FIG. 1A to FIG. 1C). This is the most efficient system configuration and is widely used worldwide at present. But very expensive. However in the split unit energy conversion system of present invention; this minor loss of energy and efficiency; may be more than offset by the advantages gained. As surface based systems are inherently much more: easier to design; cheaper to manufacture; components and equipment configured may be heavy duty, bulkier and more durable; easier to access, maintain and repair. With relocation of the heavy, yet extremely delicate electrical generation components (driven units) to the surface; the lighter (kinetic to mechanical energy) conversion components (drive units) comprising: turbines 472*ax*; flexibly extended shafts 595*ax*; 692; transmission gear boxes 583*ax*; universal couplings 666; that are left: (a) high up in the air (supported by apparatus 618; 619;); and (b) deep down in the sea and ocean; entails a much lighter load to support. Thus with a simple modification the same infrastructure may be used to enable the deployment of turbines with larger blades; and energy conversion devices with much larger surface areas, volumes, etc. Thus compensating for the small energy loss incurred; restoring productivity; efficiency of the split unit energy conversion system; at par with direct energy conversion system using integrated turbine-generation units 611; 617. But with the renewable energy conversion plant built at a cheaper cost; more heavy-duty and durable; easier to maintain and repair. However direct energy conversion systems had its advantages; units 611; 617 may be used to complement the system whenever desired.

FIG. 3K to FIG. 3L illustrates a submerged underwater generation system 690; an integrated modular ducted 615 turbine-generator 611 with nacelle; combined with a variant submerged self-regulating ballast tank 578ax. Enabling turbine-generator 611 to be buoyancy neutral. The walls of tank 578ax acts as a duct 615; hood 615; or housing 615; making the turbine-generator system 611 a confined space for the extraction and direct conversion of kinetic energy of tidal stream; to mechanical energy; and electrical energy. FIG. 3K illustrates the sectional side view; while FIG. 3L illustrates the sectional rear view 3L-3L of ballast tank 578ax and turbine generator 611. The upper portion (cavity 676) of the tank 578ax may be filled up with air 683 while the bottom portion contains water 681. The apparatus may be supported by line 295ax; underwater cable 457ax secured to surface buoy mooring 508ax. Buoyancy may be maintained by means of automated sub-system 686; enabling ballasting and de-ballasting of the cavity 676. Ballasting may be done by bleeding off excess air; and allowing water to enter to flood the cavity 676. While de-ballasting may be done by topping up air from an air cylinder 203ax; and expelling ballast water 681 from the cavity 676. Buoyancy of the apparatus being automatically maintained by means of an artificial intelligence (AI) computerized module 677; air lines 204ax; compressed air cylinder 203ax; and twin sets of 3-way valves 678; 679.

Ballast water may be controlled by 3-way valve 678; while pressurized air may be controlled by 3-way valve 679; by means of control signals from computerized module 677. To increase buoyancy and reduce ballast: water control valve 678 opens its bleeder port 678e to dispel water 681 from cavity 676 via tubing 682. At the same time air control valve 679 opens its air supply port 679s to pressurize cavity 676. Air 683 from cylinder 203ax enters cavity 676 from valve 679s via tubing 684; displacing water via port 678e. To reduce buoyancy and increase ballast: the reverse is true. Valve 678 opens its supply port 678s to take in ballast water 681; while valve 679 opens its bleeder port 679e to expel air 683 from cavity 676. Water enters cavity 676 via valve 678s; tubing 682. Air 683 exits via tubing 684 valve 679e.

The turbine-generator 471ax and shaft 475ax may be kept in position by means of supporting struts 685. Such a system may impose minimum weight, stress and strain on the surface buoy. The generation elements comprising: rotor magnets 476ax and rotor wire coils 474ax mounted at the central shaft 475ax may be configured to be counter-rotational. Wherein, the center turbine 471bax may be configured to rotate against the fore turbine 471aax and aft turbine 471cax.

FIG. 3M illustrates the sectional view of a helically shaped screw turbine 613 which may be used in the apparatus 611a of FIG. 1A. The screw turbine may have the electricity generation elements comprising magnet rings 476ax; wire coils 474ax located on the casing surrounding the turbine; instead of at the center as most turbines may be configured. Since the helically shaped screw turbine may be configured securely affixed to the peripheral casing 667 integrated with magnet ring 476ax; said apparatus does not require a central shaft; but instead comprises entirely of a long length of twisted-turning impeller-turbine blades 613.

FIG. 4A to FIG. 4I illustrates a variant Split Unit Energy Conversion System 700; derived from the: (a) "Distributed System for Extraction of Energies from high altitude wind currents and deep sea ocean currents 600ax"; (b) transmission of extracted energies into an; (c) "utility scale Centralized Power Generation Plant 585; and counter-rotational generation system 590d; and 590h" (refer: FIG. 7A to FIG. 7H; U.S. Ser. No. 15/630,670). These prior art disclosures may be adapted for use in a variant system 700 for harvesting ocean renewable energies comprising: tidal energies and/or offshore wind energies for conversion into electrical energies. Wherein said variant apparatus 700 derived from system 600ax and counter-rotating generation system 590ax may comprise of: (a) conversion of the kinetic energies of tidal current stream into mechanical energies by means of a multitude of distributed marine turbines 472ax (configured without individual nacelles) mounted on the external body 701; (b) transmission of said mechanical energies by means of a torque transmission system 687 comprising of: flexibly configured shafts 475ax; gear boxes 583ax; torque transmission shafts 691; extended torque transmission shafts 692; wire-coil transmission gear-wheels 693; gear 694; magnet transmission gear-wheels 695; gear 696; bearings boxes 586ax; universal couplings 666; and other forms of mechanical parts and fittings; to an (c) utility scale Centralized Power Generation Plant 585ax; 590ax (a counter-rotating electrical generator) housed inside said turbine-generator body structure 701. The transmission shafts 691 may also comprise of or may be replaced by: chains and sprockets; belts and pulley wheels; normally used for mechanical torque transmission in industrial machines. Such transmitted mechanical energies may also comprise of wind power generated torque from a plurality of wind turbines 472ax configured (without individual nacelles) for transmission of mechanical energies created into a Centralized Power Generation Plant 585ax; or 590ax. Wherein transmitted torques derived from both wind and tidal powered turbines may be channeled into a centralized counter-rotating generator 590ax as illustrated in FIG. 5A. An advantage provided by the Distributed System for Extraction of Renewable Energies 600ax; and the derivative Split Unit Energy Conversion Systems 700; 740; etc. of present invention.

Said split unit energy conversion system comprising: distributed renewable energies collection cum extraction system (drive units 51ax); torque transmission system 687; and counter-rotational generation system (driven unit 54ax). Enables the combination; channeling; concentration; congregation of wind and tidal energies derived from: (a) multiple drive units of one type of apparatus (from one system); (b) drive units derived from a myriad; diverse; different types of apparatus (from multiple systems). Transmission of converted mechanical energies by means of a torque transmission system 687. Into one driven unit 585ax; 590ax. Wherein (a) said collective energies in wind and tidal current extracted by means of a distributed network of multiple drive units 51ax comprising: windbags 30ax; water-bags 40ax; drones HAV-100ax; HUV-200ax; HAV-400ax; HAV-400Max; windbags 76ax; water-bags 222ax;

horizontal axis wind turbines 472ax; horizontal axis tidal turbines 472ax; vertical axis wind turbines 477ax; vertical axis tidal turbines 477ax; etc. (b) may be transmitted by means of an inter-connected network 687 of turbine shafts 475ax; transmission shafts 691; extended shafts 692; 595ax; gears and gearboxes 583ax; bearing boxes 586ax; and structural support 599ax; etc. inter-linked to form a mechanical energy (torque) transmission system 687; for (c) powering a combined driven unit 54ax comprising counter-rotational generator 585ax; or 590ax.

Wherein, said generation system (driven unit 54ax) 585ax; 590ax; may be suitably configured for the conversion of concentrated mechanical energies transmitted from a plurality; a multitude; a myriad; an aggregation comprising: thousands of individual drive units; different types of (wind and tidal powered drive units 51ax). Said mechanical energy (torque) conveyed by means of a distributed network; a torque transmission system 687. Wherein, said variety of different types of drive units 51ax comprises: horizontal axis wind turbines 472ax; horizontal axis tidal-turbines 472ax; vertical axis wind turbines 477ax; vertical axis tidal-turbines 477ax; drones HAV-100ax; HUV-200ax; HAV-400ax; HAV-400Max; multiple windbags system 76ax; multiple water-bags system 222ax; etc. Wherein, said torque transmission system 687 comprises: (a) shafts 691; extended shafts 692; 595ax; gear boxes 583ax; gear-wheels 693; 694; 695; 696; (b) line reels 582ax'; 582ax"; transmission lines 591ax system; (c) dual line reel drums 582ax cum 588ax with transmission lines 591ax protected by hard cover 592ax; (d) sprockets 738; 739 and roller chains 742 system; (e) pulleys wheels 743; 744 and belts 746 system; (f) bendable universal couplings 666 used for flexible transmission of angular torque.

Wherein, said multitude of drive units 51ax does not require individual nacelles 611. As the kinetic energies of wind and tidal extracted by said multitude of individual drive units 51ax; and converted into mechanical torque; may be transmitted by means of torque transmission system 687; and combined together into one common generation unit 585ax; 590ax.

FIG. 4A illustrates system 700; an individual unit of split-unit turbine-generator 700 configured with a water-tight body 701 for underwater operations. Wherein said split-unit energy conversion system 700 may be configured with means comprising: (1) a distributed network of hydro-turbine units 472ax (drive units) spread out all over the skin of turbine-generator body 701; (2) interconnected by means of a mechanical energy and/or torque transmission system 687; (3) to a driven unit comprising centralized counter-rotating electrical generator 585ax; 590ax housed inside said body 701. Wherein, the kinetic energies extracted from tidal current (kinetic to mechanical energy conversion) by means of multiple drive units (e.g. 100; 500; 1,000 units of marine hydro-turbines 472ax); may be transmitted; to power one single driven unit (generator 590ax) for conversion into electricity. The structural body 701 of split unit turbine-generator 700 may be moored to surface buoys 508ax; ballast tanks 578ax; pontoons 734; surface ships 659; by means of mooring lines 512ax; and anchored to the seabed 537ax by means of anchoring lines 295ax. Electrical power transmission lines 457ax routes generated power from the power off-take point 688; to the surface based sub-stations 622; transformers 622; rectifiers 622; hydrogen electrolyzer plants 509ax. FIG. 4B illustrates the cross-sectional and perspective view 4B-4B of system 700 wherein one specific body 701 section may be configured with four units of large hydro-turbines 472ax. FIG. 4C illustrates a variant configuration of FIG. 4B wherein said turbine-generator body 701 may be configured with eight smaller units of hydro-turbines 472ax on one specific section of its body 701. Any number of marine turbine units 472ax: 4, 6, 8, 10, 12, etc. may be arranged on one section of body 701. Wherein, dependent upon the configured length of said turbine-generator's body 701 (and that of the central generator 585ax); for example: 100 meters; 500 meters; 1 km; 2 km; etc. The total number of tidal turbines 472ax configured may be: 100 units; 500 units; 1,000 units; 2,000 units; etc. All said drive units linked to; powering one central generation (driven) unit 585ax; 590ax. Or, for practicable purposes such as torque transmission; said generation unit 585ax may be sub-divided into a few sections: 585ax'; 585ax"; 585ax'"; etc. For example: 100 or 200 turbine 472ax units may be assigned to drive one section 585ax' of generation unit 585ax. Likewise, for example: if one extended shaft 692 is configured to transmit the mechanical torque from units of turbines 472ax. The combined energies from 100 turbines concentrated in 10 extended shafts 692 may be used to power one section 585ax' of generation unit 585ax. Five units of shafts 692 may be configured to power the rotor magnets 476ax clockwise; the other 5 units of shafts 692 configured to power the rotor coils 474ax anti-clockwise. If each hydro-turbine unit 472ax is configured to produce, for example: one megawatts of rated power. Said turbine-generator 700 may be configured to produce: 100 MW; 500 MW; 1,000 MW; 2,000 MW; etc. Wherein, an array comprising a multitude of such turbine-generators 700 configured in an ocean renewable energies farm 710 of FIG. 4D; and FIG. 5J to FIG. 5L may be designed to produce multiple Gigawatts of power for provisioning cities; island states; nations; etc. A combined seaborne: wind; tidal (water current); solar; energies production complex 300ax; cum processing plant for conversion of renewable energies to clean electricity; or optionally, into a clean energy carrier, hydrogen. An ocean renewable energies ecosystem 300ax configured for 100% renewables.

Engaging with the tidal current, marine hydro-turbines 472ax transforms the tidal stream's inherent kinetic energy into mechanical energy. This mechanical energy is in turn transmitted by means of a torque transmission system 687 comprising a plurality of: (externally located) turbine shafts 475ax; torque transmission gear-boxes 583ax inside housing 473ax; drive shafts 691 inside housing 592ax; to (internally located) gear-boxes 583ax; long extended shafts 692; gears 694; 696; gear-wheels 693; 695; supported by bearing boxes 586ax; directly engaged with the generating elements 474ax; 476ax of central generator 590ax. Turbine-generator module 700 may be configured with a very long centralized generator 585ax; or 590ax located in the middle of its body 701; running its entire body length; from bow to stern; from fore to aft; for example: 100 meters; 500 meters; 1 km; 2 km; etc. Generating elements comprising: rotor wire-coils 474ax; rotor magnets 476ax; may be configured to rotate in opposite directions to each other. Both the rotor wire-coils 474ax and rotor magnets 476ax may be configured to interact; and be directly engaged with the torque transmission system comprising: shafts 691; gear boxes 583ax; gear-wheels 693; 695; etc. Said gears; gear-wheels and gearbox 693; 694; 695; 696; 583ax; etc. may also comprise of: step-up and/or step-down gear-shifts cum transmission mechanisms; configurably responsive to external tidal stream conditions. Optionally shaft 691 protected by housing 592ax may be configured flexibly attached to body 701; wherein, said shaft 691 (slotted in or out) may be affixed to or detached from the (pre-configured connection such as flanges) short mounting stubs 698 on body 701 by means of twin "C-C" clamps 665.

The rotor wire-coils 474ax may be driven by means of gear-wheels 693; which engages with gear 694; borne by extended shaft 692 which transmits the torque from multiple drive units 472ax. The rotor magnets 476ax (located in the middle of generator 590ax) may be driven by means of gear-wheels 695; which engages with gear 696; at the fore and aft (front and back ends) of generator 590ax. Structurally the rotor wire-coil 474ax of the long generator 590ax; extending from bow to stern; may be configured for provision of suitable access space 697 enabling gear-wheel 695 attached to rotor magnets 476ax to engage with torque transmission gear-wheel 696. Wherein rotor wire-coil 474ax may be divided into a couple of sub-sections. Thus enabling said gear-wheel 695; attached to rotor magnets 476ax to project beyond the external diameter of the rotor wire-coils 474ax (generator body); thus engaging with gear-wheel 696 borne by the extended shaft 692 which transmits the torque from drive units 472ax. Optionally gear-wheel 696 may project into gap 697 to engage with gear-wheel 695. Such an arrangement enables the configuration of individual generation elements comprising: rotor wire-coils 474ax; and rotor magnets 476ax to revolve; or rotate opposite to each other. Wherein, motive velocities of the counter-rotating generation elements relative to each other may be doubled. Such a structural configuration may be transformed into improved productivity and efficiency. Variant generation system 777 of FIG. 6F may also be adapted for use.

Fifty percent (50%) of the total drive units comprising marine-turbines 472ax may be configured linked up to drive the external rotor wire-coils 474ax; while the other half of the hydro-turbines 472ax may be configured engaged with, to power the internally located rotor magnets 476ax; wherein both the external and internal generation mechanisms may be driven by said torque transmission system; and may configurably be rotated in a direction opposite to each other. Such a counter-rotating generator 585ax; 590ax securely mounted inside turbine-generator body 701; driven by a distributed network comprising hundreds of drive units 472ax spread out all over the external skin/or body 701 of turbine-generator 700; interconnected by means of a torque transmission system; said combined energies channeled into said single generator 590ax. May provide a more cost-effective means of generation than the present system of incorporating expensive individual nacelles for each and every hydro-turbine 471ax. Even though integrated direct drive cum conversion apparatus 471ax serves their purpose well. It may be cheaper to design and easier to construct one single generator body 701 containing; in this case, a very long generator 585ax; 590ax. Said body 701 housing generator 585ax; 590ax configured with water-tight seals; water-proofed; leak-resistant; in particular interconnecting joints; points where the plurality of transmission shafts 691 enters housing body 701. Other externally located equipment and fittings comprising: turbines 472ax; shafts 475ax; gear-boxes 583ax; housing 473ax; transmission shafts 691; casing 592ax; etc. may also be sealed and water proofed. Optionally, they may not require any water proofing if the components are; configurably made of compatible materials tolerant of sea water such as: ceramics; composites; plasticized components. And if practicable all of these externally located energy conversion components may be designed and configured to use the surrounding sea water as a lubricant and coolant. Wherein free flowing sea water; or pumped sea water may be used in these components for lubrication; and as a cooling medium. Such a sea-water based cooling system may comprise of: a plurality of cooling fins 699 installed inside body 701; a pressurized piped 702 distribution system supplied by a pump; providing cooling for the centralized generation system inside body 701. Said pressurized sea water may also be piped to lubricate moving joints; gears; etc. The portion of shaft 691 at the point of connection to/with the body 701 requires sealing; leak proofing and configured to be water tight; including the whole turbines-generator body 701. Such a concept differs from the current practice of configuring integrated direct drive turbine-generator units in which each and every individual nacelle requires leak-proof; water-tight construction; leading to high production costs.

Optionally, turbine-generator body 701 may be positively pressurized with air; nitrogen or CO2 gas; and the internal pressure remotely monitored; equipped with low pressure alarms. Compressed air cylinders; air-lines 638 extending from surface buoys 508ax and ballast vessels 509ax to an air operated pump 637 located inside body 701; may also be configured for automated topping-up purposes. Such a design ensures a water-tight seal of the entire body 701. In case a leak develop, air will leak out from the body 701; not water entering into body 701. Control surfaces comprising hydroplanes 205ax; 207ax; 208ax; may be configured on the external of body 701 for body balancing and control. Internal body 701 space including empty space 689 located fore and aft may provide some buoyancy. However due to the mass; quantity and heavy weight of hundreds; or thousands of tidal turbines 472ax it is carrying, body 701 may not have sufficient buoyancy to stay in position underwater. External ballast tanks 578ax with automated artificial intelligence (AI) 677 buoyancy control sub-system 686 may be used to achieve neutral buoyancy enabling body 701 to stay suspended in a relatively stable position in the water. Floatation collar bags 714 may be affixed fore and aft of body 701; inflated to provide additional buoyancy; or deflated as and when required by means of: UUV-230ax; UUTV-230ax; submersible boats 220ax; PSV-220ax; equipped with robotic appendages 522; air cylinders 203ax; etc.

Optionally, if deemed desirable and advantageous, the drive components for said above energy conversion system 700 may also be configured with standard units of integrated direct-drive turbine-generation with nacelles 611; 471ax (refer FIG. 4A U.S. Ser. No. 15/630,670) widely used in the marine renewable energy (wind and tidal current) extraction industry currently. Standard rotor-stator generators may also be used in lieu of centralized counter-rotating generators 585ax; 590ax mounted inside body 701.

Surface based supporting components of system 700 may comprise: boats 659; ships 741; outriggers 747; pontoons 734; buoys 508ax and ballast tanks 578ax; with automated ballast control systems 686; secured to seabed 537ax by means of mooring lines 295ax; buoy 508ax mounted reels 52ax bearing transmission lines 457ax and mooring lines 295ax; connected to turbine-generator body 700; sensitive and delicate electrical components such as rectifiers 622; transformers 622; sub-station 622; and hydrogen electrolyzer plants 509ax securely housed in buildings mounted on floating ballast vessels 578ax; solar panels 579ax on rooftops. Including split unit wind turbine system comprising: turbines 472ax; gearbox 583ax; mounted on vertical pillars 469ax; with extended shaft 595ax; generator 54ax. Or, optionally said turbines 472ax; gearbox 583ax; may be mounted on extended hydraulic booms 619; with extended shaft 595ax; generator 54ax. Other apparatus may comprise: integrated direct drive vertical-axis wind turbines 477vax units supported by vertically disposed pillars 618; or standard vertical-axis wind turbines 477ax units. A hydrogen plant comprising: electrolyzer modules 509ax; hydrogen-ammonia storage tanks 704; piping; pump; etc. may be built on a floating surface platform interconnected by means of beams 652; floor structure 715; gratings 703; etc. Hydrogen produced by the floating plant may be absorbed into liquid ammonia and stored in tanks 704. Liquid ammonia had a very high compatibility and affinity for absorbing hydrogen; and may be used as a carrier. Wherein, said liquid ammonia carrier may be handled, pumped, transferred in pipes; between storage tanks; tankers; terminals; end-user points; etc. by means of an existing global infrastructure used in handling ammonia. Reconversion from said carrier by means of metal membranes (CSIRO developed technology) into hydrogen gas may be carried out at the end-user points; and processed for sale to customers; etc. Underwater components may comprise powerful variants of drones UUTV-230$ax$; manned personal submersible vehicles PSV-220$ax$ for patrol-checking; monitoring; working as submersible tug-boats; pilots; towing, maneuvering turbine-generator 700 into desired positions. Customized mother ships 730 for servicing and repair of system 700 may comprise of vessels with a catamaran hull structure; wherein, said apparatus 700 may be suitably and safely brought into dry dock repair conditions by means of customized equipment that only a twin hulled vessel may be well suited to provide.

Split unit turbines-generator system 700 may be configured as an independent unit, or integrated into an energy extraction farm environment 710. Means of propulsion may comprise: a plurality of unmanned underwater tug vehicles UUTVs-230$ax$; or manned personal submersible vehicles PSV-220$ax$; manned submersible boats 220$ax$; flexibly attached to a plurality of traction apparatus 705; traction poles 705; adapted with customized traction pads 706; used mainly for linear maneuvering and side-ways movement and fine tuning of body 701 position. Flexibly attached to designated traction pads 706, a plurality of UUTV-230$ax$ may also be used as submersible tugs for navigation of turbine-generator 700. UUTV-230$ax$ may be detached once the turbines-generator 700 had been anchored by means of mooring lines 512$ax$; 295$ax$; hooked gripping apparatus 711; hydraulic clamping apparatus 712. Control surfaces and hydroplanes 205$ax$; 206$ax$; 207$ax$; 208$ax$; may be used to align body 701 with the tidal current flow. As and when required collar ring airbags cum floats 714 may be flexibly attached to the fore and aft body portions of turbines-generator 700 by means of: submersible boats 220$ax$; UUTV-230$ax$; PSV-220$ax$; mounted with robotic arms 522$ax$; or robotic appendages 522$ax$. Apparatus 714 inflated by means of compressed air from cylinders 203$ax$; provides additional buoyancy for lifting the body 701 to the surface. The buoyancy of external ballast tanks 578$ax$ may also be adjusted and maximized.

FIG. 4B illustrates details of Section 4B-4B configured with four large turbines 472$ax$; gearbox 583$ax$; mounted on shafts 691 in housing 592$ax$. FIG. 4C illustrates a variant configuration of FIG. 4B wherein eight smaller turbines 472$ax$ may be configured on the skin of turbines-generator body 701. The circle 707 around turbine 472$ax$ indicates the turbine blades swept area. Shaft 691 connects the external turbine unit 472$ax$ to the internally located shafts 692; transmission gearboxes 583$ax$ and other torque transmission mechanisms 693; 694; 695; 696; kept housed inside the water-tight body 701. Generating components comprising: rotor wire coils 474$ax$ surrounding a central shaft 581$ax$ integrated with rotor magnet core 476$ax$; lubrication system; cooling system 699; 702; and other auxiliary equipment are housed inside sealed body 701. Generator 585$ax$; or 590$ax$ may be configured running the entire length of the tidal; marine-hydro-turbine-generator 700; wherein said body 701 may be configured anywhere from: 100 m to 1 km long; bristling with 1,000 to 2,000 units of marine tidal turbines 472$ax$. For the purpose of torque transmission, the long generator 590$ax$ (running the entire length of body 701 from fore to aft) may be configured with a few sub-sections. Each individual sub-section of generator 590$ax$ may be configured to be driven; powered by 100 units; 200 units; etc. of marine turbines 472$ax$. External body 701 may be configured with a plurality of traction poles 705 providing docking ports 706 for drones UUTV-230$ax$ to pilot and navigate apparatus 700. UUV-220$ax$ or PSV-220$aax$ may also be used alongside UUTV-230$ax$. External ballast tank or vessel 578$ax$ flexibly mounted onto traction pole 705 may be adjusted to attain neutral buoyancy for system 700; enabling it to remain suspended at various depths in the water column. Automated buoyancy control sub-system 686 disclosed in FIG. 3K to FIG. 3L; by means of a computerized artificial intelligence (AI) module 677 may be used for maintaining the neutral buoyancy of turbine-generator 700.

FIG. 4D and FIG. 4E illustrates a farm configuration wherein a multitude comprising hundreds of turbine-generators 700 may be configured; systematically deployed; and securely anchored in an ocean renewable energy extraction plant 710; an energy conversion farm 710; or an energy generation park 710. Forming another component of Renewable Energies Conversion Complex 300$ax$. FIG. 4D illustrates the side view; while FIG. 4E illustrates a plan view of ocean energy conversion plant 710 (wherein concrete flooring 715 may be assumed to be transparent). A planned array, an ocean renewable energies conversion complex 710; stretching kilometers square in area; covering kilometers cube in volume. Wherein, rows upon rows; layers upon layers; a multitude comprising hundreds; or thousands of turbine-generator units 700 may be arranged horizontally; and stacked one on top of another in the vertical water column; rising from the seabed 537$ax$ to the sea surface 621. Each unit optimally spaced from the adjacent neighboring unit. Systematically harvesting; harnessing; extracting tidal stream energies of the ocean; including offshore wind and solar; for conversion into multi-Giga-watts of useful energies for human consumption.

Ocean energy conversion plant 710 may be configured with a plurality of large customized heavy-duty pillars 708; or columns 708; affixed securely into the seabed 537$ax$ by means of deep-sea piles 562$ax$; drilling pipes 651; and reinforced concrete slabs 653. Specially configured for use in the plant 710; pillars 708 and columns 708 may be adapted with slots 709; for installing: (a) mooring lines 512$ax$; pulley wheels 629; roller wheels 629; motorized 639 winch powered line reels 52$ax$; (b) hooked gripping apparatus 711; and (c) a plurality of hydraulic clamps 712 for gripping tightly onto body 701. A plurality of reinforced concrete floor 715; or levels 715 built atop said plurality of columns 708 may be used for mounting supporting equipment. Turbine-generator 700 may be parked in its designated slot 709 by means of such apparatus 711; 712; released to surface for servicing and repair works; and re-installation back into its designated slot without interfering in the operation of any other neighboring unit in the plant.

FIG. 4F illustrates a sectional side view; while FIG. 4G illustrates a perspective view of FIG. 4F showing the working mechanisms of anchoring apparatus 711. Sub-system 711 may be securely affixed into customized slots 709 configured into main pillars 708. Slots 709 may be configured to accommodate a mooring line 512$ax$ held securely in reel drum 52$ax$ mounted on the reinforced concrete floor 715 above. Passing through a plurality of motorized winch 639; pulley wheels 629; pulley roller-bars 629; line 512*ax* may be attached to nose-ring 716 on the fore nose-cone of turbine-generator body 701. Apparatus 711 may be configured with a plurality of gripping hooks 717. Gripping hooks 717 may be flexibly and securely attached to collar ring 718 configured on the neck of turbine-generator body 701; or opened up to release its grip. Gripping hooks 717 may be mounted in pneumatic or hydraulic operated holders 720. Optionally, gripping hooks 717 may be mounted in like hydraulic holders 720 residing inside of the main body 721. Said holders 720 configured with traction pads 719 at its points of contact with body 701; may be configured to operate; extending from and retracting back into the structural mounting body 721 of apparatus 711. Holders 720 may also be configured to move the plurality of grippers 717 outwards, towards the periphery; or moving them inward, towards the center. Thus "opening" and/or "closing" its gaping "mouth". Opening them up to enable gripping of collar ring 718; or for release from collar ring 718. Closing them in order to grasp; gripping tightly onto collar ring 718; holding body 701 in place. Grippers 717 may also be extended (longer) or retracted back (shorter) into holder 720. Said plurality of holders 720; grippers 717; and mooring line 512 moved by motorized winch 639 of line reel 52*ax* may be configured operably working in tandem with each other. Said ocean renewable energy conversion plant may be remotely controlled; monitored; coordinated; by means of: cameras; active and passive sensors; etc. Active use of aerial and underwater drones: UUV-230*ax*; manned PSV-230; etc. Providing instantaneous; interactive control of plant process and equipment.

For docking of turbine-generator unit 700 into assigned slots 709 of columns 708 the following sequence of maneuvers may be executed. Holders 720 may be operated to open up fully (larger gap between traction pads 719); grippers 717 fully open, extended outward. Mooring line 512 pulled taunt by motorized winch 639 of line reel 52*ax*; may be pulled to move slightly towards holders 720. Grippers 717 may be moved into closed position; extending beyond the ring 718; touching the skin of body 701. The length of the gripping hooks 717 may then be adjusted; its length may be firstly minimized; and then extended to 50% of its total length; and then locked in position; gripping onto extended collar ring 718 configured around the "neck" of body 701. Length of line 512*ax* may be slightly released and then pulled taunt; adjusted into optimized position. Holders 720 may be adjusted holding the nose-cone of body 701 in place. The plurality of body clamps 712 located on the fore and aft pillars 708 may then be activated to clamp tightly onto body 701. Multiple units of manned PSV-230*ax*; UUTV-230*ax* underwater tug vessels attached onto docking pads 706 of traction poles 705 and used to propel turbine-generator unit 700 may now be decoupled from docking pads 706. Collar airbags 714 affixed on the fore and aft of body 701 for buoyancy may now be depressurized; detached and removed by UUTV-230*ax* mounted robotic appendages 522*ax*.

For undocking of turbine-generator unit 700 from slots 709 of columns 708 the following sequence of maneuvers may be executed. Collar ringed airbag 714 may be securely attached to fore and aft of body 701; airbags 714 may also be affixed onto traction pole 705 by manned PSV-230*ax* or UUTV-230*ax*; then inflated by means of compressed air from cylinders 203*ax*; providing adequate buoyancy for unit 700 to float. The plurality of body clamps 712 may be deactivated and opened up; holders 720 opened up; mooring line 512 pulled taunt; moving the body 701 slightly forward; loosening it from the tight grip of grippers 717. Then the grippers 717 may be opened up, moving outward, releasing its hold on collar ring 718; and thus body 701. Line 512 may then be controllably released by motorized winch 639 of line reel 52*ax*. Allowing turbine-generator 700 to move aft naturally by means of tidal current flow. UUTV-230*ax*; manned PSV-230*ax* may be used for side way steering and adjustments to prevent body 701 or turbines 472*ax* from coming into contact with neighboring units.

FIG. 4H illustrates a sectional view 4H-4H showing the plurality of anchoring hooks 717 holding securely on to the extended rim of collar ring 718 configured on the neck of the body 701 of turbine-generator 700. FIG. 4I illustrates the working mechanisms of clamping apparatus 712. Configured as an encircling clamp, a plurality of pneumatic or hydraulic operated holders 722 with clamp pads 713 may be used. Wherein said plurality of holders 722 with clamping pads 713, once activated; held tightly onto the external skin of turbines-generator body 701. Providing a strangle hold on turbine-generator 700. The hydraulic system used to operate the holders 722 may reside in the body of apparatus 712. It may also be supported by equipment kept on floor 715 above. Apparatus 712 for the aft; pillar 708 located at the stern of body 701; may comprise of a standard two piece clamping apparatus operated by means of like hydraulic mechanisms 722 and clamp pads 713. Bringing the semi-circular bodies of the twin pieces of half-clamps together enables the apparatus to grip tightly onto the aft portion of body 701; while opening up the twin pieces of half-clamps releases its hold on the aft portion of body 701.

Optionally, the bow portion of turbine-generator body 701 may be modified as illustrated by a unit 700 nearest to the seabed 537*ax* in FIG. 4D. The nose cone (next to nose ring 716) portion may be miniaturized and made much smaller; instead of being the same size as the body 701. Similarly components of customized apparatus 711 and 712 may be reconfigured to suit such a modification. In one form the nose cone may comprise of a narrow flattened arrow-head-like piece with collar plates 718' sticking out of both the upper and lower surfaces. Such that the anchoring apparatus need not be configured or constructed large. But configured to be smaller, stronger, thicker and much more robust structurally.

Turbine-generator units 700 may also be deployed in a system of free floating bodies 700 suspended at various depths; spread out in the ocean as illustrated in FIG. 5K to FIG. 5L; enabled by means of a network of anchoring lines 295*ax*. One end of said lines 295*ax* may be anchored to the seabed 537*ax* by means of anchoring system 650 and 660; the other end supported by means of floating surface platform comprising: ships 741; catamarans 747; pontoons 734; ballast vessels 578*ax*; mooring buoys 508*ax*. Enabling systematic extraction of tidal energies from the bottom of the water column 537*ax* right up to the top 621 of the water surface.

FIG. 4J and FIG. 4K illustrates the sectional views of a customized ballast vessel 730; specially configured for on-site servicing and minor repairs of underwater turbine-generators 700 in dry docks condition. Ballast vessel 730 may be configured with a split body structure comprising an integrated catamaran-crane-ballast vessel with ballast tanks 723; 724; 725; at the fore portion to submerge/or float as required. While the aft portion comprises a (static and fixed) ship's body. Wherein said fore and aft joining point may be configured with a plurality of vertically disposed I-beams; and C-shaped outer sleeves. Upon which said flexibly connected fore portion may slide up and down said I-beams; by means of C-shaped outer sliding sleeves mounted onto said I-beams; as it operably submerges underwater; or float buoyantly as configured. Wherein the fore catamaran's body portion may be configured to operate independently of the ship's body. The fore portion may be held together by means of a plurality of pneumatic or hydraulic jacks and booms 619; and overhead cranes 727; attached to structural frame 728. Jacks and booms 619 may be lowered (FIG. 4J) to open up the front "inlet port" engulfing apparatus 700; or raised (FIG. 4K) to constrict said inlet port; extended or collapsed to lift or lower the load. Such that said catamaran's body may be operably submerged underwater; to capture the semi-submerged turbine-generator 700 with its body; secure apparatus 700 by means of restraining bars and hydraulic arms 729; constricting its twin catamaran (723; 724; 725) bodies like a pair of giant pincers; grasping and holding onto apparatus 700. Engulfing; embracing the whole apparatus 700 with its ballast body. Apparatus 700 may then be lifted upwards by means of a plurality of lifting cables 731 (fore; middle; aft sections of apparatus 700) attached to lifting lugs 732; motorized 733 overhead cranes 727. At the same time, the body of the catamaran may be lifted upwards by means of inflating variable ballast tank 724 with compressed air; creating the required buoyancy. Located at the middle portion of the catamaran's body, tank 724 may be collapsed, shrunken and constricted by deflation (FIG. 4J). It may be extended and blown up like a balloon by means of compressed air (FIG. 4K). The top 723 and bottom 725 portions of ballast tanks may be fixed in shape and buoyancy. Morphing ballast tanks 724 may be made of durable and pliable materials comprising: plastics; composites; rubber; synthetics; etc. The booms 619 carrying overhead crane 727 may then, be extended upwards to lift apparatus 700 higher up; out of the water. Restraining bar and hydraulic arm 729 may be moved higher up; then secured in position. Hydraulic jacks 619' may be used to prop up traction poles 705 holding apparatus 700 in a fixed position. Maintenance work may then be carried out in dry dock conditions.

FIG. 5A illustrates split unit generation system 740; a variant version of the underwater system 700 as disclosed in FIG. 4. System 740 comprises a surface based floating platform 740; integrating different drive units from both wind and water current: offshore wind turbines 472ax; tidal turbines 472ax; etc. Wherein the external body and skin comprising: deck 736; hull 737; of a ship 741; may be configured with a multitude of drive units comprising: horizontal axis wind turbines 472ax; horizontal axis hydro-turbines 472ax; vertical axis wind turbines 477ax; vertical axis hydro-turbines 477ax; drones HAV-100ax; HUV-200ax; HAV-400ax; multiple windbags system 76ax; multiple water-bags system 222ax; etc. These drive units may be configured and used for the extraction, conversion and transformation of ocean renewable energies derived from offshore wind and tidal streams (water currents). The energies extracted by said drive units may be transmitted by means of torque transmission systems 687; to the generating elements 474ax; 476ax of central generator 585ax; 590ax; located in the middle, at the center of the ship's body 741; running its entire body length; from bow to stern; from fore to aft. Said torque transmission systems 687 may comprise: (a) turbine shafts 475ax; 691; extended shafts 692; 595ax; gear boxes 583ax; gear-wheels 693; 694; 695; 696; bearing boxes 586ax and structural support 599ax; (b) line reels 582'ax; 582"ax; and transmission lines 591ax system; (c) dual line-reel drums 582ax cum 588ax with transmission lines 591ax protected by external cover 592ax; (d) sprockets 738; 739 and roller chains 742 system; (e) pulleys wheels 743; 744 and pulley belts 746 system; (f) bendable universal couplings 666 used for flexible transmission of angular torque; etc. In order to take advantage of the surface platform's (ship) uniquely large super-structure in terms of space; surface area and volume; additional generation modules may also be configured. This may include a plurality of like secondary generators 585ax'; 585ax"; located at both the port and starboard sides; as illustrated in FIG. 5B; including small individual driven units 55ax.

Wherein a split unit turbine-generation system 740 may be configured in which: (1) the collective energies in offshore wind and tidal stream extracted by means of a distributed network of drive units comprising: (1a) a plurality; a multitude of one type of drive unit (51ax); (1b) a plurality; a multitude of different types of drive units (51ax) such as: windbags 30ax; water-bags 40ax; horizontal axis wind and tidal turbines 472ax; vertical axis wind and tidal turbines 472ax; drones HAV-100ax; HUV-200ax; HAV-400ax; windbags 76ax; water-bags 222ax; vertical axis wind turbines 477ax; vertical axis tidal turbines 477ax; etc. (2) may be transmitted by means of an inter-connected network of turbine shafts 475ax; transmission shafts 691; extended shafts 692; 595ax; gears and gearboxes 583ax; bearing boxes 586ax; and structural support 599ax; etc. inter-linked to form a mechanical energy (torque) transmission system 687; for (3) powering a combined driven unit (54ax) such as 585ax; or 590ax. Wherein: said drive units comprising hundreds (or thousands) of individual units of (1a) one type; (1b) a variety of different types such as: wind turbines; tidal turbines; drones HAV-100ax; HUV-200ax; HAV-400ax; windbags 76ax; water-bags 222ax; etc. may be spread out all over the exterior, extending from the skin of said structural body 741 of the ship into the surrounding ocean environment in all directions; into the sky high above; into the ocean deep below; alike the tentacles of a hydra. All of the above said drive units configured for extracting the ocean renewable energies of wind and water. And transmitting said extracted ocean renewable energies to the driven units 585ax; 590ax; by means of an interconnected network of torque transmission system 687. Said plurality of transmission system 687 may comprise of: (a) shafts 475ax; transmission shafts 691; extended shafts 692; 595ax; gear boxes 583ax; gear-wheels 693; 694; 695; 696; (b) line reels 582'ax; 582"ax; and transmission lines 591ax system; (c) dual line reel drums 582ax cum 588ax with transmission lines 591ax protected by a cover 592ax; (d) sprockets 738; 739 and roller chains 742 system; (e) pulleys wheels 743; 744 and belts 746 system; (f) bendable universal couplings 666 for flexible transmission of angular torque; etc. Said driven unit 585ax; 590ax comprises a counter rotating generation system residing inside the belly of said surface platform's structural body 741 (ship). The variant horizontal axis wind turbines used may comprise split units systems with distinct sections comprising: turbines 472ax; torque transmission system 595ax; gearbox 583ax; a combined generator 585ax; 590ax. In one form the extended torque transmission shaft 595ax may be kept inside the hollow cavity of the tall supporting pillar 469ax. In another form a hydraulic or pneumatic boom 619 may be used as a supporting structure for turbine blades 472ax; with the extended torque transmission shaft 595ax kept inside a pliable cover 592ax. Mechanical torque from turbine blades 472ax may be routed by means of gear box 583ax'; extended shaft 595ax; gearbox 583ax"; extended shaft 692; to centralized generator 590ax. Due to its space saving configuration and compatibility with wind blowing from any direction, vertical axis turbines 477ax (refer FIG. 4A of U.S. Ser. No. 15/630,670) supported by pillars 618 may be preferred on the fixed decks 736 of ship body 741. Mechanical torque derived from turbines 477ax may be configured to power centralized generators 585ax; 590ax; by means of extended shafts 692; gearbox 583ax. Or, turbines 477ax may be connected to power the secondary units 585ax'; 585ax" housed in the bellies of ship 741. Integrated direct-drive-conversion, vertical axis turbines 477vax (refer FIG. 4I of U.S. Ser. No. 15/630,670) supported by pillars 618 which is self-generating may also be affixed on deck 736. Extended shafts 692 replicates extended shaft 595ax; except that the former is configured as part of the turbine-generator 700 system.

Said turbine-generator system 740 comprises a split unit energies extraction; transmission and conversion (electricity generation) system wherein; said driven unit 585ax; 590ax is specially configured for; and capable of being powered (propelled; driven) by means of a multitude of drive units comprising: (a) multiple apparatus of one type, for example: horizontal axis tidal turbines; or (b) multiple apparatus derived from a variety; different types of drive units such as, for example: horizontal axis wind turbines 472ax; tidal turbines 472ax; vertical axis wind turbines 472ax; vertical axis tidal turbines 472ax; windbags 30ax; water-bags 40ax; bagged power generation systems 76ax; 222ax; HAV-400ax; HAV-100ax; HUV-200ax. Said multiple drive units being actively engaged with the ambient wind and tidal currents; in extracting their energies; having a variety of different loads; velocities; tensional forces; directional orientations; etc. for conversion preferably into electricity. An amalgamation, a combination wherein the kinetic energies of wind and tidal currents extracted by means of said variety of different types of drive units comprising: wind turbines 472ax; tidal turbines 472ax; vertical axis turbines 477ax; HAV-100ax; HUV-200ax; multiple water-bags 222ax; multiple windbags 76ax; HAV-400ax; etc. may be transmitted by means of a torque transmission system to; one single driven unit. And used to power, propel (drive) said driven unit 585ax; 590ax. Automated step-up and/or step-down transmission gears; gear-boxes; may be used to provide uniform transmission speeds desirable for the seamless functioning of said generators. Clutch box apparatus 587ax (refer FIG. 7B to FIG. 7D of U.S. Ser. No. 15/630,670) may also be suitably configured for use with the main generation shaft 581ax; gearboxes 583ax; and bearing boxes 586ax. Apparatus 587ax may also be integrated with customized gearbox 583ax into a single unit. Said split unit renewable energy conversion system comprising of: (1) Energy extraction (drive unit 51ax); (2) Torque transmission means 687 (line 50ax; shafts 595ax; 691; 692); (3) Generation unit (driven unit 55ax). Energy conversion being: kinetic energy; to mechanical energy; to electrical energy.

Surface platform system 740 may be configured as an exact replica of system 700 as illustrated in FIG. 4A to FIG. 4C with tidal turbines 472ax. However, it may be desirable to introduce other innovative features in this variant disclosure. Therefore system 740 may replicate system 700, with the exception of two variant configurations comprising: (1) a variety of different drive units may be used to extract wind and tidal energies; and optionally (2) a variant configuration wherein the rotor wire-coil 474ax of generation unit 585ax; or 590ax; may be divided into 3 sections comprising: 585aax; 585bax; 585cax. Wherein the entire inner shaft 581ax cum rotor magnet 476ax of generator 585ax running from fore to aft; from bow to stern; may be configured to be wholly powered by hull 737 mounted tidal turbine units 472ax. Whereas the outer rotor wire-coil 474ax of generator 585ax may be configured; divided into 3 sections comprising: 585aax; 585bax; 585cax. The primary (longest) section 585bax (of the rotor wire-coils 474ax) located in the center may be powered by the plurality of deck 736 mounted wind turbine units 472ax. While the shorter secondary sections 585aax; 585cax of (the rotor wire-coils 474ax) located fore and aft may be connected to and powered by a variety of different drive units comprising: 30ax; 40ax; 76ax; 222ax; HAV-400ax; HAV-100ax; HUV-200ax; 477ax; etc. These numerous distributed drive units may have different configurations; thus producing differing torques; velocities; directional orientation; intermittent generation; etc. that necessitates their partial segregation from the more consistent tidal turbine units 472ax and wind turbine units 472ax; which powered the main generator shaft 581ax comprising rotor magnets 476ax; and rotor wire coils 474ax of primary section 585bax. Thus torque transmitted from drive units 30ax; 40ax; 76ax; 222ax; HAV-400ax; HAV-100ax; HUV-200ax; 477ax; etc. may be configured; assigned to power the rotor wire coils 474ax of secondary sections 585aax and 585cax. Wherein the power produced from secondary sections 585aax and 585cax; may vary and differ from the amount of power produced from main section 585bax, which may be more consistent. Automated transmission gears may be used to provide consistency in torque transmission and shaft revolutions (rpm). Optionally, main generator 585ax may be configured to be wholly powered by wind turbines 472ax and tidal turbines 472ax. Wherein said plurality of split unit sections 585aax; 585bax; 585cax; may be flexibly engaged or disengaged (combined together or segregated) by means of clutch box system 587ax. While torque transmitted from drive units: 30ax; 40ax; 76ax; 222ax; HAV-400ax; HAV-100ax; HUV-200ax; etc. may be routed to secondary generation units 585ax'; 585ax"; and small individual generator units 54ax; located port and starboard of production platform 740 as illustrated in FIG. 5B.

Alike system 700; torque derived from the multitude of drive units 472ax may be transmitted by means of system 687 comprising: flexibly configured shafts 475ax; gear boxes 583ax; torque transmission shafts 691; extended torque transmission shafts 692; 595ax; wire-coil transmission gear-wheels 693; gears 694; magnet transmission gear-wheels 695; gears 696; bearings boxes 586ax cum structural support 599ax; universal couplings 666; and other forms of mechanical parts and fittings; to the combined driven units 585ax; 590ax. Bearing boxes 586ax; structural mountings and supports 599ax may be used at the edges of generator components such as: 585aax; 585bax; 585cax.

Advantages of such a split unit configuration comprises: Energies extracted from different sources by means of different types; and a multitude of individual drive units may be transmitted and integrated into a centralized generation unit without affecting the functioning of the entire power generation system. A system flexibly and variably configured to cater for; and to accommodate: (a) a plurality, a multitude of drive units of one singular type; (b) a variety of different types of drive units; distributed at various points in the surroundings; on the land or water surface; submerged at various depths in the ocean; disposed at various heights in the atmosphere. Harvesting, harnessing and extracting the energies of wind and tidal stream; transmitting all of their extracted energies; their combined output (mechanical torque) into one processing point: 585ax. Wherein said concentrated output is absorbed by flexibly configured power generation plant 585ax. Total power produced may vary due to variable ambient conditions.

FIG. 5B illustrates optimized usage of the large space (area; volume) provided by the surface platform 741; wherein main generator 585ax located in the center ran from fore to aft; from bow to stern; hundreds of meters, kilometers in length. Secondary generators 585ax'; 585ax" and small individual units 55ax located port and starboard sides of vessel 741 may also be configured for additional generation capacity. Main generator 585ax; secondary units 585ax'; 585ax" may be kept inside the ship's belly. Smaller individual units 54ax'; 54ax" may be located on deck 736.

FIG. 5C illustrates a variety of different arrangements and structural configuration wherein wind turbines 472ax and tidal turbines 472ax configured outside of a pontoon's body 734; on the deck 736; and hull 737; may be connected with delicate; sensitive electrical generation units 585ax; 590ax kept safely inside its belly; protected and shielded from the extremely rough and corrosive ocean environment. From left to right: a pair of standard wind turbine 472ax and tidal turbine 472ax may be linked together to power generation unit 585aax; by means of extended shafts 595ax; 691. While a quartet of wind turbines 472ax on deck 736 may be paired with a mirror quartet of tidal turbines 472ax on the ship's hull 737 to power generation unit 585bax. The blades of the 4 units of wind turbines 472ax; as well as the 4 units of tidal turbines 472ax may be configured to rotate in the same direction. But their transmitted collective torque may be configured to power the split unit counter-rotational generator 585bax in opposing directions. The quartet of wind turbines may be mounted on a common shaft 475ax supported at both ends by twin pillars 469ax; and configured to orientate to face the wind direction by means of a moveable turntable 745 affixed on to the deck 736. Torque transmitted from the turbines by means of horizontal shaft 475ax; to gearbox 583ax; then to vertical shafts 595ax kept inside pillars 469ax; may be routed to power generator 585bax (mounted beneath turntable 745) by means of a transmission system 687 comprising a plurality of gear-like sprockets 738; 739; and roller chain 742. Optionally it may also be transmitted by means of a mechanism comprising a plurality of pulley wheels 743; 744; and belts 746. The quartet of tidal turbines on the hull transmitted its torque to gearbox 583ax; twin shafts 691; gearbox 583ax; to generation unit 585bax.

Located third from left; a variant pair of counter-rotating wind turbines 472ax (fore and aft) supported by twin pillars 469ax' may also be mounted on a moveable turntable 745' affixed onto the deck 736 (refer: FIG. 4H; U.S. Ser. No. 15/630,670). Transmitted torque from the counter-rotating turbines 472fax; 472aax; by means of horizontal shafts 475ax to vertically extended shafts 595ax' inside pillars 469ax' may be routed by means of gearbox 583ax; pulley-wheels 743; 744; and belts 746 system to power generator 585cax mounted beneath turntable 745'. Or; by means of sprockets 738; 739; and roller-chains 742 mechanism. A similarly configured variant pair of counter-rotating tidal turbine unit 472ax mounted on the hull 737 may be used to power generator 585cax. Another source of electricity generation may be derived from embedded generation components comprising: wire coils 488ax and magnets 489ax embedded into the blades of the twin counter-rotating turbines 472fax and 472aax. Such that when the turbine blades passes each other at high velocity and in close proximity; current may be generated in the embedded generation elements 488ax. Located last from left, an integrated unit of multi-bladed counter-rotating turbine-generator 490ax (refer FIG. 4C to FIG. 4G; U.S. Ser. No. 15/630,670) may be configured on the hull 737. The fore and aft turbines 472ax may be configured to rotate clockwise; powering the centrally located rotor magnet 476ax. While the middle three turbines 472ax may be configured to rotate anti-clockwise; powering peripheral rotor wire coil 474ax located in nacelle 611.

FIG. 5D illustrates commonly used torque transmission system 687 comprising: a sprockets 738; 739; and chains 742 transmission system. It may also be configured as, or comprise of: a widely used pulley-wheels 743; 744; and belts 746 transmission system. These simple mechanisms used the world over may also be adapted for use.

FIG. 5E and FIG. 5F illustrates a variant configuration 740v of system 740 in FIG. 5A to FIG. 5B wherein a turntable platform 745 may be used to address constraints and limitations associated with shifting winds; in the mounting of offshore horizontal axis wind turbine units. FIG. 5E illustrates the plan view; while FIG. 5F illustrates the frontal view of said variant configuration 740v. Normally individual units of integrated wind turbine-generator 471ax mounted on pillars 469ax; or boom 619; may be configured to rotate; re-orientate their turbines 472ax and nacelles responsive to changing wind directions; by means of yaw and pitch control mechanisms. This requires plentiful space around wind turbine units. However, in constricted areas and limited space of a floating platform 740v, where a plurality of wind turbine units 472ax may be configured; turning space is a luxury that is ill afforded. Such constraints may be overcome by configuring said turbines in fixed positions, rendering them incapable of "yaw" response. Instead, the entire platform 745 upon which the turbines are mounted may be configured to "yaw", to be rotated; turned and shifted around like a turntable by means of mechanized systems. Stability may be enhanced by means of a trimaran configuration wherein the main vessel 741 may be supported by twin outriggers 747p; 747s; mounted port and starboard sides connected by horizontal beams 652p; 652s; mounted fore and aft.

A centrally mounted beam or pillar 749 on the body of ship 741 forms the axis upon which turntable platform 745 rotates. Supported by multiple peripheral pillars 751a to 751f; mounted fore; aft; and on the outriggers 747p; 747s. Split unit wind turbines 472ax; extended shaft 692 and a centralized generator 585ax; 590ax may be configured on top of platform 745. Platform 745 rests atop ball bearings 752; and roller bars 752; configured inside "C" channel 753 securely affixed onto the platform's bottom surface. The circular shaped "C" channel 753 configured around the sides of platform 745 embraces flat plates 754 configured around central pillar 749; and affixed on top of side pillars 751a to 751f. Ball bearings and roller-bars 752 located in between the bottom C-channel rail 753 (top surface) and plates 754 (bottom surface) facilitates the turning movement of platform 745. Centralized yaw control system 755 which monitors and detect any changes in wind direction and conditions; may be configured to activate motors 756 powered gears comprising pinions and racks mechanism to move the turntable 745; facing directly into the head wind. A multitude of tidal turbines 472ax configured on the hull 737 of vessel 741 propelled a centralized generator 590ax mounted inside its belly.

Portable tidal turbine units 750 borne by mechanized hydraulic or pneumatic booms 758; and/or arms 758 may be used on the outriggers 747p; 747s; and at the sides of ship 741. The booms 758 may in turn be attached to motorized bodies 757 which supplied the pressurized medium comprising hydraulic fluid or compressed air required to power said booms 758. Motorized bodies 757 houses the hydraulic fluid reservoir and pump; or, compressor and air drums;

hydraulic or pneumatic transmission lines; etc. for powering the apparatus 750. Optionally, a centralized system may be used to supply compressed air or hydraulic fluids for operation. With body 757 used as a supporting structure; and may be securely affixed to the decks 736 of outriggers 747*p*; 747*s*; ship 741. For dexterity purposes hydraulic or pneumatic driven booms and arms 758 may be configured to be extended; retrieved; moved up or down; side-ways, etc. as and when required. Body 757 may be rotated from one side to the other. Attached to the boom or arm 758 is a sliding sleeve 759; which in turn holds an extendable and retrievable segmented crane boom 619. Attached to the tip of boom 619 is a tidal turbine 472*ax*. Such portable tidal turbine units 750 may be used to harness additional tidal energies. Portable tidal turbine units 750 may comprise of: (1) an integrated turbine-generator unit with nacelle 611; or (b) a split unit configuration. For split unit apparatus, torque transmission mechanisms 687 to a central generator may comprise: (a) shafts 691; extended shafts 692; 595*ax*; gear boxes 583*ax*; gear-wheels 693; 695; (b) line reels 582*ax'*; 582*ax"*; transmission lines 591*ax* system; (c) dual line reel drums 582*ax* cum 588*ax* with transmission lines 591*ax* protected by hard cover 592*ax*; (d) sprockets 738; 739 and roller chains 742 system; (e) pulleys wheels 743; 744 and belts 746 system; universal couplings 666.

FIG. 5G illustrates an integrated counter-rotational turbine-generator unit 471*ax* wherein multiple turbines 472*ax* of apparatus 750 may be directly used with a generator (nacelle 611) in generating power. The unit may be borne by mechanized hydraulic or pneumatic booms 758; and arms 619 of apparatus 750. And may be used on the outriggers 747*p*; 747*s*; at the sides of ship 741; supporting beams 652; grating 703; flooring 715; and configured to form part of system 740. The unit may be split into three portions with the fore and aft turbines 472*ax* configured to drive the shaft cum magnet 476*ax* clockwise. While the turbine 472*ax* located in the middle may be used to drive the wire coils 474*ax* anti-clockwise. Or vice versa. Internally sealed body joints 761 integrated the three portions together.

Figure 5I:
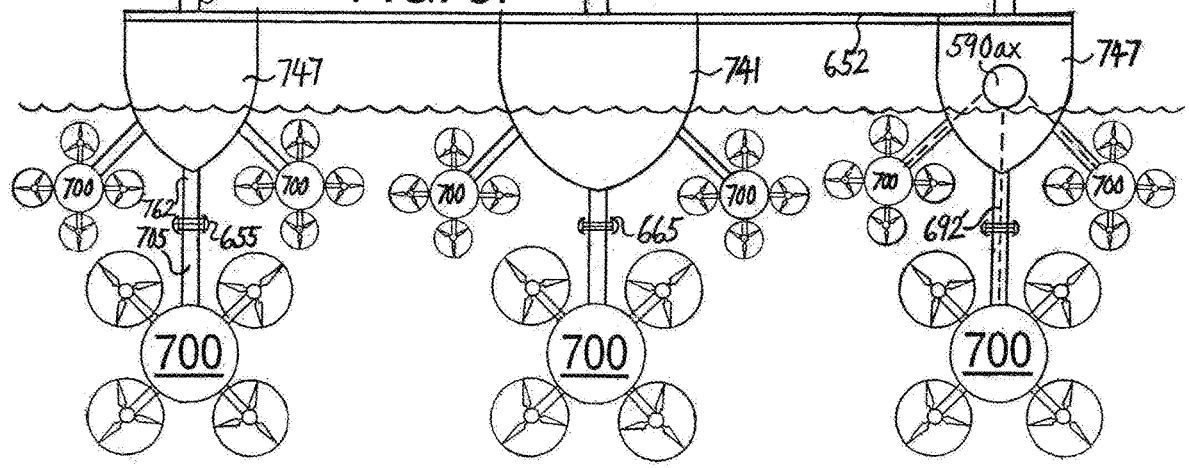
FIG. 5I shows the frontal view of a surface based floating system 750. A variant combined wind turbine cum tidal turbines generation system.

FIG. 5H and FIG. 5I illustrates an integrated hybrid surface and underwater ocean renewable energies (ORE) generation platform 760. Wherein a combined surface platform 740; or its variant 740*v* may be flexibly integrated with a plurality of underwater turbine-generator units 700 to form ORE system 760. The hull 737 of ship 741; or surface platform 740; may be configured with a plurality of customized underwater attachment apparatus 762. Said extendable and retractable attachments may comprise of struts; pillars; or beams 762. Wherein a plurality of underwater turbine-generator units 700 may be flexibly connected to customized struts or beams 762 by means of traction poles 705 and traction pads 706. Flexibly attached or anchored to the surface platform 740 for support; flexibly detached whenever required. Wherein, ocean tidal energies; or marine-hydro-kinetic energies may be extracted by means of the plurality of hydro-turbines units 472*ax* of system 700. Offshore wind energies may be extracted by means of wind-turbine units 472*ax*; 477*ax*; 477*vax* on the surface platform 740, or on the deck 736 of ship 741. Bagged apparatus 222*ax*; 76*ax*; HAV-100*ax*; HUV-200*ax*; HAV-400*ax*; HAV-400Max; etc. may also be used. Power generated by the multiple units of system 700 may be routed to mother-ship 740 for processing in rectifiers 622; transformers 622; etc. prior to transmission by underwater cable 457*ax* to shore based sub-stations 622. Multiple units of ship 741; outriggers 747; pontoons 734; ballast tanks 578*ax*; buoys 508*ax* may be interlinked by means of a floating platform grid 703 and combined together to form surface platform 740; 760. And may be integrated with fixed legs 291 platforms 290; floating platforms comprising: semi-submersible platforms 292*ax*; flatbed platforms 293*ax*; inflatable floating bodies 294*ax*; including mother ships 289*ax*; factory ships 296*fax*; tankers 296*tax*; FPSO vessels 511*ax*; forming an ocean renewable energies extraction and conversion complex and ecosystem 300*ax*. Other equipment may comprise: customized submarine boats 220*ax*; personal submersible vehicles 220*aax*; UUV-230*ax*; UUTV-230*ax*; configured with robotic appendages 522*ax*; robotic limbs 522*ax*; for executing delicate and dexterous underwater tasks that would normally have been undertaken by humans. But due to hazardous conditions immediately dangerous to life and health (IDLH); such tasks may only be performed by means of robotic-drones; or drone-bots.

Optionally, as illustrated at the right side of FIG. 5I; a variant configuration may comprise the routing of tidal energies extracted by means of submerged system 700 to a surface based generator 585*ax*; 590*ax* in ship 741 for generation. Wherein tidal power extracted by means of hydro-turbine units 472*ax* may not be converted directly in body 701; but may be combined together by means of gearboxes 583*ax* and extended shafts 692 in the submerged body 701; said combined torque may be transmitted by means of a plurality of extended shafts 692' configured inside customized traction poles 705 cum beams 762 to generator units 590*ax*; 585*ax* mounted in the bellies of surface platforms 740 comprising ships 741; catamarans 747; buoys 508*ax*; ballast tanks 578*ax*; etc. Wherein, extracted tidal energies from multiple units of system 700 may be combined together to power one driven unit 585*ax*; 590*ax* aboard outrigger 747. This variant is illustrated at the right side of FIG. 5I. Such an additional torque transmission step (from 700 to 747) may entail some loss in energy during the total conversion process. However, the numerous advantages gained may far outweigh any minor loss; such as the huge costs savings related to design, engineering and production of surface based generation systems versus miniaturized underwater systems where water proofing and leak prevention of electrical components incurs extremely high costs at present. Other advantages may be related to the safety, health and security issues of locating such delicate and sensitive electrical generation systems underwater. Preferably located on surface based platforms 741; 747; 508*ax*; 578*ax*; spar buoy 607*ax*; pontoons 734; etc. above water. Any transmission loss suffered may be recouped by means of adding more turbine units to make up. And by extending the range of the energy farm; by increasing the area; volume; renewable energy extraction space. By venturing higher, deeper, further out. Because wind-turbines; hydro-turbines; torque transmission shafts; sea-water lubricated gear-boxes; etc. does not cost a bomb. Water proofing; leak proofing and water-tight sealing systems for individual nacelles 611 configured with one-step, direct energy conversion systems (kinetic-mechanical-electrical energies) comprising integrated turbine-generators 611—costs a bomb.

FIG. 5J to FIG. 5L illustrates a variant arrangement of FIG. 4A to FIG. 4I and FIG. 5H to FIG. 5I; wherein said variant platform 760*v* may be configured with an ocean surface floating platform 740*v* supporting an underwater deployment comprising a flotilla; an armada of floating underwater; buoyancy-neutral turbine-generators 700; suspended in the sea and ocean at various depths. Enabling extraction of tidal stream energies across the water column; spanning the bottom seabed 537*ax* right up to the top water surface 621 (floating platform 740*v*); covering hectares/or square kilometers in area/or cubic kilometers in volume. FIG. 5J illustrates the frontal view; whereas FIG. 5K illustrates the side view of the deployment of such a submerged array of undersea apparatus 700. FIG. 5L illustrates the attachment points 763 connecting apparatus 700 to anchoring lines 295ax. Wherein, said surface platform 740v configured comprises a plurality of ships 741; catamarans 747; outriggers 747; trimarans 747; mooring buoys 508ax; ballast tanks 578ax; pontoons 734; etc. flexibly inter-connected by means of beams 652; platform gratings 703; solid structural floorings 715; etc. Said underwater power generation system comprising a flotilla; an armada of floating bodies 701 wherein, thousands upon thousands of horizontally disposed floating turbine-generator units 700; may be suspended at various depths in the deep seas and the oceans by means of mooring lines 295ax. The bottom end of said mooring lines 295ax may be securely anchored to the seabed 537ax by means of man-made: drill strings 651; concrete pads 653; piles 562ax; beams 562ax; pillars 545ax; plugs 564ax; etc. integrated into the naturally occurring seamounts 555ax and underwater ecosystem. Drill-string anchoring system 650 and 660 (FIG. 3A; FIG. 3G) may be used for anchoring of mooring lines 295ax. This enables periodic change out of lines 295ax to be done systematically.

The top end of mooring lines 295ax may be attached to line reels 52ax associated with the floating surface platform 740v. The plurality of lines 295ax may be modified; specially configured; adapted with a plurality of attachment apparatus 763; enabling anchorage of units 700 at various designated depths in the water column. Instead of two fore and aft lines as illustrated in the simplified figures; each of the fore and aft attachment points for units 700 may comprise dual lines, one at each side (total 4 lines): one line each located fore port and starboard; aft port and starboard. Or, more lines may be configured if required. Points of attachment may comprise use of traction poles 705; and customized traction pads 706 which may be flexibly attached to; and/or detached from a matching customized anchoring apparatus 763; configured at/or along specific points of lines 295ax. Such attachment mechanisms may comprise of: magnetic; vacuum-suction effects; mechanical clamping systems; etc. or a combination apparatus 763 configured from said variety of individual components. Said surface platform 740v may be mounted with wind turbines 472ax; 477ax; 477vax; on deck 736 or on turntable 745; and centralized generation units 585ax; 590ax in the bellies; or inside sheltered housing structures on deck. Floatation apparatus 765 may be used to shore up buoyancy of lines 295ax and apparatus 700 at various depths. Apparatus 765 may comprise a variant hydro-dynamically shaped ballast tank or vessel 690 armed with automated ballast-buoyancy control system 686 (minus the turbine 471ax) of FIG. 3K to FIG. 3L. Underwater power transmission line 457ax running from anchor point 764 on the seabed 537ax to the surface platform 741 may be configured with teed-off connections 766 enabling transmission of power generated by individual units of turbine-generator 700. Work-horse units comprising: UUVs-230ax; UUTVs-230ax; PSVs-220ax; submersible-boats 220ax; may be deployed for monitoring; minor repairs; and their main tasks of shunting (pilotage) units 700 to and from their specific berths (attachment points 763) on lines 295ax. Such as the removal of a unit 700 for repair; then reinstate back for normal operation. A system 760v configured for operably generating multi-Giga-Watts of clean and green; blue ocean renewable energies (ORE) for human consumption.

FIG. 6A to FIG. 6E illustrates a split unit tidal energy extraction system 770 wherein, a multitude of floating apparatus 768 comprising hydro or tidal turbines 472ax (drive units) supported by means of self-buoyant floats 767 mounted on an extended shaft 595ax; 692ax; (transmission units) connected in between twin structural bodies 607ax; 771; may be configured for use with vertically disposed generators 585ax; 590ax; (driven units) configured inside the structures 607ax; and 771. Structure 771 may comprise of a customized, reinforced concrete structure specially configured for extraction of ocean renewable energies—tidal stream and offshore wind energies. Structure 607ax may comprise of a floating Spar unit moored to the seabed 537ax by means of anchoring lines 295ax. Multiple units of such horizontally configured shafts 595ax; 692 may be affixed between said structures 607ax and 771 at intervals; arising vertically from the seabed 537ax to the surface 621 of the sea; from the bottom 537ax to the top 621 of the water column. Wherein, a plurality, a multitude of such structures 607ax and 771 may be configured running parallel to each other in the sea and ocean based energy conversion farm 300ax. Said structures may be flexibly configured wherein, one structure 607ax may be paired with another similar structure 607ax; or structure 771 may be configured with another structure 771. Or with a plurality of other customized floating; submerged; submersible seaborne structures; fixed legs 291ax jackets 290ax; floating flatbed platforms 292ax; 293ax; 294ax; etc. in farm 300ax. Said floating body 607ax at one end may comprise of a Spar structure anchored to the seabed 537ax by means of mooring lines 295ax; whereas body 771 with walls 772 at the other end may comprise of a permanent structure affixed to the seabed 537ax. Inside of both structures 607ax and 771 may be configured a tall and long vertically disposed generator 585ax; 590ax; running from the top to the bottom (sea surface 621 to seabed 537ax). Such that the plurality of floating tidal turbines 768 mounted on extended shafts 692 may be used to extract the kinetic energies of tidal streams; converting said kinetic energy into mechanical energy; transmission of torque generated by means of extended shafts 692 to gearboxes 583ax'; 585ax"; then into dual units of generators 585ax'; 590ax'; 585ax"; 590ax" kept inside structures 607ax and 771; located fore and aft; upstream and downstream of the tidal current flow. The distance in between structural bodies 607ax and 771 may be: 100 meters; 1 km; 5 km; 10 km; 20 km; 50 km; etc.

Disclosed herein is a structural configuration and arrangement wherein: a (one) singular extended shaft 595ax; 692; carrying a multitude of tidal turbine units 768; may be configured with both ends (fore and aft edges of horizontally disposed shaft 692) connected to; driving, propelling and powering two (twin) units of counter-rotating generators; one at each end; at the same time (at one point in time). Wherein, one said generator 585ax' (fore) resides in structure 771; one said generator 585ax" (aft) resides in the Spar structure 607ax. Said renewable tidal energies conversion process comprises: kinetic energy (tidal current) to mechanical energy (tidal turbine 768; extended shaft 692) to electrical energy (generators 585ax'; 585ax").

FIG. 6B illustrates one single floating tidal energy extraction unit 768; comprising of: a turbine 472ax (no nacelle) hemmed in by dual floating bodies 767f (fore); 767a (aft); borne by a fixed rotating shaft 595ax; 692; in the middle. Dual floatation bodies 767f; 767a; filled with air 683; positioned fore and aft of turbine unit 472ax is configured to support the weight of turbine unit 472ax with its buoyancy. Such that the combined apparatus may be configured to be self-supporting; buoyancy neutral; weightless; able to keep afloat; and remains suspended in the water. Fitted with vertical and horizontal fins 206ax; 207ax; floats 767 enables directional orientation relative to tidal current flow; keeping the turbine unit 472ax in optimal position. The stabilizers 206ax; 207ax; channels a streamlined flow of tidal current to the blades of turbine units 472ax. Optionally, floats 767 located fore and aft of turbine 472ax may be configured without any fins or vanes 206ax; 207ax. They may be affixed onto extended shaft 692; rotating together with shaft 692. Floating bodies 765 may also be used for supporting system 770. The hubs of turbine 472ax may be affixed to customized, specially configured traction pads 769 on the extended shaft 595ax; 692; spaced at regular intervals. A plurality of turbines may be attached to said shaft 692 stretching between the two structures 607ax; and 771. Said plurality of floats 767 may in turn be kept in position along the extended shaft by means of twin coupling 774 installed fore and aft; at both ends of the apparatus 767. Tidal turbine unit 768 may be configured for bi-directional operability; wherein, tidal current flowing in both directions due to flow and ebb (to and fro) may be used to drive the unit. Except for a change in the direction of tidal flow and turbine rotation; all parameters remains the same.

FIG. 6C illustrates a piece of coupling 774 which may be configured from two components 774i; 774e. The inner coupling 774i may be securely locked onto the extended shaft 595ax; 692; staying in position; following the rotating movement of extended shaft 595ax; 692; which transmitted the torque. Inner coupling 774i may be configured to turn freely and independently of external coupling 774e; by means of ball bearings 752 placed in between the twin couplings. Whereas, the external coupling 774e affixed to floats 767 kept the whole apparatus in position; without being affected by the movements of the turbine blades 472ax; and the torque transmitted by extended shaft 595ax; 692.

FIG. 6D illustrates a float body 767 which may be configured with a plurality of fixed control surfaces; two vertically positioned fins 206ax; two horizontally positioned fins 207ax. With the topmost portion of the vertical fin 206 configured with a buoyant tube 773 filled with air 683; keeping apparatus 767 in an upright position. Thus the whole extended shaft 692; turbine rotor blades 472ax; fore and aft internal coupling 774i may be configured to move freely. Turning independently of the dual supporting floats 767f; 767a; and the external couplings 774e mounted fore and aft.

FIG. 6E illustrates a customized drive unit comprising twin turbine blades 472ax with a flexibly configured shaft sleeve 775; a swing-gate section 775s; and an internal sliding sleeve portion 776. Such a configuration enables flexibility of removing a pair of defective turbine blades for repair; and instantly reinstalling a replacement set of turbine blades onto the extended shaft 692. Wherein, turbine 472ax may be moved into position on the extended shaft 692 by means of surface hoists or cranes; UUTVs-230ax; PSV-230ax; etc. Shaft sleeve 775 with both the swing-gate section 775s; and the sliding sleeve 776 primed open; may be slotted into position on the customized traction pad 769 of extended shaft 692. The inner sliding sleeve 776 (refer to arrow) may be closed into position; and the swing-gate section 775s clamped shut and locked. Shaft sleeve 775 of turbine 472ax is now securely fastened onto extended shaft 692.

Instead of the split-unit configuration as disclosed in FIG. 6A to FIG. 6E above; system 770 may optionally be configured with a plurality of integrated one-step direct conversion tidal turbine units 471ax (with nacelles 611); supported by enlarged floats 767; 765; a variant self-regulated ballast vessel 578ax (system 690 as disclosed in FIG. 3K to FIG. 3L). Instead of structures 771 and 607ax; a plurality of supporting pillars 708 may be used. Instead of extended shafts 692; the plurality of floating turbine units 471ax may be secured by anchoring lines 295ax to pillars 708. With undersea cables 457ax; teed-off connections 766 used for power transmission as in FIG. 5J to FIG. 5L.

FIG. 6F illustrates an improved variant configuration of centralized split unit counter-rotational generator 585ax; 590ax which may be used in structure 771; 607ax. Wherein said vertically configured generation system may be modified into sections 777; 777'; 777''; with torque transmission gears 583ax or gearboxes 583ax installed at each end (fore and aft; top and bottom) of said generation section. Section 777 may be connected to the bottom section 777'; and the top section 777''; by means of central shaft 581ax. Each section 777 may be configured measuring: 10 meters; 30 m; 50 m; etc. Segmentation enables effective transmission of mechanical torque into the counter-rotational generation system in order for it to work efficiently. Central shaft 581ax mounted with magnets 476ax may be configured to be driven by means of gear-wheels 695; 696. A plurality of shafts; gears and gearbox transmitted the mechanical torque from the drive units to the central shaft 581ax by means of: extended shaft 692; gearbox 583ax; gear 696; gear-wheel 695. Gear-wheels 695 are directly mounted on and connected to central shaft 581ax. Gear-wheel 695 does not have any contact with top yoke 484' and bottom yoke 484''. Likewise the peripheral wire-coils 474ax surrounding the magnets 476ax of section 777 may be configured to be driven by means of gear-wheels 694; 693. A plurality of shafts; gears and gearbox transmitted the mechanical torque from the drive units to the top yoke 484ax'; and the bottom yoke 484ax'' by means of: extended shaft 692; gearbox 583ax; gear 694; gear-wheel 693. Gear-wheels 693 are directly mounted on and connected to the top yoke 484ax'; and bottom yoke 484ax''. Gear-wheels 693 does not have any contact with central shaft 581ax.

Central shaft 581ax mounted with magnets 476ax may be configured to run continuously from one section 777 to adjacent interconnected sections 777'; 777''; etc. Optionally, central shaft 581ax in between generation sections 777'; 777''; 777'''; may be connected by means of clutch-gear mechanism 587ax. Such variability and flexibility of configuration ensures optimal performance of said generation system. Wherein, any defect in generation (driven) section 777 (for example: due to any defects arising from the plurality of associated distributed units of drive apparatus) may be decoupled and isolated from other sections of the centralized generation system 585ax; 590ax. Until said defective components had been rectified; section 777 powered up; its performance validated; may the section be recoupled back to said centralized generation system by means of mechanism 587ax.

FIG. 6G illustrates an optional configuration wherein generating elements may be configured to be located above the water surface 621. Wherein said torque transmitted by means of horizontally extended shafts 692; may be further transmitted by means of gearbox and additional vertically extended shafts 692' mounted inside the structures 771 (or 607ax) to generators 585ax; 590ax located at the apex, at the top of structures 771. Above the water surface 621.

FIG. 6H illustrates a structural configuration wherein an extended tidal energy farm 300ax may comprise of a linear arrangement in which, a series of multiple structures 771 (and/or, 607*ax*) may be configured in series. With extended shafts 692 connected in between each pair of structures 771 (or 607*ax*); one upstream structure 771 linked to another downstream structure 771'. Wherein said downstream structure 771' (now referred to as an upstream structure 771') may in turn be linked to another structure 771" configured further downstream. And so on. Each pair of said structures 771 interconnected by means of a plurality of extended shafts 692 bearing a multitude of floating tidal turbines 768. Wherein, each downstream structures may be configured with a pair of generators 585*ax*; one for upstream shaft 692'; another for downstream shaft 692". Such a system may be used in the river; coastal areas; deep sea or ocean.

FIG. 6G and FIG. 6H illustrates system 770; a structural configuration wherein a multitude of fixed and enclosed marine structures 771 resting on sea-legs 772 affixed in seabed 537*ax* may be constructed, spaced at intervals forming an ocean energies extraction plant 770. FIG. 6G illustrates a perspective side-sectional view of an enclosed marine structure comprising top-side housing structure 771; and submerged sea-legs 772 for harnessing ocean energies. Providing an optional configuration of FIG. 6A wherein, said generating elements maybe located above the water surface 621. Wherein said torque transmitted by means of horizontally extended shafts 692 mounted with a multitude of tidal turbines 768; may be further transmitted by means of a plurality of gearboxes 583*ax* and additional vertically extended shafts 692' mounted inside the submerged structure 772 to generators 585*ax*; 590*ax*; 777 located at the apex, atop structure 771 (or Spars structure 607*ax*; ocean pods 785); well above the water surface 621. Torque generated by wind turbine 472*ax* maybe transmitted to generator 777 for conversion to electricity.

FIG. 6H illustrates an optional configuration of FIG. 6A; showing a plan view of an integrated structural configuration wherein multiple interconnected marine structures 771 may be arranged to maximize harvesting of ocean renewable energies comprising: solar; wind; tidal; wave energies; OTEC; salinity gradient energy converters; etc. Wherein an extended tidal energy farm 300*ax* may comprise of a linear arrangement in which, a series of multiple structures 771 (and/or, Spars 607*ax*) may be configured in series. With extended shafts 692 connected in between each pair of structures 771 (or 607*ax*); one upstream structure 771 (for example: marked A1) linked to another downstream structure 771' (for example: marked A2). Wherein said downstream structure 771' (marked A2) may now referred to as an upstream structure 771'; said structure 771' (marked A2) may in turn be linked to another structure 771" (marked A3) configured further downstream. And so on. Said structure 771 may also comprise of a floating Spars structure 607*ax*; an ocean Pods structure 785. Each pair of said structures 771 may be interconnected by means of a plurality of extended shafts 692*ax* bearing a multitude of floating tidal turbines 768. Wherein, each downstream structures may be configured with a pair of generators 585*ax*; 590*ax*; 777; one for upstream shaft 692'; another for downstream shaft 692". Such a system may be used in the river; coastal areas; deep sea or ocean. Shape of said hydro-dynamic structure: 771; 607*ax*; 785 may be varied, creating minimal resistance or obstruction to tidal flow.

Preferably, such permanent marine structures 771 located upstream may comprise: fixed concrete and steel structures securely built into the seabed 537*ax*. Whereas the floating structures further downstream may comprise Spars 607*ax* or ocean Pods 785; said apparatus held in position by means of cables anchored to the seabed 537*ax*; wherein their positions may be shifted slightly to follow the tidal flow. Or, intentionally shifted to be aligned at an angular inclination to the tidal current flow; in order to maximize engagement of said energy conversion apparatus with fresh tidal flow. A multitude of inter-connected tidal turbines 768 mounted in between the Spar structures 607*ax* may be used to transform tidal stream into mechanical energies. The turning moment (torque) generated may be transmitted by means of elongated shafts 692*ax*; and used to power vertically disposed generators 777 (FIG. 6A) located inside the vertically disposed hollow cavities 778 of the "legs" 772 of fixed structures 771; floating Spar structures 607*ax*; floating ocean Pods 785. In the case of Spars structures 607*ax* and ocean Pods 785; the bottom portion of the pillar like floating protrusion (similar to sea-legs 772) may preferably be filled up with water for structural stability and balance. Such that portions of said pillar not used for the purpose of torque transmission may be filled up with sea water. Torque may also be channeled by means of extended, vertically disposed shafts 692 located inside energy transmission wells 778 formed by sea-legs 772 of structure 771; to horizontally disposed generators 777 located on the surface. Inside the top portion of Spar structures 607*ax*; where such surface based generators; transformers 622; and other delicate electrical switching gears and equipment 622 are kept dry, secure and well protected from the external environment. FIG. 6I and FIG. 6J shows a flexibly extendable and retractable strut 779; or shunt 779 which may be used to connect portions of elongated shafts 692'; 692" together. Accommodating and allowing for minor shifts in the position and length of the shaft portions 692' and 692". FIG. 6I illustrates the side-view cum cross-sectional view. FIG. 6J illustrates the plain view of FIG. 6I. The shunt 779 may be inserted into the hollow portion of modified shaft 692; connecting both portions 692' and 692" together. Shunt 779 maybe configured with a rivet shaped pin head 781 with a broad cap at both ends. Shaft portions 692' and 692" maybe configured with two long slots 782 for pins 781 to slide along; move inside said slots 782. Shunt 779 may be configured with two springs 783 at each end. Wherein, said spring 783 loaded shunt 779 may be kept in a balanced position in the middle of said twin shafts 692' and 692".

Fixed structure 771; Spar structures 607*ax*; or ocean pods 785 affixed into the seabed 537*ax* with cables 295*ax* may be interlinked and inter-connected to each other by means of a network of structural framework comprising: gratings 703; supporting grid of steel structures 290*ax*; concrete and steel bridges 784 and tube-connectors 786; girders 787; made of metal; ceramics; plastics; composite materials; etc. Such inter-connectivity strengthens the entire structural configuration of the renewable energies extraction plant 770; and provides an ocean-based platform and eco-system 300*ax* upon which to erect solar panels 579*ax*; wind turbines 472*ax*; 477*ax*; bagged wind and water generation systems 100*ax*; 200*ax*; wave energy converters; ocean-thermal-energy-converters (OTEC); drones system 60*ax*; 80*ax*; 90*ax*; integrated with turbines 500*ax*; 500*vax*; to form wind and tidal energy generators: 800; HAV-800; HUV-800; turbine-generators 800. Forming a truly integrated ocean renewable energies (ORE) generation plant 300*ax*/or ORE farm 300*ax*; specially configured for extraction of ORE comprising: tidal; waves; wind; solar energies; etc.

FIG. 6K illustrates a variant sea-based structure 780*a*; a plurality of wind and tidal energies conversion apparatus mounted on monopile 788 affixed to the seabed 537*ax*. This may be used in shallow waters. Dual wind turbines 472*ax* and tidal turbines 472*ax* generated torque may be transmitted by means of: gearbox 583*ax*; extended shafts 692 mounted inside rotational energy (torque) transmission well 778; and combined together at the surface based platform 736 to power a generation module 585*ax*; 590*ax*; 777.

FIG. 6L illustrates a variant sea-based structure 780*b* of FIG. 1D for use in deeper waters. Multiple tidal turbines 472*ax* and wind turbine 477*ax* maybe mounted on a larger and taller monopile 788. Torque generated by said multitude of wind and tidal energies conversion apparatus may be transmitted by means of gearbox(es) 583*ax*; extended shafts 692; and used to power a surface based generation module 585*ax*; 590*ax*; 777.

FIG. 6M illustrates a variant configuration 780*c* comprising a multitude of vertical-axis wind and tidal turbines 477*ax* configured in proximity to each other. Operating independently of each other, their individually generated torque may be transmitted by means of extended shafts 692; gearboxes 583*ax*; channeled and combined together in powering a centralized generation module 585*ax*; 590*ax*; 777. Said generator safely located on the surface platform 736: above sea-water 621*ax* level and tidal turbine 477*ax*; and below, at the bottom of wind turbines 477*ax*. Wherein, wind energies and tidal energies extracted by means of said plurality of energy conversion apparatus may be used to power one centralized generator 777. Of course, torque generated by individual turbines may also be configured to power integrated turbine-generation modules; nacelles 611; 471*ax*; as is the standard practice.

However, such water-proofing design for submerged generators (tidal turbines); or miniaturized generators (high up in the nacelles of wind turbines) may be much more expensive; delicate; less durable; more difficult to maintain than standard surface based generation systems used the world over. Those systems 585*ax*; 590*ax*; 777 built on dry land; or (above water) surface; located on floating platforms; in barges; ships; etc. may be constructed of heavy-duty, rugged design; easy to access for checking; maintenance and repair of the machineries. Without the need to bring them down/or up from a great height (wind turbines); nor the need to lift them down/or up from the seabed 537*ax* (tidal turbines) using tall/or large cranes. Of course some losses in efficiency may occurs due to frictional loss and transmission loss (shafts 692; gear-boxes 583*ax*) in between the energy conversion components: the turbines (kinetic to mechanical) and generators (mechanical to electrical). This slight loss might well be off-set by adding extra turbines to make up for the desired production. Electrical energies produced by means of said plurality of wind and tidal energies conversion devices; apparatus; including generators 585*ax*; 590*ax*; 777; of present invention, may be transmitted from generation modules 777 by means of underwater cables 457*ax*; down through monopile 788 casing; legs 291*ax* of platforms 290*ax*; etc. to the seabed 537*ax*. Said cables 457*ax* maybe connected to the main submarine transmission header cable 457*ax''* by means of connectors (alike teed connector 766). Where it may be further routed by means of said cables 457*ax''* laid in submarine cable-trenches 789; to shore based electrical transformers; sub-stations; electrical power rectification-distribution facilities 622; etc.

FIG. 7A illustrates a variant system 780*d* of FIG. 6A to FIG. 6M wherein, torque generated by means of wind turbines 472*ax*; 477*ax*; and floating tidal turbines 768 (472*ax*); 477*ax*; may be combined together powering a surface, deck 736 and platform 290*ax* based centralized generation plant 777; 585*ax;* 590*ax*. Wind turbines 472*ax*; 477*ax*; may be mounted atop fixed legs 291*ax* platform 290*ax*. Vertical axis wind turbine 477*ax*; and horizontal axis wind turbine 472*ax* mounted on pillars 469*ax*; transmitted their torque from the central shaft 475*ax*; to generator 777 by means of extended shafts 692 and gearboxes 583*ax*.

Said floating turbines 768; 471*ax* may be configured differently from each other. In one configuration torque generated by a plurality of submarine floating turbines 768 may be transmitted by means of gearboxes 583*ax* and extended shafts 692 to deck 736 mounted generator 777. Said floating tidal turbines 768 configured with neutral buoyancy mounted on extended shaft 692 may be anchored at the bottom end to bearing box 586*ax*; which may be mounted on concrete base 653 secured to the seabed 537*ax* by means of drill strings 651; piles 562*ax*. The top end of extended shaft 692 may be connected to gearbox 583*ax* and generator 777 on platform 290*ax*. Floating tidal turbines 768 of neutral buoyancy (weightless when suspended in the sea water) impose zero forces of stress or strain by the apparatus themselves. All such forces created would be due to their engagement with tidal currents; and the transformation; conversion of energies; from kinetic to mechanical to electrical energies.

In a variant configuration, renewable electricity 456*ax* generated by means of tidal energy conversion unit 471*ax* comprising: tidal turbines 472*ax* integrated with nacelles 473*ax* (containing coil 474*ax*; magnet 476*ax*; also refer to apparatus 611); may be transmitted by means of undersea cables 457*ax'* to transformers in substation 622 for rectification. Teed-off connectors 766 may be used to transmit power off-take between individual tidal energy conversion unit 471*ax* and common transmission cable 457*ax'*. Rectified high-voltage power from substation 622 may be transmitted by means of undersea cables 457*ax''* (larger capacity than cables 457*ax'*) to shore based electrical sub-stations cum transmission systems. Transmission lines 457*ax''* may be routed through the legs 291*ax* of fixed platform 290*ax*; and undersea transmission cable trenches 789. Buoyant tidal turbines 471*ax* integrated with nacelles may be configured with larger floats 767 to cater for the heavier nacelles 473*ax*. Tidal turbine-generators 471*ax* (611) may be held in place by means of securing lines 295*ax*. The buoyancy of lines 295*ax* may be augmented by means of individual floatation apparatus 765.

The bottom end of lines 295*ax* may be anchored at point 764 to concrete base 653 secured by drill strings 651; drill casings 651; sea piles 562*ax* to the seabed 537*ax*. The top end of line 295*ax* may be connected to integrated winches 59*ax* cum line reels 52*ax*; mounted on the lower deck 736 of platform 290*ax*. Optionally, said winching system 59*ax* may also be configured to comprise of double lines system. (Refer to U.S. patent Ser. No. 10/113,534 FIG. 6O; system 510u.) Anchoring lines 259*ax* may be substituted by lines 542*ax*. Wherein, said double lines 542*ax* may form a closed loop. Top end anchored by winch 59*ax*; the bottom end held by a pulley 48*ax* mechanism at point 764. Wherein, said floating turbine-generators 471*ax* may be shifted upwards; or downwards by means of lines 542*p'*; 542*p''*; and 542*s'*; 542*s''*; for the purpose of periodic inspection, maintenance checks and/or repair to damages.

In a variant form, horizontal axis turbines 472*ax* may be configured with its blades disposed at an angular inclination. The top portion 791 of pillar 469*ax* maybe tilted or slanted backwards. Inclined portion 791 may be connected to main pillar 469*ax* by means of a joining collar 792 allowing rotational movement. Such a configuration shifts the center of gravity 793 of the gearbox 583*ax* plus heavy turbine blades 472*ax* backwards; from front to center, nearer to the central shaft 595*ax* (691) in the middle of pillar 469*ax*. The turbine on the left hand side of the diagram maybe more optimally positioned than the turbine on the right hand side. As its center of gravity 793 coincides with the shaft 595*ax* (691) mounted in the center of pillar 469*ax*; rather than falling outside of pillar 469*ax*. Which produces undesirable structural stress and strain on pillar 469*ax*.

FIGS. 7B and 7C illustrates a variant system 790*a* of FIG. 6A to FIG. 6C. FIG. 7B illustrates the side view. FIG. 7C illustrates the plan view; wherein, structures comprising sea dykes 790; sea fences 790; and/or sea water channeling walls 790 may be used for diversion; convergence; concentration of tidal flow; enhanced augmentation of tidal velocities for driving tidal turbines in shallow coastal waters. Two supporting structures 795 comprising: an upstream structure 795'; and a downstream structure 795" may be constructed; aligned with the tidal current flow channeled by sea fences 790. Said supporting structures 795 erected may comprise a plurality of vertical beams (legs) 708 and horizontal beams 715. On top of horizontal beams 715 may be erected the deck flooring 736; gratings 703; etc. Upon which may be placed generation module 777; substation 622; wind turbines 472*ax*; etc. Multiple tidal turbines 768; 472*ax* (without nacelles) may be configured on a single extended shaft 692 connected between said upstream and downstream structures. The upstream and downstream gearbox units 583*ax'*; 583*ax"*; may be supported by auxiliary beams 794. Wherein, torque produced by said tidal energy conversion units 768; 472*ax*; may be transmitted by means of said gearbox units 583*ax*; from horizontal shaft 692; to vertical shaft 692'; and in turn, to deck 736 mounted generators 777'; 777"; where it maybe transformed into renewable electricity. Likewise, torque produced from wind energies by means of energies conversion units 472*ax* maybe transmitted from the top of the pillars 469*ax*; by means of transmission apparatus 595*ax*; 583*ax*; down to surface or platform 736 mounted generators 777' and 777" for conversion into electricity. Other components of torque transmission system 687 (FIG. 5C; FIG. 5D) may also be used. Generation modules 777 may be aligned vertically or horizontally (FIG. 7C) to suit the renewable energy extraction plant requirements.

FIG. 7D and FIG. 7E illustrates a variant system 790*b* of FIG. 7B and FIG. 7C wherein said structural beams 708; 715 may be configured as a long extended platform; a supporting structure for mounting shrouded; or hooded tidal energy conversion apparatus comprising: penstocks 575*ax*; turbines 472*ax*; turbines 477*ax*; turbine-generators 500*aax*; 500*vax*. FIG. 7D illustrates the front view. At the left side is illustrated a water-bags 40*ax* secured to the framework formed by vertical beams 708 and horizontal beams 715 by means of lines 633. Other means of attachment may also be used. Tidal stream flow may be engaged by said bags 40*ax*; constricted from a large square-shaped inlet port 25*ax* through smaller outlet port 809 integrated with penstock 575*ax*. The right side of FIG. 7D illustrates a free flowing open tidal turbines 472*ax* (without shroud) which may also be used for conversion of tidal energies. Torque produced by said turbine 472*ax* may be transmitted by means of gearbox 583*ax*; and shaft 691 inside external housing 592*ax* to generator module 777 located on the surface or top deck 736. Turbine 472*ax* may also be configured with generators integrated into the nacelles of turbines, forming an integrated turbine-generator unit 471*ax* (more expensive). Kinetic energies harnessed by said plurality of (wind; tidal) energy conversion apparatus (mechanical energies) maybe transmitted by means of torque transmission system 687 (cheaper, but with some frictional losses); to split unit, surface mounted generators 777 (electrical energies).

FIG. 7E illustrates the plan view of the left side of FIG. 7D wherein, said fabric water bag 40*ax* maybe secured to vertical pillars 708; and horizontal pillars 715; by means of lines 633. A penstock 575*ax*; a tidal turbine 472*ax* (torque); or turbine-generator unit 471*ax*; 617; may be mounted in the center. FIG. 7E is shown as a sectional; see-through view of the surface flooring 736; without the top deck 736 (assumed to be transparent). Mechanical energy derived from conversion of kinetic energy (moving fluid) may be directly reconverted into electrical energy by means of a generator mounted in the nacelle (471*ax*; 617). Said mechanical energy created may also be transmitted by means of elongated shafts 692 and gearbox(s) 583*ax* to surface mounted generator 777; located on deck 736 of platform. Top surface 736 may be configured as an access way; mounted with: generators 777; sub-stations 622, transformers 622; solar panels 579*ax*; wind turbines 472*ax*; 477*ax*; etc. The fabric shroud may be securely tied to the sides of framework 708; 715 by means of lines 633; clamps, etc. Fabric shrouds 40*ax* may also be configured from; or comprise of other materials such as: semi-solid pliable plastics; solid state plastics; composites; metal; wood; etc. Said shroud 40*ax* may also be supported by a framework structure 232*ax*; 619 (refer FIG. 1C; FIG. 1D) made of like materials for keeping its physical functionalities in order for the system to work efficiently. In entrapping; channeling; diverting; and constricting said flow of fluid into said energy conversion apparatus comprising: penstocks 575*ax*; turbines 472*ax*; 477*ax*; 471*ax*; 617; 500*aax*; 500*vax*; etc. For practical purposes said apparatus may, preferably be configured for bi-directional (bi-di) use. Wherein, said tidal current may move forward during incoming tide; then reversing direction during the outgoing tide. Such that said apparatus may be configured to work well with either the tidal ebb or the tidal flow.

FIG. 7F illustrates a wind turbine and tidal turbine mounted on a floating Spars structure 607*ax* connected to a common surface based generator 777. Said torque may be combined for powering said generator 777. Torque from the wind turbine 472*ax* may be configured to drive the rotor magnets 476*ax*; while torque from the tidal turbine 472*ax* may be configured to drive the rotor wire-coils 474*ax*. Or the other way round. Said floating Spars structure 607*ax* maybe anchored to the seabed 537*ax* by means of securing lines 295*ax*. An integrated ocean energies harvesting; conversion apparatus. Torque from the wind turbine 472*ax* maybe transmitted from the top of pillar structure 469*ax* by means of gearbox 583*ax* and extended shaft 595*ax*; to the generator 777 mounted below, at its base; inside structure 607*ax*. While torque from the tidal turbine 472*ax* maybe transmitted from the bottom of the legs structure up to surface mounted generator 777 by means of extended shafts 692*ax* and gearbox 583*ax*.

FIG. 7G and FIG. 7H illustrates system 790*c*. Wherein a dyke-wall structure 790 incorporating tunnels 799 integrated with a plurality of tidal turbines 472*ax* may be used to entrap and harness ocean tidal energies. FIG. 7G illustrates a perspective view; while FIG. 7H illustrates a sectional side view of FIG. 7G. Wherein, torque generated by said tidal turbines may be transmitted to surface 736 based generator 777 by means of shaft 691; elongated transmission shaft 692; and gearbox 583*ax*. Tunnels 799 may be specially configured in the form of square shaped tunnels 799; or rectangular shaped tunnels 799; for use with vertical shaft tidal turbines 477*ax*. Wherein, the blades of said turbines 477*ax* may be configured with flip-able hinges such that the blades may be extended during engagement with tidal flow. Said blades may be feathered when not in active use; that is, when they are disengaged from the tidal flow). Torque derived from energy conversion apparatus comprising: vertical-axis wind turbines 477ax; horizontal axis wind turbines 472ax; HAV-100ax; HUV-200ax powered systems; systems 800; etc. may be transmitted by means of torque transmission system 687; and combined together to drive a split unit generator 777. Mounted on top surface 736 of dyke 790, generator 777 and related electrical equipment may be housed safely and securely in structures 622; kept dry and protected from rain or corrosive sea water. They may be constructed of cheap; readily available materials; bulky and heavy duty components. And thus ease of installation; checking; servicing and maintenance. Zero need for expensive miniaturization of the generation system (if generator had been integrated in nacelles 473ax with turbines 471ax atop pillars 469ax). Zero need for expensive water-proofing (if generator had been integrated in nacelles 473ax with submerged tidal turbines 471ax). Differential water level between 621-L1 (a tidal lagoon 798) and 621-L2 (open sea/or ocean); created by the dyke-walls 790; or a coastal sea-fence 790; causes the flow of sea water from a higher level to a lower level. Example shown: sea water moving from L1 to L2 during low tide. Or vice-versa from L2 to L1 during high tide. Powering the tidal turbines creating renewable electricity. Wherein, torque generated from multiple sources; from a multitude of tidal and wind energies conversion apparatus; and energy extraction devices comprising: tidal turbines 472ax; 477ax; wind turbines 472ax; 477ax; windbags 100ax; water-bags 200ax; system 800; in proximity/or vicinity (cluster) may be configured for transmission by means of extended shafts and gearboxes 583ax; into a centralized generator 777. Said generator 777 being specially configured to assimilate and accommodate said varied and diverse sources; velocities; intensities; quantities; power; of rotational energies comprising torque. And transformed into renewable electricity.

For the following figures: FIG. 8A to FIG. 9E, reference may herein be made to drone disclosures in parent patents: U.S. Pat. No. 8,963,362; U.S. patent Ser. No. 10/113,534; drones 60ax; drones 80ax; drones 90ax; including motorized propulsion system 70ax; 408ax. In particular: drone 90cax and propulsion means 70ax of FIG. 9B; drone 80ax of FIG. 5A to FIG. 5D; FIG. 6A to FIG. 6I. Including FIG. 7A to FIG. 7F; FIG. 8A; FIG. 9A to FIG. 9D; FIG. 10A to FIG. 10C as disclosed in U.S. Pat. No. 8,963,362. Turbine-generators 500aax; 500bax; 500cax; 500dax; etc. (FIG. 5A to FIG. 5M) as disclosed in U.S. patent Ser. No. 10/113,534; may be suitably configured; integrated with said drones 60ax; 80ax; 90ax; propulsion system 70ax; and utilized in wind and tidal energies extraction and conversion systems of present specification. Integrated with high altitude flying drones, UAVs, HAVs, etc. for conversion of wind energies. Used with deep-sea diving drones, UUVs, HUVs, etc. for extraction of tidal energies.

FIG. 8A illustrates a plan view of a high altitude self-propelled flying drone HAV-800a integrated with a wind powered turbine generator 500aax; mounted in the middle of the drone's long wing-span. FIG. 8B illustrates the perspective side view and inclined body position of HAV-800a in operational deployment. Two main motorized propulsion turbines 70ax; or electric-motor driven turbo-fans 70ax may be mounted; one on each side, port and starboard near to the wing tips. Two thrusters, smaller auxiliary electric propulsion turbines 70ax may be mounted fore and aft of the drone's flattened body 77ax; 90cax; assisting the wings mounted main propulsion turbines 70ax. Flight control surfaces 69ax; 404ax; 406ax; may be used for control of said drone. Turbines 70ax may be configured mainly for the purpose of vertical take-off and landing (VTOL). Rather than being configured for horizontal movement. Whereas, upon reaching cruising height, said drone's body may be optimally aligned in an inclined position, in such a way that its belly 801 faces the full force of the wind current. Wherein said turbine generator 500aax unit may be able to maximize its efficiency and productivity. Said drone body's orientation and adjustment of drone's wings; its angle of attack relative to the wind; relative lengths and angle of the plurality of bridle lines 21ax; tether line 50ax; etc. may be made to generate aerial lift. To achieve neutral lift, wherein, the weight of the entire apparatus HAV-800a may be self-supported by aerial lift created by means of the wings and the flight control surfaces 69ax; 404ax; 405ax; 406ax. Such a configuration enables apparatus 800a to stay in a relatively stable location for extended periods of time. Fore and aft auxiliary turbines 70ax may be kept on active standby, responding whenever necessary to provide extra lift or maneuver said drone's position. Main turbines 70ax located port and starboard may be switched on/or off automatically by means of central computerized AI controls. When the drone 800a is airborne and in generation mode; and the main turbines 70ax are not used for propulsion purposes. Said main turbines 70ax may optionally; be used to engage wind current for generating power; just like apparatus 500aax. Alike apparatus 100ax; 200ax; 400ax; etc. a plurality of bridle lines 21ax; connects the body of said apparatus 800a at points 803; 804; 805 to tether line 50ax at point 31ax. Said tether line 50ax; or mooring line 46ax may in turn connect said drone 800a to a winched 49ax line reel drum 52ax securely anchored to the ground.

FIG. 8B illustrates the perspective-side view and inclined body position of HAV-800a relative to the flow of wind current 10ax; water current 20ax. Enabling the entire apparatus to be kept airborne by means of: the actions of the oncoming wind current against the reaction of its tethered body; and the interactive aerodynamic relationship between the wind current (lift) versus the tethered 50ax body of HAV-800a (drag); much alike the way a kite or an airplane works. Neutral buoyancy is required for the apparatus to stay airborne by means of aerial lifting forces. Adjustments that maybe made comprises: (a) active motorized propulsion systems: turbines 70ax; engines 408ax; side-thrusters 70ax; (b) flight control surfaces: wings 69ax; 404ax; 405ax; 406ax. (c) angle of attack of the wings leading edge relative to the wind direction; this may be enabled by means of internally (body 77ax) mounted winches 59ax controlling the length of bridle lines 803; 804; 805. Wind current 10ax flows (enters) through turbine-generator 500aax via the belly 801 of HAV-800a; exiting through said drone and turbine-generator's topside 802. Other turbine-generators 500bax; 500cax; 500dax; etc. as disclosed in U.S. patent Ser. No. 10/113,534 may also be integrated into and used with drone HAV-800, forming a family of "High Altitude Flying Energy Generators."

All airborne and seaborne apparatus of present invention may be configured with UAS; UUS capabilities such as: automated GPS guidance; capability to determine the position of an individual apparatus by like passive means; or active means; means of automated self-adjustment and self-propulsion in maintaining its assigned GPS coordinates. Or, in case of a vehicle which had been assigned a flight path; navigate to keep to the designated trajectory. Such UAS; UUS capabilities avoids interference; collision; damages; in between a multitude of different apparatus or vehicles in an energy extraction/or conversion farm 300ax.

FIG. 8C illustrates a variant drone HAV-800b of FIG. 8A and FIG. 8B; integrated with a variant, ultra-light-weight (and thus a much larger sized) wind powered turbine generator 500vax. Wherein said wind powered turbine generator 500vax may be configured alike apparatus 500aax. Optionally, wind powered turbine generator 500vax and drone 800a may be configured comprising solely of ultra-light-weight materials. The blades 492ax of wind powered turbine-generator 500vax may comprise of: composites materials; plastics; carbon-nano-fiber; fiberglass; Kevlar; etc. embedded with rotor wires 488ax and rotor magnets 489ax. Optionally, all turbine blades 492ax may be coated externally with layers of specialty water-proofing materials 806; protecting said delicate and sensitive generation elements 488ax and 489ax embedded within; integrated internally into said blades. A drone with a smaller body and multiple units of propulsion turbines 70ax (8 units) directly attached to wind powered turbine-generator 500vax may be configured. Wherein said rotor rings of wire coils 493ax; and magnets 494ax may be replaced or substituted by means of embedded generating elements comprising: rotor wire coil 488ax; and rotor magnets 489ax; directly integrated, impregnated and structurally incorporated into the turbine blades 492ax of wind powered turbine generator 500vax. (refer FIG. 4H; FIG. 5A to FIG. 5K of U.S. patent Ser. No. 10/113,534).

Turbine generator 500aax; 500vax may comprise of dual units of turbines placed in close proximity to each other, in an over-under (top-bottom; horizontal position) configuration; or in a side by side configuration (vertical position). (Refer to FIG. 4H; FIG. 5I; FIG. 5J of parent U.S. patent Ser. No. 10/113,534.) Wherein with the body of drone HAV-800b preferably aligned in an inclined position (FIG. 8B); said twin units of turbines counter-rotates against each other in close proximity (one unit turning clock-wise; with the other unit turning in an anti-clockwise direction). Said generating elements: wire-coils 488ax; magnets 489ax; directly embedded into said counter-revolving turbine blades 492ax located bottom and top (belly and hind) moving past each other in proximity, at very high velocities generating electricity.

FIG. 8D illustrates a variant self-propelled aerial drone HAV-400vax integrated with a plurality of motorized turbo-fans 70ax; in addition to propulsion engine 408ax; as previously disclosed in U.S. Pat. No. 10,113,534. Additional propulsion units 70ax may be configured directly onto the body of HAV-400vax; just like HAV-800b of FIG. 8C. Equipped with these motorized propulsion units 70ax; the self-propulsion capability of HAV-400vax is enhanced. Drone HAV-400vax is now fully self-reliant; and achieved independence from its previous reliance on Unmanned Aerial Tug Vehicles, UATV-80aaa; 80aab; 80aac for VTOL and ascent purposes.

FIG. 8E to FIG. 8G illustrates a morphing drone HAV-800c of FIG. 8A configured with dual sets of wings. FIG. 8E illustrates a plan view; FIG. 8F illustrates a sectional front view of a retracted drone; FIG. 8G illustrates the frontal view of a fully extended drone. One set of wings 69bax; (404bax); located at the bottom; with a smaller set of wings 69tax; (404tax); stacked above in an over-under configuration of the bi-planes (of olden days). The twin sets of top and bottom wings 69tax; 69bax; may be held together by means of: extendable-retractable apparatus; extendable-collapsible mechanisms; stretchable-foldable members; such as jacks 807 and mechanical arms 808 driven by pneumatic and/or hydraulic systems.

The space in between the top and bottom wings may be mounted with a wind bag 30ax and a wind-turbine-generator 500aax; or a tidal-turbine-generator 500aax. Including extendable-collapsible pneumatic arms 807; hydraulic arms 808; or other mechanisms to vertically open up; or to close and collapse (the distance between) the top and bottom wings 69tax; 69bax of drone bi-plane 800c. Pneumatic arms 807; 808 may also be configured for mounting and supporting turbine-generator 500aax and windbag 30ax. When the wings are in open position, a large space is created for said built-in windbag 30ax and turbine-generator 500aax to operably deploy and function as configured. Windbag 30ax may be configured with other high velocity wind-turbine-generators: 500bax; 500cax; 500dax; located aft to generate electricity. (Refer FIG. 5A to FIG. 5M of U.S. patent Ser. No. 10/113,534). Whereas, wind entering the large square shaped cavity 25ax of inlet port ring 22ax (fore) may be channeled through a narrower outlet port 809 (aft) integrated with turbine-generator 500aax; thus accelerating its velocity as it passes through the blades 492ax of turbine-generator 500aax. Such a configuration illustrates the use of a high altitude self-propelled flying drone HAV-800c integrated with a shrouded (windbag 30ax) wind powered turbine-generator 500aax; 500vax. Flying wind turbine-generator 500aax may be collapsed, horizontally positioned when not in use; such as during the flight mode (ascent; descent). During the generation mode it may be aligned vertically; or at an optimally inclined angle; when the top and bottom wings 69tax; 69bax; opens up. This may be enabled by means of supporting hydraulic arms 807; 808; mounted in embedded sliding brackets and grooves 810; and/or other like specialty mechanical accessories customized for their specific utility purposes. Inlet port ring 22ax may follow the square shaped contour of the hydraulic arms 807; 808. It may also be configured to be of any practicable shape or size. Operably opened and closed by means of pressurized air; in sync with mechanical arms 807; 808; movement, etc. (Refer apparatus 620d of FIG. 3A to FIG. 3E.)

FIG. 8H to FIG. 8J illustrates a variant morphing drone bi-plane 800d of FIG. 8E to FIG. 8G with dual sets of similar sized wings 69tax; 69bax; (404tax; 404bax) mounted in an over-under (top-bottom) configuration. FIG. 8H illustrates the plain view of drone 800d in flight mode with the wings aligned fore and aft. FIG. 8I illustrates the front view of drone 800d in generation mode with said wings aligned top and bottom (over-under). FIG. 8J illustrates the side view. A plurality of pneumatic jacks 807; or appendages 808 (3 units) operably connected said top and bottom wings 69tax; 69bax; keeping them together.

In the flight mode, the bottom set of wings 69ax; 404tax; may be flipped backward and upward by means of appendages 807; 808. With both sets of wings parallel to each other at nearly the same level. The collapsed windbag 30ax integrated with turbine-generator 500aax may be positioned horizontally with the windbag materials folded and stored by means of a plurality of: sliding lines 23ax; 66ax; accessories 67ax; 68aax; line winches 59ax; etc. for controlling; releasing; retracting; said windbag; wingsuit; fabric materials. In such a fore-aft arrangement; all of the four main propulsion turbines 70ax may be fully utilized for maximum creation of vertical lift.

When drone 800d attained cruising height; bottom wings 69bax may be lowered downward and flipped forward by means of appendages 807; 808; forming a normal bi-plane's over-under (top-bottom) wings configuration. Such a maneuver opens up a large space in between the two sets of bi-plane's wings 69tax; 69bax; for windbag 30ax and turbine-generator 500vax mounted in between said top and bottom wings to function. Operably capturing high altitude wind current; transforming its kinetic energy 11ax into electrical energy. As the top and bottom wings opens up; spreading apart; turbine 500vax, lying in a horizontal position on top of bottom wings 69bax may be moved by means of said pneumatic arms 807; 808; sliding along built-in grooves 810; into an upright, vertical position (generation mode). Wind current captured by bag 30ax may be directed into wind turbine-generator 500aax; 500vax; driving, powering it to generate electricity. Windbag 30ax may be securely mounted in groove 810 embedded into the wings structure.

A comparison may be drawn with reference to a normal large sized open flow turbine-generator 800b of FIG. 8C; versus 800d of FIG. 8H to FIG. 8J. Said smaller sized apparatus 800d may be much more productive than a larger sized apparatus 800b. Because a shrouded or hooded (windbag 30ax) apparatus operates at higher velocities; thus higher efficiencies Cp (approx. 2 to 3 times); as compared to an open flow apparatus. A similar comparison maybe drawn between the dotted lines in FIG. 8I versus the solid lines 809. Said dotted lines may be used to denote the body of a much larger apparatus 500vax in open flow (without bag). Whereas solid lines 809 denotes the joining point between the outlet port 809 of windbag 30ax and the body of a smaller apparatus 500vax; integrated with windbag 30ax. Windbag 30ax forms a wingsuit; shroud or hood improving efficiency of apparatus 500vax. Wherein integration of windbags 30ax with turbine generator 500vax enables deployment of a much smaller and lighter turbine generator 500vax with much higher efficiencies. Since an enclosed, shrouded turbine-generator 800b will be much more efficient than an open-flow system; a hood of whatever size or shape, may also be configured for use at the fluid inlet port of apparatus 500aax; 500vax of HAV-800a and HAV-800b of FIG. 8A to FIG. 8C.

FIG. 8J illustrates the side view of drone 800d wherein said twin set of wings 69tax; 69bax may be configured, intentionally manipulated or adjusted to form a tapered, funnel shaped aerial apparatus from fore to aft. With a large inlet port 25ax; and a small outlet 809 integrated with the periphery of wind turbine-generator 500vax. For aspirating a large volume of wind at the inlet port 25ax formed by pneumatic arms 807; top and bottom wings; and inlet port ring 22ax; flowing via a smaller outlet port 809 of windbag into the turbine blades 492ax of wind turbine generator 500aax; 500bax; etc. before exiting aft, discharged to the atmosphere. Wherein said funnel shaped shroud or hood formed by windbag 30ax; constricts and accelerates the flow of wind and water currents; concentrating; enhancing its velocity through turbine-generator 500aax; or an ultra-lightweight turbine-generator 500vax.

RAT-71ax mounted on body 77ax may generate onboard power and compressed air for inflation of inlet port ring 22ax; air-ribs 277ax of windbags 30ax. Electrical power generated on-broad by means of RAT-71ax; and wind turbine-generator 500aax; 500vax may also be used to power the plurality of propulsion turbines 70ax. Excess power generated may be transmitted by means of a variant conductive tether 50vax; anchor line 46vax. Power for initial take-off and make up power for propulsion turbines 70ax may also be supplied by means of said variant conductive tether 50vax.

FIG. 8K to FIG. 8M illustrates a variant configuration of FIG. 8A to FIG. 8J wherein said drone HAV-800e; HUV-800e may be equipped only with a windbag 30ax (drive unit 51ax) for traction-generation of renewable electricity by means of tether 50aax and driven unit 55ax; akin to system HAV-100ax; HUV-200ax; HUV-400ax; 222ax; 76ax; etc. FIG. 8K illustrates the plain view. FIG. 8L illustrates the frontal view of 800e; in flight mode with windbag 30ax retracted and kept closed by bottom body frame 811. FIG. 8M illustrates the frontal view of 800e; in generation mode with an extended windbag 30ax by an open bottom body frame 811. Windbag 30ax with a large inlet port 22ax framed by extendable retractable parts 807; 808; tapers towards a small enclosed rear end (cone-shaped). RAT-71ax may be used for self-generation of utilities abroad comprising electricity and compressed air enabling prolonged periods of deployment. Optionally, RAT-71ax may also be connected to outlet port 809 and driven by means of fluid exiting windbag 30ax; turbine-generator 500vax (apparatus 800c and 800d in FIG. 8E to FIG. 8J). Apparatus 800e may also be used for traction purposes; and propulsion of vehicles comprising: boats; ships; sledges; wheeled vehicles; etc. over terrain comprising: water; sea; ice; snow; etc. for solo trips; expeditions; or commercial purposes. And at the same time supplying power to the surface crew and equipment.

FIG. 8N illustrates the utility purpose of a plain and basic drone vehicle HAV-800 in leading, controlling and commanding a multitude of windbags 30ax; or water-bags 40ax; wherein, said plurality of bags may be configured in series, one bag after another bag as previously disclosed in system 222ax; 76ax. Said self-propelled drone HAV-800 may or may not carry a turbine-generator 500aax or a windbag 30ax on its body. Since its main purpose is working as a master controller; leading a pack of fluid entrapping bags (slaves) attached to tether line 50ax (drive unit 51). For the sole purpose of traction-generation-production of renewable electricity in association with driven unit 55ax. With reference to FIG. 6P and FIG. 6Q of U.S. patent Ser. No. 10/113,534; HAV-800 may also be used with bridle lines 21ax attached at points 803; 804; 805; connected to tether line 50ax at point 31ax; controlling a multitude of bags 30ax. A retract line 33ax and winch 59ax maybe used for depowering of said apparatus 76ax; 222ax. Drone vehicle may use its propulsion systems 70ax for active depowering of said apparatus or system 222ax; 76ax. Said drive unit 51ax powering a ground mounted driven unit 55ax.

FIG. 8'O' illustrates a variant configuration of FIG. 8N wherein, said plurality of bags constituting system 76ax; 222ax; may comprise of a multitude of HAV-100ax; or HUV-200ax lead by a master-controller drone comprising a variant unit of: HAV-800; HUV-800; or HAV-100vax; HUV-200vax. Said master-controller drone 800 may be equipped with homing sensor 812; located near to the tip of its nose cone. Sensor 812 is configured to home in on signals emitted by a homing-signal generator 813; attached at a desirable location 814; in proximity to an attachment ring 815; on main tether line 50ax. Generator 813 may constitute a homing-signals generator comprising: radar; GPS; a transponder system; x-rays; radio-waves; sonars; visual-audio signals; etc. Such an interactive transmission and reception signaling-homing system may be used during the depowering phase of system 76ax; 222ax. Wherein, at the end of its power generating run (point 288ax), said master-controller drone vehicle 800; 100vax; 200vax; may be remotely commanded; or pre-programmed by means of computerized systems and artificial intelligence (AI); to turn around; thereby spilling the fluid content entrapped by said bags; depowering them. In proximity to device 813 located at point 814 said master-controller drone may use optical-visual signals captured by means of onboard precision cameras 816 to seek-out; locate and then, latch tightly onto a ring 815 by means of a suitably configured attachment apparatus 817; or a locking device 817; located at the tip of its fore nose-cone. Sensor 812; camera 816 and locking device 817 may be located in proximity to each other. Components of apparatus 817 may operably open up; clamp; grip; lock tightly onto ring 815. Optionally, apparatus 817 may also be configured to slide open, insert ring 815 into its orifice or port and close back securely. An example being: industrial grade spring-loaded shackles or carabiners; operated by means of electro-mechanical cum magnetic mechanisms controlled by computerized logic or artificial intelligence (AI) sequence. Tether line 50ax may then be retracted back to the starting point 16ax by means of rewinding motor 49ax. Such a structural configuration may not require the use of an independent retract line 33ax and line-reel system R49ax; or the use of a winch 59ax (onboard drone vehicle) and retract line 33ax system attached onto tether line 50ax (refer FIG. 11A to FIG. 11J of U.S. Pat. No. 8,963,362).

FIG. 8P illustrates a variant configuration 800f; wherein apart from previously disclosed propulsion means of HAV-100vax; HUV-200vax comprising one singular unit (70ax; 240ax); said drones maybe equipped with additional units of propulsion means comprising: a multitude of said motorized turbo-fan units 70ax; multiple propeller units 240ax; cum much larger control surfaces 69ax strategically located on said aero-dynamically shaped vehicle body: 77ax; 99ax; 201ax. Control surfaces 84ax; 85ax; may be used with aerodynamically shaped body 99ax. Hydroplanes 205ax; 206ax; 207ax; 208ax; may be used with hydro-dynamically shaped body 201ax. Previously HAV-100ax relies on a group of means comprising: one single motorized propulsion unit 70ax; flexibly attached UATV-80ax; light-than-air (LTA) gases comprising: helium; or hydrogen in body 99ax; 201ax to achieve aerial lift and buoyancy. Wherein with 100% motorized self-propulsion by means of 70ax; 240ax; said HAV-100vax; HUV-200vax; need not rely on the use of: UATV-80ax; or on lighter than air (LTA) gases. Optionally, continued usage of LTA gases helps in providing lighter propulsion-engine loads; and minimized energy consumption. LTA gas may be augmented by modified flight control surfaces 69ax and 820 which may be enlarged and elongated. Such multi-functional capabilities in using multiple propulsion units 70ax; tug-vehicles 80ax; LTA gases; wings 69ax; 820; enhances operational flexibilities of said variant drone vehicles. Wings, hydroplanes and control surfaces may be modified. Configured to be tilt-able; and to rotate to adjust a vehicle's lift; drastically altering said wings leading edge's angle of attack speedily; etc. relative to wind and tidal current flow. Wherein, said wings 69ax may be split or divided 818 into two components comprising: a normal fixed wings portion 69ax; and a rotatable, tilt-able wings portion 820; inter-connected by means of an internal shaft 819 in between said dual split portions. Said portion 820 may be adjusted variably to tilt at an angular inclination dictated by means of software commands from computerized AI flight software abroad; providing optimized aerodynamic lift generation (relative to wind direction) for extended periods of time. Such a configuration minimizes use of propulsion units 70ax; which consume energies. All apparatus of present inventions may be configured with fixed and variable wings and control surfaces for generation of aero-dynamic lift for extended periods of time. Example: for weeks; or, months; as in FIG. 8A to FIG. 8J; FIG. 8Q; FIG. 9D. Main motorized propulsion units 70ax; 240ax; may be used mainly for vertical-take-off and landing (VTOL); and for standing by. Auxiliary unit 70ax; 240ax; maybe kept on hot standby; or on active service for vehicle adjustments to cater for shifting wind conditions.

FIG. 8Q illustrates a variant apparatus 800g of FIG. 8E to FIG. 8J. Wherein, said drone apparatus may comprise of 3 body portions. One main body 77ax in the middle; hemmed in by two smaller supporting bodies 77pax port; and 77sax starboard. Joined together by means of an extended wings structure 69ax; extending from the port side 69pax; and starboard side 69sax. Said bodies 77ax; 77pax; 77sax; being operably used to control deployment; and/or extension of an integrated windbag 30ax cum wind turbine-generator 500vax located aft. Windbag 30ax may be affixed in grooves 810 of the wings; and may utilize a plurality of sliding lines 23ax; 66ax; accessories 67ax; 68aax; line winches 59ax; etc. for controlling; releasing; retracting; said windbag materials. (Refer FIG. 3H to FIG. 3I of U.S. Pat. No. 8,963,362). Wind entering said inlet port 25ax passes through turbine-generator 500vax located aft; before exiting through outlet port 821. Wingsuits 30ax may also be used for fluid entrapment.

FIG. 9A and FIG. 9B illustrates a variant apparatus 800h. FIG. 9A illustrates a perspective side view; while FIG. 9B illustrates a plain view (topside 802) of a said apparatus 800h wherein said turbine-generator unit 500aax; 500vax may be integrated with a plurality of motorized propulsion units 70ax mounted on struts 818 with a fabric shroud 30ax or hood 30ax extended around the circumference of said turbine-generator 500vax. Fabric shroud 30ax may be directly attached to the circumference of said turbine-generator 500vax; extending outward like a wingsuit 30ax supported by a plurality of structural members comprising struts 822. Bags and shrouds functions like wingsuits in engaging wind current; just like the extended membranous skin of a bat's wings. Channeling, diverting said wind flow into the turbine-generator unit 500vax; from an enlarged inlet port 25ax via inlet port ring 22ax; into the belly 801 of apparatus 800h, through turbine blades 492ax; before exiting from the topside 802. Struts 822 may be configured extending directly from the body of apparatus 500vax; connecting with flexibly adjustable joints 823; and extended into short portion 822'; which may be used as legs for landing and take-off of apparatus 800h. Adjustable joints 823 in between main struts 822 and leg portions 822'; may be configured for mounting flexibly positioned propulsion units 70ax. Flexible joints 823 may be fitted with suitably configured; customized specialty accessories enabling it to function as desired. The position of propulsion units 70ax may preferably be aligned horizontally in order to maximize lifting duty. A plurality of bridle lines 21ax connected to and extending from legged portions 822' of struts 822 joined tether line 50vax at point 31ax kept said apparatus 800h in position. Wherein, said unit 800h may be lofted into high altitude by means of said propulsion units 70ax. Aligned at an inclined position such that wind and/or water current flows from the bottom or belly 801 (refer FIG. 8B) of said apparatus; through the turbine blades 492ax; exiting from the hind or top-side 802 of said unit 500vax. Fabric shroud 30ax at the periphery of unit 500vax entrapped and channeled wind and water current from an enlarged inlet port 25ax through the narrower outlet via unit 500vax. Likewise said unit 800h may also be configured for use in an ocean or seaborne environment to harness tidal energies; wherein said motorized propulsion units 70ax provides directional controls; while the buoyancy of the entire apparatus 830ax may be controlled by means of airbags 202ax; lines 204ax and compressed air cylinders 203ax; sinkers and diving weights 221ax. Components: 676; 677; 678; 679; 681; 682; 683; 684; constituting system 686 of FIG. 3L above may also be used. Power generated by apparatus 500vax may be transmitted by means of a conductive tether 50vax. Turbine-generators 500aax; 500vax; may also be substituted or replaced by other like apparatus disclosed in the specifications: 471ax; 617; 472ax; 500bax; 500cax; 500dax; etc.

FIG. 9C illustrates the perspective view of a variant apparatus 800i of FIG. 9A and FIG. 9B; wherein said turbine-generator unit 500aax may be replaced by; or substituted with a windbag unit 30ax mounted on an aerodynamic body 100vax; or, a hydrodynamic body 200vax; and connected by means of a plurality of bridle lines 21ax to a winch 59ax. Said bag 30ax may be integrated with peripheral mounted shroud or wingsuit 30ax. Structural body 100vax or 200vax may in turn be connected by means of tether 50vax (drive unit 51ax) to a surface based driven unit 55ax. Said drive unit 51ax provides traction-generation capability in tandem with a said driven unit 55ax to produce renewable electricity. (Refer apparatus 800e of FIG. 8K to FIG. 8M). The framework of struts 822 may be extended from the motorized propulsion turbine units 70ax to the fore (bow) of the apparatus 800i; providing it with mechanical capability to open and close the shroud formed by windbag and wingsuit 30ax; by means of pneumatic mechanisms mounted on its body 77ax; 99ax; 201ax. Said body maybe configured to include a Ram-Air-Turbine (RAT) 71ax mounted at the bow providing compressed air to operably control (open or close) the inlet port ring 22ax; air-ribs 277ax; struts 822 of said windbag 30ax as and when required. High velocity wind may enter RAT-71ax via inlet port 824; exiting via outlet port 825. RAT-71ax may also be configured to supply electricity to power turbines 70ax. Enabling apparatus 800i self-sufficiency in generation of energy and propulsion power. Wherein apparatus 800i may operably generate its own power to run, to propel turbines 70ax; keeping itself airborne for extended periods of time. Any power shortfalls may be made up for by means of conductive tether 50vax from surface based backup means. A pressurized air blower 826 may be used for augmenting take-off and landing of system 800 apparatus. Discharge nozzle 826 may be coupled with compressors; compressed air tanks; air lines; etc.

FIG. 9D illustrates the perspective view of a variant apparatus 800j; wherein said components of a self-propelled flying turbine-generator 800h (FIG. 9A; FIG. 9B) may be integrated with components of a HAV-100vax; or HUV-200vax (refer FIG. 8P). Forming a variant self-propelled hybrid turbine-generator apparatus: HAV-800j; HUV-800j. Wherein said rotor-rotor turbine-generator may comprise of: 500aax; 500vax; 500bax; 500cax; etc. configured with their embedded electrical and magnetic elements waterproofed and externally sealed; covered in a robust layer of protective materials comprising: plastics; ceramics; glass; carbon-fibers; composite materials; etc. Optionally, it may also comprise of a normal; standard rotor-stator turbine-generator 471ax (refer FIG. 4A of U.S. patent Ser. No. 10/113,534). Wherein components of said modified turbine-generator 471ax may be directly embedded and integrated into the body 99ax; 201ax structure (FIG. 9E). The relative position or location of components may be shifted or reconfigured to optimize operability of such a hybrid apparatus HAV-800j; HUV-800j.

FIG. 9E illustrates a optional configuration wherein the generation components 471ax of said HAV-800j; HUV-800j in FIG. 9D may be integrated into; forming; becoming part of the structural body 99ax; 201ax. The extremely sensitive wire coil 474ax (488ax) of said modified turbine-generator 471ax may be configured: concealed inside the body 99ax; 201ax structure. Totally segregated from the external surroundings by means of said structural arrangement. Wherein said concealing; protective layer comprises of the solid state body 99ax; 201ax of HAV-100vax; HUV-200vax. Whereas, said rotor coil 474ax; rotor magnet 476ax (489ax) maybe embedded; impregnated; encased; insulated; isolated; in layer(s) of laminating composite materials 806. Rotor coil 474ax; rotor magnet 476ax (489ax) may also be configured; separated from each other by said body structure 99ax; 201ax. Wherein said coating comprising layers of protective water-proof materials 806 provides functionality of the apparatus; and protection against moisture and corrosion (refer FIG. 15A to 15C; U.S. Pat. No. 8,963,362). The rotational movement of said rotor magnets ring 476ax; directly attached to turbine blades 492ax; may be assisted by a bearings assembly 597ax. Variant HUV-200vax may be configured wherein the shroud comprising water-bag 40ax entrapped and diverted tidal flow into a turbine 471ax; mounted in the center around body 201ax. HUV-200vax may be tethered and affixed to the seabed 537ax; tilted in the direction of tidal current flow; entrapping said fluid; channeling it into turbine 471ax; to generate power. Power generated may be routed from the generating wire coils 474ax; via aft (stern) mounted conductive tether-cable 50vax; to seabed mounted cable attachment point 764 (FIG. 5K); for transmission to surface buoy 508ax; ballast tank 578ax; or to shore. Power generating nacelle 611 of turbine-generator 617 of body 201ax may be made of compatible composite materials; said layer(s) of composites enabling; ensuring magnetic field from externally located magnet penetrates through the layer with ease; and reaches the wire coils mounted inside body 201ax. Optionally, the body-wall 99ax; 201ax of nacelle 611 of turbine-generator 617 may be made slightly thinner to enable enhanced penetration of magnetic field and power generation. Supporting rings 828; or other structures may be used to secure turbine 500aax to body 99ax; 201ax.

FIG. 10A illustrates a planetary-gears apparatus 830 integrated with a variant counter-rotating generator 777v. FIG. 10B illustrates a plan view of apparatus 830. FIG. 10A illustrates a side-sectional view of an arrangement wherein a planetary gear 830 may be suitably configured with a torque transmission gearbox 583ax; main shaft 581ax; to work with a single unit of variant counter-rotating generator 777v; or; a variant generator 585ax; 590ax; configured with only one single source of torque (input); with two opposing torques (outputs) to power dual rotor coil 474ax and rotor magnets 476ax. Planetary gear apparatus 830 may be configured and used for the conversion of rotational mechanical energies (torque). Wherein, a single source of torque transmitted (from gearbox 583ax to main shaft 581ax) may be transformed from one rotational direction: e.g. clockwise (input); into an opposite rotating direction: e.g. anti-clockwise (output); by means of apparatus 830. Such that said original torque (rotating clockwise) may be combined with the derived torque transformed by means of apparatus 830 (rotating anti-clockwise) to drive the: rotor coils 474ax; and rotor magnets 476ax; of counter-rotating generator 777v. Apparatus 830 enables the conversion and transformation of one single stream of torque energy into two opposing streams (directions) of torque; and may be suitably configured for use with apparatus 777v of present invention. Wherein said counter-rotating streams of torque energy (turning moment) may then be used to drive; to power a counter-rotating generator unit 777v. One stream of torque (original input of main shaft 581ax, turning clock-wise) may be configured to power the rotor magnet 476ax. While the other, derived stream of torque (produced by apparatus 830 connected to the yoke 484ax, turning anti-clock-wise) may be configured to power the rotor coil 474ax of generator 777v. Or, vice-versa.

Planetary gear apparatus 830 may comprise of: a central gear 829 mounted on the central shaft 581ax (bearing the original torque: input); ringed by a plurality of transmission gears 831; surrounded by a peripheral gear ring 832. The turning moment transmitted by center gear 829 (input); is transmitted to gears 831; then on to peripheral gear ring 832. The movement of gear ring 832 is reversed by means of this derived torque transmission; which may be further transmitted by means of a plurality of yoke 484ax to power rotor coils 474ax. Central shaft 581ax transmitting the original torque (input) may directly be configured to power rotor magnets 476ax.

Such an apparatus 830 may be used when a large amount of torque produced by a single apparatus (for example: a large wind turbine with 10 MW output) may be transformed and spilt into two streams (example: 5 MW of torque each) for powering one generator unit 777v. Assuming that a normal (rotor-stator) generator configured for said 10 MW turbine had a size; weight of "X". An equivalent (rotor-rotor) generator unit 777v may be configured to have a size or mass of "half X" ("½X"). Since rotor-rotor (rotor coil; rotor magnet) configuration may be translated into reduced generator mass; or size of generating elements; as compared to rotor-stator configuration. It is (will be) definitely advantageous for a generator half of its normal size or mass to be installed inside its nacelle 473ax atop turbine pillar 469ax hundreds of meters high. And even better still, if this "½X" is removed and shifted from the top nacelle 473ax down to the surface level (ground or platform 741). With generated torque transmitted by means of extended shaft 692.

Wherein, counter-rotating generator unit 777 may be configured to be driven by: (1) one source of torque transformed into twin streams of opposing torques by means of planetary gears 830; to drive a variant generator unit 777v. (2) Two streams of torque transmitted from two individual drive units. (3) A multitude of torque streams transmitted from diverse wind and tidal energy conversion apparatus (drive units 51ax) may be configured to drive; and power individual (segmented) generation sections: 777'; 777"; 777'''; etc. Wherein said generation sections 777'; 777"; 777'''; etc. may operably be used individually. Or, specific components (e.g. rotor magnets 476ax; or rotor coils 474ax mounted on main shaft 581ax) may operably be combined together by means of gear-clutch mechanisms 587ax (drive unit 51ax of similar ratings; matching output; etc.) Apparatus 587ax may comprise fully automated variable speed gears; semi-automatic gears; manual gears. Such flexibility and versatility in configuration enables optimized efficiency and productivity of system 777; in response to natural variability of the elements—wind and tidal resources.

FIG. 10C to FIG. 10E illustrates three variant tidal turbines: 471vax; 768v; 768w; derived from the floating, buoyant tidal turbine system 768 of FIG. 6B; and features disclosed in FIG. 9E. FIG. 10F illustrates use of said plurality of turbines. FIG. 10C illustrates a variant floating dual-units (fore-aft) tidal turbines 617v; 471vax (refer FIG. 4A; U.S. patent Ser. No. 10/113,534) wherein moisture sensitive generating components comprising: rotor coils 474ax; rotor magnets 476ax; may be segregated and isolated from direct contact with water; as disclosed in FIG. 9E. Embedded; integrated into; encased in layer(s) of composite materials comprising: plastics; ceramics; glass; carbon fibers; Kevlar; Dyneema; Teflon; etc. Generating mechanisms may be configured with standard rotor coil cum stator magnet (or vice-versa). Or, it may consist of counter-rotating "rotor-rotor" configuration comprising: rotor coils cum rotor magnets. Direct conversion of kinetic to mechanical to electrical energies occurs in the buoyant body 767; nacelles 611; 473ax; of the tidal turbine 617v; 471vax. Electricity generated may be transmitted by means of variant undersea tether-cable 457vax to the surface based floating platform 741; 747. Buoyant tidal turbine 617v; 471vax may be configured to be: buoyancy neutral; or, with positive buoyancy; dependent upon inflation of air-filled 683 buoyancy bodies 767; nacelle 611. Additional buoyancy may be enabled by means of inflatable body 202vax; attached to body 767; or nacelle 611. Control surfaces comprising vertical fins 206ax; horizontal fins 207ax; may be used for orientation and self-balancing. Vertically oriented struts 691 connected the body 767; nacelle 611 via vertical fins 206ax to swivel mechanism 643; and variant tether cable 457vax to surface platform 741; and the bottom submersible vessel 230vax.

FIG. 10D illustrates a variant floating tidal turbine 768v of FIG. 6B; comprising of a dual-units (fore-aft) tidal turbines 768v wherein, mechanical energies derived from said conversion of kinetic energy (tidal flow) by tidal turbines 768v may be transmitted from said apparatus by means of gearboxes 583ax; vertical shafts 691 residing in vertical fins 206ax; swivel mechanism 643 or universal couplings 666; extended shaft 692; to the driven units 777; 54ax; etc. One driven unit 777 may be located on surface based floating platform 741; one driven unit 777 located on the seabed 537ax (refer FIG. 10F). Electricity produced by the surface 741 and seabed 537 based generators may be transmitted by means of undersea cable 457ax laid in cable trench 789; to shore facilities 622. Integration of vertical shafts 691 into the vertical control surfaces 206ax enables creation of a large clearance angle for tether-cables 457vax; or extended shafts 692; to operably change its angle of inclination; without interfering with turbine blades 472ax operability. Horizontal control surfaces 207ax helps to keep the body 767 in level position parallel to the tidal current flow.

FIG. 10E illustrates a variant floating tidal turbine 768w of FIG. 6B and FIG. 10D; comprising of a single unit of tidal turbine 768w wherein, said apparatus may be configured to generate torque; or electricity. Configured with rotor coils 474ax; rotor magnets 476ax in nacelle 473ax; 611; of FIG. 10C; said apparatus 768w may produce electricity which may be transmitted safely by means of: an inclined variant tether-cable 457vax; integrated into and passing through the vertical fins 206ax; to surface sub-station 622. Configured with a torque transmission system 687; mechanical energies derived from said conversion of kinetic energy (tidal flow) by apparatus 768w may be transmitted by means of: gearboxes 583ax; inclined extended shafts 692 residing in, integrated into and passing through specially adapted passage 833 in the vertical fins 206ax; universal couplings 666; to the driven units 777. Such a configuration enables transmission of torque or electricity produced by said turbine 768w without interfering with the turning turbine blades 472ax.

FIG. 10F illustrates the use of said floating tidal turbines 768v; 768w and 471vax (617v). Variant sub-system 580uax (refer FIG. 6Y; U.S. patent Ser. No. 10/113,534) illustrates a plurality of tidal turbine 471vax (617v) anchored by means of variant tether-cable 457vax. Top end of line 457vax may be anchored to winched 49ax line reel 52ax drums on surface platform 741. The bottom end may be anchored to a UUV-230ax; or a variant submersible vessel 230vax; which may submerge or surface upon command by means of remote signals. Enabling precision controls in position; location; depth; and deployment of multiple apparatus 580*uax*; 580*vax*; 580*wax*; etc. from surface vessel 741. Vessel 230*vax* may also be controlled to adjust the angular inclination of line 457*vax*; its slackness; taunt-ness; stress or strain for operational purposes. Line 457*vax* may preferably comprise of double lines closed loop configuration (refer FIG. 6'O' system 510u; U.S. patent Ser. No. 10/113,534); for ease of periodic checking; maintenance and repair purposes. Variant sub-system 580*vax* illustrates a plurality of dual tidal turbines 768*v*; or single tidal turbine 768*w*; anchored by means of extended shaft 692. Top end of extended shaft 692 may be anchored to a generator 777; 585*ax*; 590*ax*; 54*ax*; on surface platform 741. The bottom end may be anchored to a hermetically sealed generator 777 mounted on concrete slab 653 on the seabed 537*ax*. Mothership 741 may be configured with specialized structures 834 for housing said generators; winching equipment; control systems; etc. for handling said variety of submerged tidal turbine arrays.

FIG. 10G illustrates a variant floating-submerged tidal turbines sub-system 580*wax* wherein said multiple units of turbines comprising: apparatus 471*vax* (617); 768*w*; 500*vax*; 500*aax*; etc. may be strung together; connected by means of conductive-tether line 457*vax*. The bottom end of tether 457*vax* may be anchored to a piled 562*ax* concrete base 653 on the seabed 537*ax*; the top end may be secured to a submersible vessel 230*vax*. Said submersible vessel 230*vax* may be configured to submerge below surface level 621 when in operation. And to surface whenever required for periodic maintenance checks and repair. Minimizing surface footprint of the entire apparatus 580*wax*; posing zero interference to shipping. A small marker buoy 508*ax* tethered on the water surface 621 may be used to indicate the location of apparatus 580*vax*. Said array 580*wax* may also be configured with buoyant turbines, or buoyancy neutral turbines: 768; 768*v*; 768*w*; 471*vax* (617*v*); xxx; etc.

Submersible vessel 230*vax*'s buoyancy maybe controlled by means of system 690*ax*; sub-system 686 of FIG. 3K to FIG. 3L; enabling the entire apparatus 580*wax* to surface; or to submerge upon remote command; by means of Unmanned Underwater System (UUS) of communication; tethered or untethered. Sub-system 686 enables creation of variable buoyancy to countenance, to neutralize the swift effects of tidal flow changes; to adjust variable angle of incline of the variant conductive-tether line 457*vax* for optimal system performance by means of AI commands; control surfaces 206*ax*; 207*ax*. Wherein said tether line 457*vax* connected to winched 49*ax*' line reel 52*ax*' mounted on the body of submersible vehicle 230*vax* may be operably controlled enabling apparatus 230*vax* to surface or to submerge. Such maneuverability enables multiple arrays of apparatus 580*wax* to be deployed in proximity from a cluster of anchoring points on concrete pads 653. Such that said multitude of floating-submerged arrays 580*wax* may be arranged in a fore and aft; port and starboard position; or, at inclined angular positions; downstream (tidal flow) of concrete pads 653 on seabed 537*ax*.

A single line 457*vax* may be used where applicable. But a closed loop (twin) lines 457*vax* is preferred (refer FIG. 6'O' system 510u; U.S. patent Ser. No. 10/113,534); with the top lines 457*vax*' held in place by a motorized 49*ax*' winching reel 52*ax*' affixed abroad submersible vessel 230*vax*. A closed loop, double lines system enables ease of access of said floating tidal turbines for maintenance checks; repair; etc. bottom loop of line may be held in place by pulley 48*ax* system. Lines carried by winch-reel 52*ax*' of UUV-230*vax*; may be adjusted; slackened or tightened as required. Enabling said buoy 508*ax* or ballast vessel 578*ax*; including the floating tidal turbines 768*v*; 768*w*; 471*vax*; to be lifted abroad a customized vessel 730; specialized mother ship 741; out-riggers 747; flat-bed pontoons 734; for checks and repair. Upon completion; released; re-submerged back into the sea again.

FIG. 10H illustrates a seabed 537*ax* mounted bottom line reel 52*ax*'''; powered by a ram-water-turbine RWT-71*vax* comprising: tidal turbine 472*ax* connected to gearbox 583*ax*; winching mechanism 49*ax*''. This tidal turbine driven line reel 52*ax*'' provides an optional configuration wherein; said closed loop double lines system of FIG. 10G above may be superceded by means of a single line connected to two (twin) line reels 52*ax*'; 52*ax*''; system. Top end of line 457*vax*' may be connected to a top line reel 52*ax*' mounted on the body of submersible vehicle 230*vax*. The bottom end of line 457*vax*'' maybe anchored to a bottom line-reel 52*ax*'' affixed to the seabed 537*ax* and concrete pad 653; driven by a RWT-71*vax*; a variant apparatus similar in concept to a Ram-Air-Turbine (RAT) 71*ax*. The RWT-71*vax* transforms tidal flow into torque; which may be transmitted by gearbox 583*ax*; to operably drive a driven unit comprising: winch 49*ax*''; spool 52*ax*'' bearing line 457*vax*''.

FIG. 10I illustrates the side-sectional view of apparatus 835; a variant tidal turbine system 471*vax*; 617*v*. A seabed based variant of floating sub-system 490*ax* of FIG. 5C; device 835 may be affixed securely onto the seabed 537*ax*. Wherein said apparatus comprising of multiple turbine units 472*ax*; may be configured with counter rotating generation capabilities of present specification; with the generation components 474*ax*; 476*ax*; embedded in specialty moisture repellant materials; coated in water-proofed substances 806. Wherein, specific turbines 472*ax* may be configured with split functions to drive specific generation components comprising: rotor magnets 474*ax*; rotor coils 476*ax*. Tidal turbine system 835 may comprise of a linear configuration wherein said multiple turbines may be arranged in series, one after another. In the illustrated diagram, five turbines may be lined up in series; wherein, in a variant split-unit functionality and power generation concept of present invention; (for example: counting from left to right); turbine number one, three and five may be configured to drive individual rotor magnets 474*ax* clockwise; independently of each other. While turbine number two and four may be combined and configured to drive the extended rotor coil 476*ax* (integrated with the central shaft 581*ax*) anti-clockwise. Wherein, said turbines one, three, five rotates in an opposite direction to turbines two and four. More turbines may similarly be configured in series; for example: 10 units; 15 units; etc. The power generation components may be supported by bearing boxes 586*ax*; bearings 597*ax* packing assembly; etc. To offset the drop in tidal flow rate; aft turbine units may be configured with longer and larger turbine blades 472*ax*. Optionally, solid hoods or shrouds 615 may be used to divert tidal flow into said turbine blades. Said hoods may also be variably configured to produce the desired tidal flow to individual turbines; such that said tidal turbines produces the required torque configuration as per design specification. Concrete base 653 may be erected securely affixed to seabed 537*ax* using piles 562*ax*; drill strings 655; drill casings 651; (refer FIG. 3A to FIG. 3G). The metal base plate 836 of turbine system 835 may be affixed by means of specially configured drill strings 655 adapted for fitting with drill casings 651. And locked securely in place. Removal may be effected by means of an extended drill string 655 from surface ship 741 to drill casing 651. Unlocking the base plate 836 from the drill casing 651; lifting the entire apparatus 835 to surface for maintenance and repair. With drill string 655 acting as a super large sized screw driver.

FIG. 10J illustrates an optional configuration wherein, said system 835 of FIG. 10I may be configured with extended hoods 615; solid shrouds 615; for improved efficiency and productivity. Said hoods 615 may be configured with variable size; length; and angular inclination for enhanced performance; they may be constructed of solid; semi-solid; or pliable plastics, fabric materials; etc. Shrouds may be configured round; conical; square; rectangular in shape. And may be affixed into; or removed piece by piece; unit by unit from, the concrete base 653 and frame 836; forming a fluid diversion mechanism around said turbines 471$vax$; 617$v$. At the same time solid shrouds 615 acts as machine guarding on said spinning turbine blades 472$ax$, keeping out wildlife.

Figure 11C:
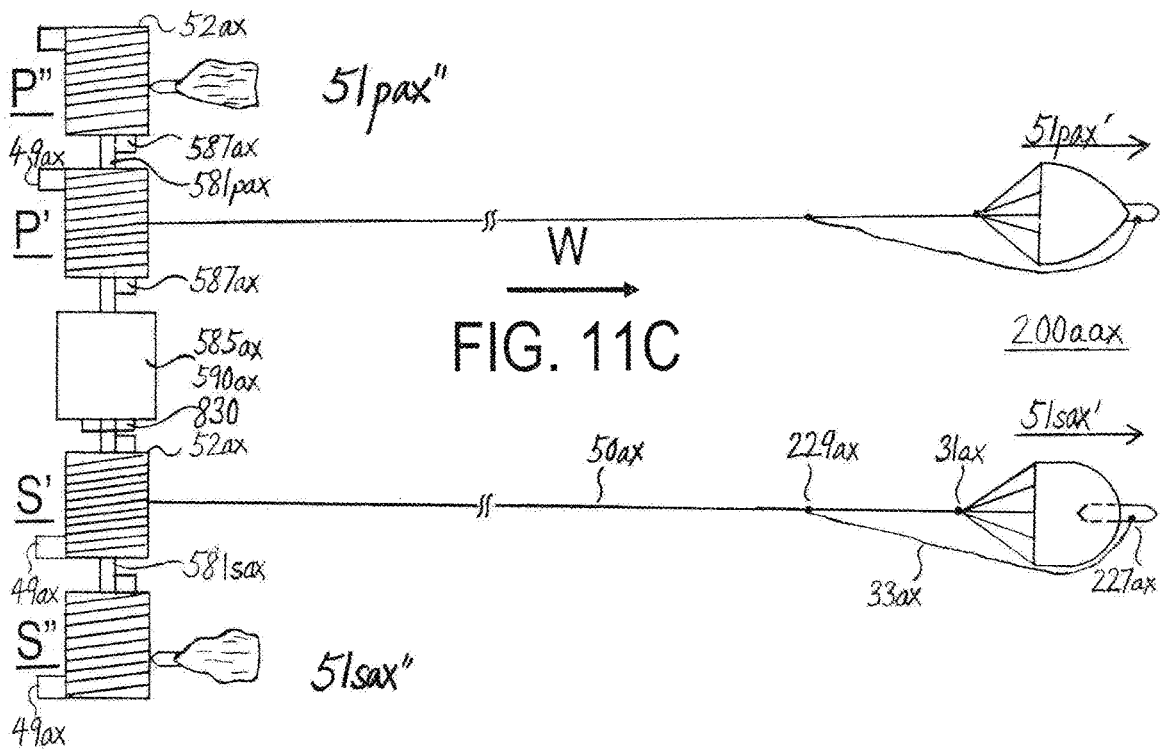
FIG. 11A to FIG. 11C shows differing configuration of the drive units 51ax and driven units 55ax of present invention. From fully manual systems to fully automated systems using drones. From rotor—stator to counter-rotating rotor—rotor configuration.
Figure 11B:
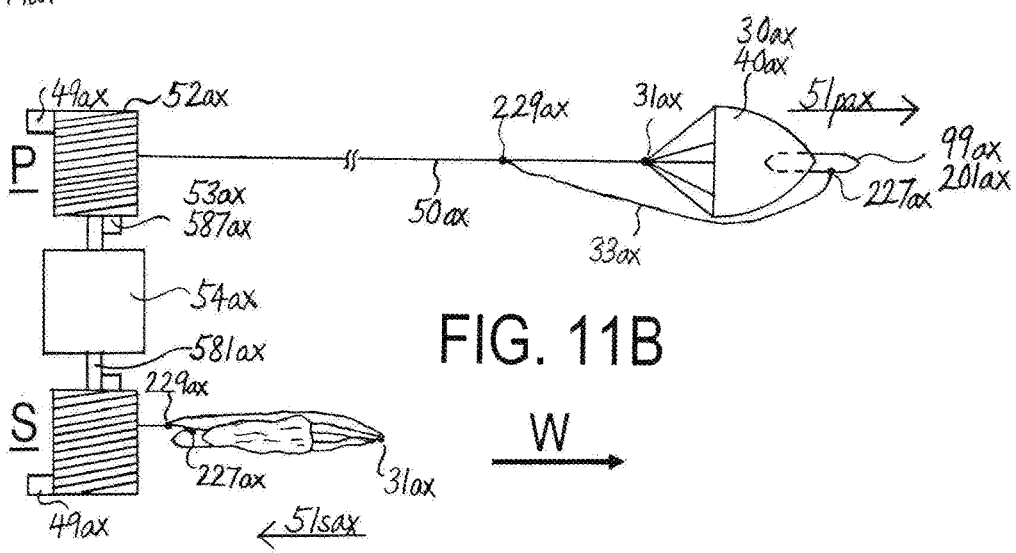
Figure 11A:
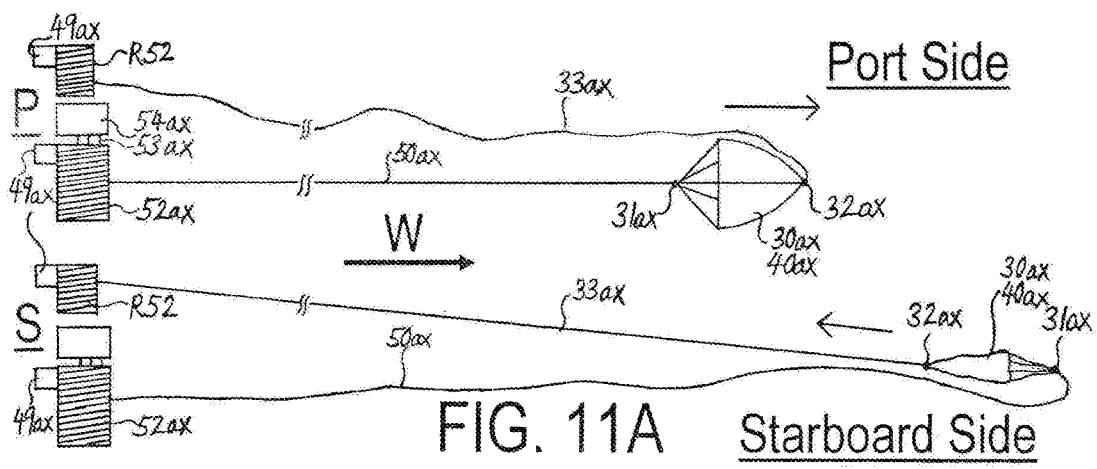

FIG. 11A illustrates a fully manual system of deployment wherein a driven unit 55$ax$ may be connected to a drive unit 51$ax$; including a retract line reel R52$ax$ and winching motors R-49$ax$. Two independent units may be placed side by side (looking from left to right, marked: port side; starboard side). The port side unit is shown in power run phase. While the starboard side unit is shown in retraction phase; being retrieved back to base; to the Start-Of-Run (SOR) point 16$ax$. At the end of power generating run when tether line 50$ax$ had been depleted (designated run length used up); End-Of-Run (EOR) point 288$ax$; the drive unit 51$ax$ must be retracted back in proximity to the driven unit 55$ax$; by means of retract line 33$ax$; retract line-reel R52$ax$; and winching motor R49$ax$. One unit (port side) on active service; one unit (starboard side) being retracted; then placed on standby. The two drive cum driven units 51$ax$; 55$ax$; located port; starboard; each taking turns to generate renewable electricity. Efficiency-wise, this may be less than desirable. This deficiency may be overcome and optimized by means of a variant system of FIG. 11B.

FIG. 11B illustrates a semi-automated variant system of FIG. 11A; wherein, said driven unit 55$ax$ comprising of; a single generator 54$ax$ may be configured with twin sets of line reels 52$ax$; clutch-gearbox 53$ax$; 587$ax$; winching motors 49$ax$. One set on each side: port (indicated by letter "P") and starboard (indicated by letter "S") of generator 54$ax$ connected to a common shaft 581$ax$; linked to two individual drone controlled drive units 51$pax$; 51$sax$. One drive unit 51$pax$ on power run; one drive unit 51$sax$ being retracted; then put on standby. Drive unit 51$pax$; 51$sax$ may be integrated with a variant (shortened) drone body 199$vax$; 201$vax$; fitted with winch 59$ax$ for retracting a variant retract line 33$vax$ (refer: FIG. 11A to FIG. 11J; of parent U.S. Pat. No. 9,447,775); joined to tether line 50$ax$ at point 229$ax$. At the end of the power generating run, the drive unit 51$ax$ must be depowered; and then retracted back to base. Computerized control systems used for execution of said power generation system; includes activation means for triggering said start-of-run (SOR); end-of-run (EOR) depowering; retraction phases; in the drone units; etc. Replenishment of utilities comprising: batteries; compressed air; hydrogen, ethanol (used by fuel-cells); functional checks; etc. may be done during stand-by phase. Wire-line; wireless means of transmission for command and control signals may be employed between the command-control-center and drones. Such a configuration enables generator 54$ax$ to be operated continuously; alternately powered by means of the port or starboard side based drone-controlled drive units 51$pax$; 51$sax$ connected to: line reels 52$ax$; clutch-gearbox 53$ax$; 587$ax$; and winching motors 49$ax$.

FIG. 11C illustrates a variant structural configuration of FIG. 11B wherein, a counter-rotational driven unit 55$ax$ may be configured comprising: one generator 585$ax$; 590$ax$; 777; four independent sets of: line reels 52$ax$; clutch-gearbox 587$ax$; winching motors 49$ax$; connected by means of two split-unit shaft portions 581$pax$; 581$sax$; (refer system 590h, FIG. 7H; U.S. patent Ser. No. 10/113,534). Said line-reels 52$ax$ may selectively be engaged or disengaged by means of clutch-gearbox 587$ax$ to shaft portions 581$pax$; 581$sax$. Two sets configured on each side: port (P'; P'') and starboard (S'; S''); connected to four individual drive units 51$pax'$; 51$pax''$; 51$sax'$; 51$sax''$. Two drive units (51$pax'$; 51$sax'$) on active service; with two drive units being retracted/and put on standby (51$pax''$; 51$sax''$); at any one time. The port side line-reels 52$pax'$; 52$pax''$; may be configured to drive the rotor coils 474$ax$; while starboard side line-reels 52$sax'$; 52$sax''$; may be configured to drive the rotor magnets 476$ax$; of the counter-rotation generator.

Optionally, a single common shaft 581$ax$ may be used to link up all of the line-reels 52$ax$ together; operably connected by means of clutch-gearboxes 587$ax$. And by means of a planetary gear apparatus 830 configured into the torque transmission system (shaft 581$ax$); half of the original torque (example: clockwise rotation) derived from drive units 51$pax'$; 51$sax'$ may be transformed into an opposite direction (example: anti-clockwise rotation) of movement. These two opposing torque may be configured to power any one generating component: rotor coil 474$ax$; rotor magnet 476$ax$; of counter-rotating generator 585$ax$; 590$ax$; 777$v$. The percentage of torque transformation from one direction of rotation into another direction of rotation may configurably be varied; such as proportionate: 50%: 50%; non-proportionate: 40%: 60%; or 30%: 70%; etc. by means of variations in the size(s) of gears configured into apparatus 830. An optimal conversion amount may be derived by means of testing; and applied to the power generation system.

FIG. 11D to FIG. 11G illustrates the integration of turbine generators 835 of FIG. 10I and FIG. 10J; including apparatus 500$aax$; 500$vax$; 471$ax$; etc. with floating-submersible vessels which provide means of: protection; carriage and transportation; a structure for mounting shrouds; hoods; mechanical supporting systems; etc. Enabling said turbines and turbine generators of present invention to be deployed from: the top to the bottom of the vertical water column. From arrays of floating turbines mounted beneath surface platforms such as: ships 741; outriggers 747; pontoons 840; ballast tanks 578$ax$; buoys 508$ax$ (FIG. 11D). To arrays of floating turbines suspended in the middle of the water column (FIG. 11E). To seabed 537$ax$ mounted bottoms turbines 835; 500$vax$; (FIG. 11F to FIG. 11G). Counter-rotating turbine-generator 835; including unit 500$aax$; 500$vax$; 471$ax$; etc. may also be configured in between the bodies of two floating pontoons 840; one on top 840$t$, one at the bottom 840$b$. Said twin pontoons 840$t$; 840$b$; may be configured with dual capabilities: functioning both as a surface vessel; and as a submersible vessel. Capable of operating as a submarine; staying submerged and suspended in the middle of the vertical water column for prolonged periods of time. Apparatus 840 may be configured with buoyancy control sub-system 686; ballast tanks 578; compressed air cylinders 203$ax$; floatation chambers 837; compressors 838; etc. Connected by means of structural beams 839; carrying a turbine-generator 835 in its belly; said dual pontoons 840 may be configured to change its utility purpose from: (a) a surface floating vessel 840$a$ of FIG. 11D; to (b) an under-water vehicle 840$b$ submerged beneath the surface; suspended in the middle of the water column like a submarine of FIG. 11E; to (c) a sea bottom vessel 840c anchored by means of legs 841 to mounting apparatus configured into the seabed 537ax of FIG. 11F and FIG. 11G. Such optional means of utility enables the deployment of turbine-generators from the top of the water column (water surface 621); to the middle of the water column; to the bottom of the seabed 537ax. And whenever required, to surface for periodic maintenance checks; repairs; etc. One side of the pontoons may optionally be configured with a control room and bridge 842 for manned operation of machineries. Access to the bridge by personnel may be made by means of a personal submersible vehicle PSV-230ax; via an air-lock tunnel configured into structure 842. The entire apparatus maybe anchored to the seabed 537ax by means of lines 295ax.

Turbine-generator 835; 500vax; 500aax; 471ax; etc. may be configured as a modular unit; the walls or doors 843 forming a six sided protective structural enclosure around apparatus 835. Which is concealed in between the bodies of the top and bottom pontoon 840t; 840b; while the 4 sides surrounding the turbine-generators comprising: fore and aft; port and starboard sides may be configured with sliding doors 843 operated by mechanical means. Normally the doors remain closed and the shrouds retracted when not in use. But open during operation. Fore, port and starboard doors may be configured and used as solid shrouds 615; pliable hoods 40ax; enabling tidal flow to be collected and channeled into the turbine blades. The bodies of pontoon 840 may be used as supporting structures for mounting equipment; deploying and retracting shrouds 615; fabric bags 30ax; 40ax.

FIG. 11D illustrates the side view of a surface based floating apparatus 840a; with a turbine-generator 835 inside its belly. A flexibly extendable and retractable shroud 615 may be deployed to collect and channel tidal flow to apparatus 835. Not shown are the sliding side-doors 843 which may be flipped outward, acting as shrouds entrapping; diverting tidal current flow to apparatus 835; (refer FIG. 10J for an extended shroud 615). Apparatus 840a may be anchored by means of securing lines 295ax to the seabed 537ax.

FIG. 11E illustrates the side view of a submerged variant of the surface floating apparatus 840 of FIG. 11D. A neutral buoyancy apparatus 840b suspended in the middle of the water column; beneath the surface apparatus 840a of FIG. 11D; but above the sea bottom apparatus 840c affixed by means of legs 841 to the seabed 537ax of FIG. 11F and FIG. 11G. As illustrated in FIG. 11E, the bodies of said top and bottom pontoon 840t; 840b; may be flipped over from top to bottom; or vice-versa. In its belly may be configured a plurality of 3 units of turbine-generators 500aax; 500vax; 471ax. Which maybe flipped into a lying down position when not in use. Or, flipped upward into a vertical, power generating position by means of pneumatic arms; or hydraulic arms 807; 808. Fabric shroud 40ax may be deployed or retracted by means of supporting apparatus anchored to the pontoon's body. Shroud 40ax may be secured using bridle lines 21ax.

FIG. 11F illustrates a perspective view of a sea bottom based apparatus 840c flexibly affixed to anchoring apparatus built into the seabed 537ax. Apparatus 840c may be configured to anchor itself by means of appendages 841 to seabed based anchoring apparatus; and to dislodge or release itself. It may be configured to vary its buoyancy to submerge; and to surface. Fore doors and sliding doors 843 at the port and starboard side may be flipped open to channel tidal flow into the turbine blades of turbine generator 835. Or closed when not in active service. Fore doors may also be configured to be hydro-dynamic in shape; like the pointed bow doors of FIG. 11G. Which maybe swung open widely to aspirate tidal flow. FIG. 11G illustrates a plan view of a variant configuration of FIG. 11F; wherein, dual pontoons 840p and 840s may be configured side by side; located port and starboard. Just like an apparatus 840a flipped onto its side. Fore and side doors located on top may operably be opened or closed.

FIG. 11H and FIG. 11I illustrates the integration of turbine-generator 500eax with the body 201ax of HUV-200vax. FIG. 11H illustrates a variant windmill like counter-rotating turbine-generator 500eax (refer FIG. 5a to FIG. 5j; U.S. patent Ser. No. 10/113,534). Turbine generator 500eax exhibits; and combined both the shrouded (inner turbine blades 492ax surrounded by generating elements 493ax; 494ax); and the open flow concept (outer turbine blades 471ax) of an energy conversion apparatus. Apparatus 500eax may be used individually; independently by itself. Alone. Apparatus 500eax may also be integrated into; to work with other components and disclosures of present invention as illustrated in variant apparatus 800k, directly mounted on the body 201ax of FIG. 11I. The inner ring of turbine blades 492ax may be configured to drive the rotor-magnets ring 494ax; while the outer ring of turbine blades (471ax) may be configured to drive the rotor-coil ring 493ax. The open hole in the middle may be configured to drive a generator mounted inside the body 201ax of HUV-200vax.

FIG. 11I illustrates a variant apparatus 800k (refer: apparatus 800f; 800j of FIG. 8P; FIG. 9D). Wherein the body 201ax of a HUV-200vax apparatus maybe configured with a plurality of counter-rotating turbine-generators 471ax; 500eax; directed affixed onto its body 201vax. Generating power by means of: rotor coils 474ax and rotor magnets 476ax; directly mounted inside its body 201vax. Turbine-generator 471ax may be configured to drive the rotor coil 474ax; while the inner blades ring 492ax of the twin turbine units 500eax may be configured to drive the rotor magnets 476ax. Or, vice-versa. Floating submarine body 201vax may be anchored to the seabed 537ax by means of securing lines 295ax. At the same time, the outer ring of multiple turbine blades 471ax may be configured to drive the rotor magnet ring 494ax clockwise. While the inner ring of multiple turbine blades 492ax may be configured to move and drive the rotor coil ring 493ax anti-clockwise. Or, vice-versa. The generating elements may be supported by bearing boxes 586ax; packing assembly; etc.

Mission—Vision Statement: To reduce; eliminate Global Warming; to save our spaceship—Planet Earth from the dangerous effects of Global Climate Change! The use of drones to serve humanity! To produce clean energy; to preserve clean air and clean water for all of us! We must always remember this; that we only have:

One race—Humanity! One planet—Earth! One common Destiny!

We must all work hard to preserve; not destroy, our one and only "live support system"—Earth's biosphere! For in the fate of mother Earth; and in our own hands, lies our common destiny—for all things living on this planet; and future generations of—plants; animals; humans. It is our common duty and responsibility to do our part: innovators, entrepreneurs, financers, governments and NGOs, etc. To Save The World, Our World! "Look high, look far. Our aim the sky, our goal the stars!" To an inventor the sky's the limit.

To Quote: "I don't believe in climate change. Belief doesn't come into it; scientific verification does. Gravity doesn't care whether you believe in it or not. But if you step off a cliff, you're going to go down."—Dr Katherine Hayhoe, (Climate Scientist, Texas Tech University, USA)

Finally, it is to be understood that various alterations, modifications and/or additions may be introduced into the constructions and arrangements of parts previously described without departing from the spirit or ambit of the invention.

The invention claimed is:

1. A drone power-generator apparatus (800*b*) for the generation of renewable energy comprising:
- a counter rotating wind turbine assembly (500*vax*) integrated with a drone unit and forming a drone body (77*ax*), the counter rotating wind turbine assembly comprising two separate turbine units wherein one turbine unit rotates clockwise and the other turbine unit rotates counter-clockwise to generate electricity and wherein each separate turbine unit is comprised of a turbine blade embedded with (492*ax*) dual rings of rotor coils (474*ax*) and rotor magnets (476*ax*); and
- a plurality of propulsion systems (70*ax*);
- a surface based sub-station (622);
- a conductive tether line (50*ax*) configured to connect the drone body to the surface based sub-station;
- a plurality of bridle lines (21*ax*) connecting various points of the drone body to the conductive tether line wherein the length of the bridle lines are controlled by a winching system mounted inside the drone body;
- wherein the apparatus is configured to vary the length of the bridle lines to adjust the position of the drone body relative to a wind direction and maintain a stable position at an inclined angle such that the counter rotating wind turbine assembly may convert wind energy into electrical energy; and
- wherein said conductive tether line is further configured to transfer power to and from the drone body to deliver power from the wind turbine or to deliver power to the plurality of propulsion systems.

* * * * *